(12) United States Patent
Newman et al.

(10) Patent No.: US 11,395,135 B2
(45) Date of Patent: *Jul. 19, 2022

(54) RAPID MULTI-HOP MESSAGE TRANSFER IN 5G AND 6G

(71) Applicants: David E. Newman, Poway, CA (US); R. Kemp Massengill, Palos Verdes, CA (US)

(72) Inventors: David E. Newman, Poway, CA (US); R. Kemp Massengill, Palos Verdes, CA (US)

(73) Assignee: ULTRALOGIC 6G, LLC, Palos Verdes Estates, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/577,546

(22) Filed: Jan. 18, 2022

(65) Prior Publication Data

US 2022/0141651 A1     May 5, 2022

Related U.S. Application Data

(63) Continuation of application No. 17/328,488, filed on May 24, 2021, now Pat. No. 11,212,831, which is a (Continued)

(51) Int. Cl.
    *H04W 4/00*        (2018.01)
    *H04W 8/26*        (2009.01)
    (Continued)

(52) U.S. Cl.
    CPC ............... *H04W 8/26* (2013.01); *G06N 5/04* (2013.01); *G06N 20/00* (2019.01); *H04L 1/0003* (2013.01);
    (Continued)

(58) Field of Classification Search
    CPC ..... H04W 8/26; H04W 8/24; H04W 72/0413; H04W 72/1247; H04W 72/0833;
    (Continued)

(56) References Cited

U.S. PATENT DOCUMENTS 3,466,409 A     9/1969   Pernet
3,882,449 A     5/1975   Bouchard
(Continued)

FOREIGN PATENT DOCUMENTS

CN     103650624 A   *   3/2014   ............ H04W 40/02
CN     107708184 A   *   2/2018   ............ H04W 48/20
(Continued)

OTHER PUBLICATIONS

Hiraguri et al., Transmission Queueing Schemes for Improving Downlink Throughout on IEEE 802.11 WLANs, 2011.
(Continued)

*Primary Examiner* — Maharishi V Khirodhar
(74) *Attorney, Agent, or Firm* — Mayer & Williams PC

(57) ABSTRACT

A wireless data message in 5G/6G generally includes the destination address (such as MAC address) encoded in a field of the data message. A base station must receive the data message and decode the address before the core network can deliver the message to the recipient's cell. For faster communication, certain address messages are disclosed, by which the destination address may be disclosed before the data message is uploaded. Early disclosure of the destination address may enable the core network to deliver the data message to the recipient with fewer delays. In various configurations, the destination address may be provided concurrently with a scheduling request, or combined with a BSR (size) message, or delivered on a random access channel, among other possibilities. For faster uploads, a (Continued)

pointer or code representing the destination address can be specified, resulting in further delay reductions.

2 Claims, 31 Drawing Sheets

Related U.S. Application Data continuation of application No. 17/328,700, filed on May 24, 2021, now Pat. No. 11,229,063.

(60) Provisional application No. 63/176,996, filed on Apr. 20, 2021, provisional application No. 63/170,636, filed on Apr. 5, 2021, provisional application No. 63/170,631, filed on Apr. 5, 2021, provisional application No. 63/170,635, filed on Apr. 5, 2021, provisional application No. 63/170,642, filed on Apr. 5, 2021, provisional application No. 63/170,633, filed on Apr. 5, 2021, provisional application No. 63/135,143, filed on Jan. 8, 2021, provisional application No. 63/134,338, filed on Jan. 6, 2021, provisional application No. 63/131,905, filed on Dec. 30, 2020, provisional application No. 63/131,908, filed on Dec. 30, 2020, provisional application No. 63/131,902, filed on Dec. 30, 2020, provisional application No. 63/131,906, filed on Dec. 30, 2020, provisional application No. 63/127,421, filed on Dec. 18, 2020, provisional application No. 63/199,061, filed on Dec. 4, 2020, provisional application No. 63/199,063, filed on Dec. 4, 2020.

(51) Int. Cl.
| | |
|---|---|
| *H04W 72/04* | (2009.01) |
| *H04L 5/00* | (2006.01) |
| *H04W 8/24* | (2009.01) |
| *G06N 20/00* | (2019.01) |
| *G06N 5/04* | (2006.01) |
| *H04L 1/00* | (2006.01) |
| *H04W 72/14* | (2009.01) |
| *H04L 45/122* | (2022.01) |
| *H04L 69/22* | (2022.01) |
| *H04W 72/12* | (2009.01) |
| *H04W 28/02* | (2009.01) |
| *H04W 74/00* | (2009.01) |
| *H04W 74/08* | (2009.01) |
| *H04W 84/04* | (2009.01) |

(52) U.S. Cl.
CPC .......... *H04L 1/0009* (2013.01); *H04L 5/0048* (2013.01); *H04L 45/122* (2013.01); *H04L 69/22* (2013.01); *H04W 8/24* (2013.01); *H04W 28/0278* (2013.01); *H04W 72/0413* (2013.01); *H04W 72/1242* (2013.01); *H04W 72/1247* (2013.01); *H04W 72/1284* (2013.01); *H04W 72/14* (2013.01); *H04W 74/004* (2013.01); *H04W 74/0833* (2013.01); *H04W 84/042* (2013.01)

(58) Field of Classification Search
CPC ....... H04W 84/042; G06N 20/00; G06N 5/04; H04L 1/0003; H04L 1/0009; H04L 5/0048; H04L 45/122; H04L 69/22
USPC ...................................................... 370/329
See application file for complete search history.

(56) References Cited

U.S. PATENT DOCUMENTS

| | | |
|---|---|---|
| 3,952,381 A | 4/1976 | Barbe |
| 4,381,829 A | 5/1983 | Montaron |
| 4,524,287 A | 6/1985 | Brannen |
| 5,606,578 A | 2/1997 | O'Dea |
| 5,860,136 A | 1/1999 | Fenner |
| 5,894,906 A | 4/1999 | Weber |
| 5,959,552 A | 9/1999 | Cho |
| 5,983,161 A | 11/1999 | Lemelson |
| 6,084,508 A | 7/2000 | Mai |
| 6,269,308 B1 | 7/2001 | Kodaka |
| 6,275,773 B1 | 8/2001 | Lemelson |
| 6,317,692 B2 | 11/2001 | Kodaka |
| 6,359,553 B1 | 3/2002 | Kopischke |
| 6,420,996 B1 | 7/2002 | Stopczynski |
| 6,442,485 B2 | 8/2002 | Evans |
| 6,487,500 B2 | 11/2002 | Lemelson |
| 6,496,764 B1 | 12/2002 | Wang |
| 6,597,974 B2 | 7/2003 | Roelleke |
| 6,678,590 B1 | 1/2004 | Burchfiel |
| 6,691,227 B1 | 2/2004 | Neves |
| 6,791,471 B2 | 9/2004 | Wehner |
| 6,816,447 B1 | 11/2004 | Lee |
| 6,831,572 B2 | 12/2004 | Strumolo |
| 7,016,782 B2 | 3/2006 | Schiffmann |
| 7,124,027 B1 | 10/2006 | Ernst |
| 7,177,294 B2 | 2/2007 | Chen |
| 7,409,295 B2 | 8/2008 | Paradie |
| 7,600,039 B2 | 10/2009 | Tang |
| 7,660,436 B2 | 2/2010 | Chang |
| 7,667,581 B2 | 2/2010 | Fujimoto |
| 7,696,863 B2 | 4/2010 | Lucas |
| 7,797,107 B2 | 9/2010 | Shiller |
| 7,840,354 B2 | 11/2010 | Knoop |
| 7,966,127 B2 | 6/2011 | Ono |
| 8,108,147 B1 | 1/2012 | Blackbum |
| 8,112,225 B2 | 2/2012 | Eidehall |
| 8,340,883 B2 | 12/2012 | Arbitmann |
| 8,447,472 B2 | 5/2013 | Joh |
| 8,463,500 B2 | 6/2013 | Cuddihy |
| 8,504,283 B2 | 8/2013 | Aso |
| 8,527,172 B2 | 9/2013 | Moshchuk |
| 8,538,674 B2 | 9/2013 | Breuer |
| 8,576,055 B2 | 11/2013 | Hara |
| 8,589,061 B2 | 11/2013 | Bengtsson |
| 8,849,515 B2 | 9/2014 | Moshchuk |
| 8,874,300 B2 | 10/2014 | Allard |
| 8,948,955 B2 | 2/2015 | Zhu |
| 9,031,743 B2 | 5/2015 | Okita |
| 9,031,761 B2 | 5/2015 | Koshizen |
| 9,031,774 B2 | 5/2015 | Suk |
| 9,037,379 B2 | 5/2015 | Shin |
| 9,108,582 B1 | 8/2015 | Kozloski |
| 9,165,469 B2 | 10/2015 | Bowers |
| 9,250,324 B2 | 2/2016 | Zeng |
| 9,318,023 B2 | 4/2016 | Moshchuk |
| 9,398,594 B2 | 7/2016 | Benveniste |
| 9,415,658 B1 | 8/2016 | Makkar |
| 9,701,307 B1 | 7/2017 | Newman |
| 9,721,400 B1 | 8/2017 | Oakes, III |
| 9,729,299 B2 | 8/2017 | Barriac |
| 9,896,096 B2 | 2/2018 | Newman |
| 9,979,643 B2 | 5/2018 | Tosaka |
| 10,489,303 B2 | 11/2019 | Swaine |
| 10,499,302 B1 | 12/2019 | McIennan |
| 11,229,063 B1 * | 1/2022 | Newman ................ G06N 20/00 |
| 2002/0198632 A1 | 12/2002 | Breed |
| 2003/0014165 A1 | 1/2003 | Baker |
| 2003/0067219 A1 | 4/2003 | Seto |
| 2003/0080543 A1 | 5/2003 | Takagi |
| 2003/0193889 A1 | 10/2003 | Jacobsen |
| 2004/0030498 A1 | 2/2004 | Knoop |
| 2004/0117081 A1 | 6/2004 | Mori |
| 2004/0120292 A1 | 6/2004 | Trainin |
| 2004/0122578 A1 | 6/2004 | Isaji |
| 2004/0193374 A1 | 9/2004 | Hae |

(56) References Cited

U.S. PATENT DOCUMENTS

| | | |
|---|---|---|
| 2004/0252863 A1 | 12/2004 | Chang |
| 2005/0060069 A1 | 3/2005 | Breed |
| 2005/0071071 A1 | 3/2005 | Nagata |
| 2005/0107955 A1 | 5/2005 | Isaji |
| 2005/0114000 A1 | 5/2005 | Cashier |
| 2005/0131646 A1 | 6/2005 | Camus |
| 2005/0206142 A1 | 9/2005 | Prakah-Asante |
| 2005/0280520 A1 | 12/2005 | Kubo |
| 2006/0085131 A1 | 4/2006 | Yopp |
| 2006/0091654 A1 | 5/2006 | De Mersseman |
| 2006/0109094 A1 | 5/2006 | Prakah-Asante |
| 2006/0268878 A1 | 11/2006 | Jung |
| 2006/0282218 A1 | 12/2006 | Urai |
| 2007/0078600 A1 | 4/2007 | Fregene |
| 2007/0080825 A1 | 4/2007 | Shiller |
| 2007/0112516 A1 | 5/2007 | Taniguchi |
| 2007/0125588 A1 | 6/2007 | Akgun |
| 2007/0219672 A1 | 9/2007 | Fehr |
| 2007/0282530 A1 | 12/2007 | Meister |
| 2008/0208408 A1 | 8/2008 | Arbitmann |
| 2008/0300755 A1 | 12/2008 | Madau |
| 2008/0319610 A1 | 12/2008 | Oechsle |
| 2009/0018740 A1 | 1/2009 | Noda |
| 2009/0066492 A1 | 3/2009 | Kubota |
| 2009/0074249 A1 | 3/2009 | Moed |
| 2009/0076702 A1 | 3/2009 | Arbitmann |
| 2009/0143951 A1 | 6/2009 | Takahashi |
| 2009/0157247 A1 | 6/2009 | Sjogren |
| 2009/0182465 A1 | 7/2009 | Wilke |
| 2009/0184862 A1 | 7/2009 | Stayton |
| 2009/0192683 A1 | 7/2009 | Kondou |
| 2009/0292468 A1 | 11/2009 | Wu |
| 2009/0299593 A1 | 12/2009 | Borchers |
| 2009/0299857 A1 | 12/2009 | Brubaker |
| 2009/0322500 A1 | 12/2009 | Chatterjee |
| 2009/0326796 A1 | 12/2009 | Prokhorov |
| 2010/0179760 A1 | 7/2010 | Petrini |
| 2010/0220632 A1* | 9/2010 | Javaid .................. H04L 45/302 370/255 |
| 2010/0305857 A1 | 12/2010 | Byrne |
| 2011/0035116 A1 | 2/2011 | Ieda |
| 2011/0106361 A1 | 5/2011 | Staempfle |
| 2011/0149881 A1 | 6/2011 | Gong |
| 2011/0178710 A1 | 7/2011 | Pilutti |
| 2011/0210872 A1 | 9/2011 | Molander |
| 2011/0295464 A1 | 12/2011 | Zagorski |
| 2011/0307139 A1 | 12/2011 | Caminiti |
| 2012/0078472 A1 | 3/2012 | Neal |
| 2012/0083947 A1 | 4/2012 | Anderson |
| 2012/0083960 A1 | 4/2012 | Zhu |
| 2012/0092208 A1 | 4/2012 | Le Mire |
| 2012/0101713 A1 | 4/2012 | Moshchuk |
| 2012/0130561 A1 | 5/2012 | Chiang |
| 2012/0130629 A1 | 5/2012 | Kim |
| 2012/0143488 A1 | 6/2012 | Othmezouri |
| 2012/0230262 A1 | 9/2012 | Benveniste |
| 2012/0235853 A1 | 9/2012 | Takeuchi |
| 2012/0330542 A1 | 12/2012 | Hafner |
| 2013/0003661 A1 | 1/2013 | Matsuo |
| 2013/0030651 A1 | 1/2013 | Moshchuk |
| 2013/0030686 A1 | 1/2013 | Morotomi |
| 2013/0054128 A1 | 2/2013 | Moshchuk |
| 2013/0136013 A1 | 5/2013 | Kneckt |
| 2013/0162479 A1 | 6/2013 | Kelly |
| 2013/0166150 A1 | 6/2013 | Han |
| 2013/0286959 A1* | 10/2013 | Lou .................... H04L 27/2602 370/329 |
| 2014/0032049 A1 | 1/2014 | Moshchuk |
| 2014/0039786 A1 | 2/2014 | Schleicher |
| 2014/0049646 A1 | 2/2014 | Nix |
| 2014/0078940 A1* | 3/2014 | Aggarwal ............. H04L 1/1887 370/278 |
| 2014/0087749 A1 | 3/2014 | Mar |
| 2014/0139366 A1 | 5/2014 | Moses |
| 2014/0142798 A1 | 5/2014 | Guamizo |
| 2014/0156157 A1 | 6/2014 | Johnson |
| 2014/0207344 A1 | 7/2014 | Ihlenburg |
| 2014/0307658 A1 | 10/2014 | Vedantham |
| 2014/0379167 A1 | 12/2014 | Flehmig |
| 2015/0003251 A1 | 1/2015 | Shaffer |
| 2015/0046078 A1 | 2/2015 | Biess |
| 2015/0085119 A1 | 3/2015 | Dagan |
| 2015/0160338 A1 | 6/2015 | Bageshwar |
| 2015/0166062 A1 | 6/2015 | Johnson |
| 2015/0172012 A1 | 6/2015 | Abeysekera |
| 2015/0201413 A1 | 7/2015 | Seo |
| 2015/0239413 A1 | 8/2015 | Kozloski |
| 2015/0249515 A1 | 9/2015 | Wu |
| 2015/0262487 A1 | 9/2015 | Cazanas |
| 2015/0307097 A1 | 10/2015 | Steinmeyer |
| 2015/0334752 A1* | 11/2015 | Li ...................... H04W 74/0816 455/418 |
| 2015/0336574 A1 | 11/2015 | Akiyama |
| 2015/0336579 A1 | 11/2015 | Yoshizawa |
| 2016/0044693 A1 | 2/2016 | Sun |
| 2016/0071417 A1 | 3/2016 | Lewis |
| 2016/0095139 A1 | 3/2016 | Ding |
| 2016/0103218 A1 | 4/2016 | Mandava |
| 2016/0107609 A1 | 4/2016 | Sogabe |
| 2016/0112999 A1 | 4/2016 | Kosaka |
| 2016/0121887 A1 | 5/2016 | Jeon |
| 2016/0125746 A1 | 5/2016 | Kunzi |
| 2016/0163199 A1 | 6/2016 | Chundrlik |
| 2016/0167671 A1 | 6/2016 | Offenhaeuser |
| 2016/0200318 A1 | 7/2016 | Parikh |
| 2016/0200319 A1 | 7/2016 | Nemoto |
| 2016/0200320 A1 | 7/2016 | Nemoto |
| 2016/0200321 A1 | 7/2016 | Yamada |
| 2016/0203719 A1 | 7/2016 | Divekar |
| 2016/0236638 A1 | 8/2016 | Lavie |
| 2016/0239921 A1 | 8/2016 | Bray |
| 2016/0254691 A1 | 9/2016 | Koo |
| 2016/0288799 A1 | 10/2016 | Nguyen Van |
| 2016/0345362 A1 | 11/2016 | Lee |
| 2017/0043768 A1 | 2/2017 | Prokhorov |
| 2017/0055294 A1 | 2/2017 | Lee |
| 2017/0127433 A1 | 5/2017 | Lin |
| 2017/0144391 A1 | 5/2017 | Kim |
| 2017/0148235 A1 | 5/2017 | Yakub |
| 2017/0188352 A1 | 6/2017 | Lee |
| 2017/0236340 A1 | 8/2017 | Hagan |
| 2017/0337813 A1 | 11/2017 | Taylor |
| 2018/0109976 A1 | 4/2018 | Ly |
| 2018/0115994 A1* | 4/2018 | Islam .................. H04W 74/006 |
| 2018/0123839 A1 | 5/2018 | Chung |
| 2018/0337846 A1 | 11/2018 | Lee |
| 2019/0158257 A1 | 5/2019 | Sano |
| 2019/0173726 A1 | 6/2019 | Wong |
| 2019/0188997 A1 | 6/2019 | Gilson |
| 2019/0191464 A1 | 6/2019 | Loehr |
| 2019/0200404 A1 | 6/2019 | Yu |
| 2020/0068530 A1* | 2/2020 | Ahn .................... H04L 47/2433 |
| 2020/0383030 A1 | 12/2020 | Cho |
| 2021/0064996 A1 | 3/2021 | Wang |
| 2021/0135733 A1 | 5/2021 | Huang |
| 2021/0195457 A1 | 6/2021 | Kim |
| 2021/0212104 A1* | 7/2021 | Li ........................ H04L 1/1896 |
| 2021/0329486 A1* | 10/2021 | Kadous ................ H04L 67/63 |

FOREIGN PATENT DOCUMENTS

| | | | |
|---|---|---|---|
| CN | 108271139 A | * 7/2018 | |
| EP | 0136553 A2 | 4/1985 | |
| KR | 1020110125671 | 11/2011 | |
| RU | 2676946 C2 | * 1/2019 | ........... H04L 5/0053 |
| VN | 10026348 B | * 11/2020 | .............. H04B 7/26 |
| WO | WO-0191378 A1 | * 11/2001 | ........... H04L 1/1854 |

(56) References Cited

FOREIGN PATENT DOCUMENTS

| WO | 2006106459 | 10/2006 |
|----|------------|---------|
| WO | 2015070087 | 5/2015  |

OTHER PUBLICATIONS

Mehdi et al., On Self-Optimiziation of the Random Access Procedure in 3g Long Term Evolution, 2009).

"Automatic Post-Collision Braking System", Volkswagon, Retrieved from: http://www.volkswagen.co.uk/technology/braking-and-stability-systems/automatic-post-collision-braking-system Retrieved on: Oct. 31, 2016 (3 pages total).

"Emergency", OnStar, Retrieved from: https://www.onstar.com/us/en/services/emergency.html Retrieved on: Nov. 9, 2016 (4 pages total).

Emison, J. Kent, "Post-collision fuel-fed fires.", Apr. 1, 2995, The Free Library, Retrieved Nov. 9, 2016, Retrieved from: https://www.thefreelibrary.com/Post-collision+fuel-fed+fires.-a016859548 (5 pages).

\* cited by examiner

1451 - NODE HAS DATA READY. WITHOUT WAITING FOR SROpp, NODE DOES LBT CHECK, THEN TRANSMITS TYPE, ID, DAT MESSAGES ON RACH. (OPTIONALLY DMRS OR PTRS MESSAGE AS WELL.)

↓

1452 - BASE RECEIVES DAT MESSAGE.

↓

1453 - BASE TRANSFERS DATA TO CORE NETWORK.

↓

1454 - CORE NETWORK TRANSFERS RELAY MESSAGE TO RECIPIENT.

FIG. 19

| BITS | FEATURE | MEANING |
|---|---|---|
| 1,2 | Speed | 00=reduce 1 step<br>01=leave unchanged<br>10=increase 1 step<br>11=increase 2 steps |
| 3,4 | Reliability | 00=reduce 1 step<br>01=leave unchanged<br>10=increase 1 step<br>11=increase 2 steps |
| 5,6 | System-defined or user-programmable. | |
| 7,8 | Reserved | |

FIG. 29

| RANGE | INDEX | FUNCTION |
|---|---|---|
| 4-bit 16QAM | 0 | Address is in DAT message. |
| | 1 | Reply to latest incoming. |
| | 2 | Resend to latest outgoing. |
| | 3 | Emergency call. |
| | 4 | To base station or network. |
| | 5 | (Reserved) |
| | 6 | Contact #1 |
| | 7 | Contact #2 |
| | ... | ... |
| | 15 | Contact #10 |
| 6-bit 64QAM | 16 | Contact #11 |
| | ... | ... |
| | 40 | Contact #35 |
| | 41 | Command #1 |
| | ... | ... |
| | 60 | Command #20 |
| | 61-63 | (Reserved) |
| 8-bit 256QAM | 64 | Older incoming #2. |
| | ... | ... |
| | 112 | Older incoming #50. |
| | 113 | Older outgoing #2. |
| | ... | ... |
| | 161 | Older outgoing #50. |
| | 162 | System-defined #1. |
| | ... | ... |
| | 181 | System-defined #20. |
| | 182 | User-programmable #1. |
| | ... | ... |
| | 201 | User-programmable #20. |
| | 202-255 | (Reserved) |

RAPID MULTI-HOP MESSAGE TRANSFER IN 5G AND 6G

PRIORITY CLAIMS AND RELATED APPLICATIONS

This application is a continuation of U.S. patent application Ser. No. 17/328,700, entitled "Early Disclosure of Destination Address for Fast Information Transfer in 5G", filed May 24, 2021, which is a continuation of U.S. patent application Ser. No. 17/328,488, entitled "Rapid Uplink Access by Modulation of 5G Scheduling Requests", filed May 24, 2021, which claims the benefit of U.S. Provisional Patent Application Ser. No. 63/199,061, entitled "Scheduling Request Protocols for Low Latency and High Throughput", filed Dec. 4, 2020, and U.S. Provisional Patent Application Ser. No. 63/199,063, entitled "Scheduling Request Protocols for Low Latency and High Throughput", filed Dec. 4, 2020, and U.S. Provisional Patent Application Ser. No. 63/127,421, entitled "Temporary QoS for Improved Wireless Message Control", filed Dec. 18, 2020, and U.S. Provisional Patent Application Ser. No. 63/131,902, entitled "Early Disclosure of Receiver Address for Low-Latency Messaging", filed Dec. 30, 2020, and U.S. Provisional Patent Application Ser. No. 63/131,905, entitled "Protocols for Rapid Uplink Access on Unregulated Channels", filed Dec. 30, 2020, and U.S. Provisional Patent Application Ser. No. 63/131,906, entitled "Scheduling Request with Synchronous BSR Message", filed Dec. 30, 2020, U.S. Provisional Patent Application Ser. No. 63/131,908, entitled "Low-Latency Asynchronous Uplink Wireless Message Transmission", filed Dec. 30, 2020, U.S. Provisional Patent Application Ser. No. 63/134,338, entitled "Network-Based User-Specific Recipient Database for Low Latency", filed Jan. 6, 2021, and U.S. Provisional Patent Application Ser. No. 63/135,143, entitled "Random Access Protocols for Low Latency, Low Cost, and MMTC", filed Jan. 8, 2021, and U.S. Provisional Patent Application Ser. No. 63/170,631, entitled "Rapid Uplink Access by Modulation of 5G Scheduling Requests", filed Apr. 5, 2021, and U.S. Provisional Patent Application Ser. No. 63/170,633, entitled "Rapid Uplink Access by Parallel Signaling on a 5G Random-Access Channel", filed Apr. 5, 2021, and U.S. Provisional Patent Application Ser. No. 63/170,635, entitled "Early Disclosure of Destination Address for Fast Information Transfer in 5G", filed Apr. 5, 2021, and U.S. Provisional Patent Application Ser. No. 63/170,636, entitled "Temporary QoS Elevation for High-Priority 5G Messages", filed Apr. 5, 2021, and U.S. Provisional Patent Application Ser. No. 63/170,642, entitled "Managed Database of Recipient Addresses for Fast 5G Message Delivery", filed Apr. 5, 2021, and U.S. Provisional Patent Application Ser. No. 63/176,996, entitled "Rapid Uplink Access by Modulation of 5G Scheduling Requests", filed Apr. 20, 2021, all of which are hereby incorporated by reference in their entireties.

FIELD OF THE INVENTION

Protocols are disclosed for rapid message transfer between cells in wireless communication networks such as 5G and 6G networks.

BACKGROUND OF THE INVENTION

In managed networks such as 5G and 6G networks, a user includes the destination address in a message, and the base station is required to receive and decode the message to obtain the destination address before transmitting the data message to the recipient. The transmission procedure generally involves multiple steps, including transmitting and receiving subsidiary messages to set up a "multi-hop" procedure to convey the data message to the recipient's cell. Each step has its own inherent delays, which users requiring rapid message transfer may find unduly inhibiting. What is needed is means for uploading and transferring a data message with fewer delays.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY OF THE INVENTION

The goal of 5G is to be a universal wireless communication technology, serving a wide diversity of users with widely varying requirements. To achieve this lofty ambition, it may be necessary to add alternative methods to the technology, such as allowing pre-grant information in an uplink scheduling request itself or transmitted in parallel on a random access channel, allowing early disclosure of a destination address before a data message, allowing users to request a temporary priority adjustment, and allowing users to cite a brief address index instead of the full destination address of a message. Such improvements may enable low-latency messaging with rapid uplink access and accelerated message transfer to the recipient, and may enable simpler, lower-cost devices to access 5G networks. Since many of these improvements may be implemented by software updates, rather than hardware development, the risk and cost of providing the improvements may be very low. Future 5G and 6G users are highly likely to demand performance advantages, versatility, and ease of access, such as those provided by the systems and methods disclosed herein.

In one aspect, a method is for a base station of a wireless network to transmit an uplink grant message to a user node of a plurality of user nodes in signal communication with the base station, the method comprising: assigning, by the base station, a first modulation state to a first user node, the first modulation state comprising a first amplitude modulation and a first phase modulation; assigning, by the base station, a second modulation state, different from the first modulation state, to a second user node; assigning, by the base station, an initial SR (scheduling request) opportunity comprising a particular time and a particular frequency, to the first user node and to the second user node; receiving, by the base station, an SR message comprising a symbol at the particular time and at the particular frequency; determining, by the base station, a particular modulation state of the SR message symbol; if the particular modulation state is the first modulation state, then transmitting an uplink grant to the first user node; and if the particular modulation state is the second modulation state, then transmitting an uplink grant to the second user node.

In another aspect, non-transient computer-readable media are in a base station of a wireless network comprising a plurality of user nodes, the media containing instructions for causing the base station to perform a method comprising: transmitting, to a first user node, a message specifying a first modulation state; transmitting, to a second user node, a message specifying a second modulation state different from the first modulation state; transmitting, to the first user node, a message specifying an SR opportunity comprising an initial resource element; transmitting, to the second user node, a message specifying an SR opportunity comprising the initial resource element; receiving an SR message at a time and a frequency corresponding to the initial resource element; determining whether the SR message is modulated according to the first modulation state or the second modulation state; selecting the first user node if the SR message is modulated according to the first modulation state, and selecting the second user node if the SR message is modulated according to the second modulation state; and transmitting an uplink grant to the selected user node.

In another aspect, non-transient computer-readable media are in a first user node of a wireless network comprising a plurality of user nodes in signal communication with a base station, the media comprising instructions configured to cause the first user node to perform a method comprising: receiving a modulation assignment message specifying a first modulation state; receiving an SR opportunity assignment specifying a particular frequency and one or more particular times at which the first user node has permission to transmit an SR message modulated according to the first modulation state; and transmitting, on the particular frequency and at one of the particular times, an SR message modulated according to the first modulation state.

In another aspect, a method is for a particular user node to transmit an SR request, the particular user node belonging to a wireless network comprising a base station in signal communication with a set of user nodes, the method comprising: receiving, from the base station, an algorithm configured to calculate resource elements and associated modulation states, such that the particular user node is caused to transmit SR request messages on the calculated resource elements according to the associated modulation states, respectively; calculating, with the algorithm, a particular resource element and associated modulation state; and transmitting, on the particular resource element, an SR request modulated according to the associated modulation state.

In another aspect, a system or apparatus comprises a base station of a wireless network configured to transmit an uplink grant message to a user node of a plurality of user nodes in signal communication with the base station, according to a method comprising: assigning, by the base station, a first modulation state to a first user node, the first modulation state comprising a first amplitude modulation and a first phase modulation; assigning, by the base station, a second modulation state, different from the first modulation state, to a second user node; assigning, by the base station, an initial SR (scheduling request) opportunity comprising a particular time and a particular frequency, to the first user node and to the second user node; receiving, by the base station, an SR message comprising a symbol at the particular time and at the particular frequency; determining, by the base station, a particular modulation state of the SR message symbol; if the particular modulation state is the first modulation state, then transmitting an uplink grant to the first user node; and if the particular modulation state is the second modulation state, then transmitting an uplink grant to the second user node.

In another aspect, a system or apparatus comprises a first user node of a wireless network comprising a plurality of user nodes in signal communication with a base station, the first user node configured to perform a method comprising: receiving a modulation assignment message specifying a first modulation state; receiving an SR opportunity assignment specifying a particular frequency and one or more particular times at which the first user node has permission to transmit an SR message modulated according to the first modulation state; and transmitting, on the particular frequency and at one of the particular times, an SR message modulated according to the first modulation state.

In another aspect, a method is for a wireless network to transmit an uplink grant message from a base station of the wireless network to a user node of a plurality of user nodes in signal communication with the base station, the method comprising: assigning, by the base station, a first modulation state to a first user node, the first modulation state comprising a first amplitude modulation and a first phase modulation; assigning, by the base station, a second modulation state, different from the first modulation state, to a second user node; assigning, by the base station, an initial SR (scheduling request) opportunity comprising a particular time and a particular frequency, to the first user node and to the second user node; receiving, by the base station, an SR message comprising a symbol at the particular time and at the particular frequency; determining, by the base station, a particular modulation state of the SR message symbol; if the particular modulation state is the first modulation state, then transmitting an uplink grant to the first user node; and if the particular modulation state is the second modulation state, then transmitting an uplink grant to the second user node.

In another aspect, non-transient computer-readable media are in a wireless network comprising a base station and a plurality of user nodes, the media containing instructions for causing the base station to perform a method comprising: transmitting, to a first user node, a message specifying a first modulation state; transmitting, to a second user node, a message specifying a second modulation state different from the first modulation state; transmitting, to the first user node, a message specifying an SR opportunity comprising an initial resource element; transmitting, to the second user node, a message specifying an SR opportunity comprising the initial resource element; receiving an SR message at a time and a frequency corresponding to the initial resource element; determining whether the SR message is modulated according to the first modulation state or the second modulation state; selecting the first user node if the SR message is modulated according to the first modulation state, and selecting the second user node if the SR message is modulated according to the second modulation state; and transmitting an uplink grant to the selected user node.

In another aspect, a system or apparatus comprises a wireless network comprising a base station and a plurality of user nodes, the network configured to perform a method comprising: transmitting, to a first user node, a message specifying a first modulation state; transmitting, to a second user node, a message specifying a second modulation state different from the first modulation state; transmitting, to the first user node, a message specifying an SR opportunity comprising an initial resource element; transmitting, to the second user node, a message specifying an SR opportunity comprising the initial resource element; receiving an SR message at a time and a frequency corresponding to the initial resource element; determining whether the SR message is modulated according to the first modulation state or the second modulation state; selecting the first user node if the SR message is modulated according to the first modulation state, and selecting the second user node if the SR message is modulated according to the second modulation state; and transmitting an uplink grant to the selected user node.

In another aspect, a method is for transmitting wireless messages on a network having a RACH (random access)

channel and a PUCCH (physical uplink control) channel, the method comprising: transmitting an SR (scheduling request) message of a pre-assigned duration on the PUCCH; and transmitting a BSR (buffer status report) message on the RACH channel synchronously with the SR message, wherein synchronously comprises having a predetermined time relationship between the SR message and the BSR message.

In another aspect, a method is for a user node of a wireless network to request an uplink grant to transmit a data message on the wireless network, the method comprising: receiving, in a downlink message, an assigned time and frequency for transmitting a scheduling request message on a PUCCH (physical uplink control channel); and transmitting, at the assigned time and frequency, on the PUCCH, a size message configured to indicate a size of the data message.

In another aspect, non-transient computer-readable media are in a base station of a wireless network, the base station in signal communication with a plurality of user nodes, the media comprising instructions for causing the base station to perform a method comprising: receiving one or more messages from a particular user node of the plurality, on an unscheduled channel operating on a frequency at which user nodes have permission to transmit messages without an uplink grant, the one or more messages indicating an identity of the particular user node and a size of a data message that the particular user node wishes to transmit; determining, from the one or more messages, the identity of the particular user node and the size of the data message; and transmitting, to the particular user node, an uplink grant for transmitting the data message.

In another aspect, non-transient computer-readable media are in a particular user node of a plurality of user nodes, each user node in signal communication with a base station of a wireless network, the media comprising instructions which when executed cause the particular user node to perform a method comprising: detecting, on a random access channel, noise or interference; then transmitting, on an uplink control channel, at a particular time assigned to the particular user node by the base station, a scheduling request message; then determining that the noise on the random access channel has ended; then canceling the scheduling request message; then transmitting, on the random access channel, the data message.

In another aspect, a method is performed by a base station of a wireless network, the base station in signal communication with a plurality of user nodes, the method comprising: receiving one or more messages from a particular user node of the plurality, on an unscheduled channel operating on a frequency at which user nodes have permission to transmit messages without an uplink grant, the one or more messages indicating an identity of the particular user node and a size of a data message that the particular user node wishes to transmit; determining, from the one or more messages, the identity of the particular user node and the size of the data message; and transmitting, to the particular user node, an uplink grant for transmitting the data message.

In another aspect, a system or apparatus comprises a base station of a wireless network, the base station in signal communication with a plurality of user nodes, base station configured to perform a method comprising: receiving one or more messages from a particular user node of the plurality, on an unscheduled channel operating on a frequency at which user nodes have permission to transmit messages without an uplink grant, the one or more messages indicating an identity of the particular user node and a size of a data message that the particular user node wishes to transmit; determining, from the one or more messages, the identity of the particular user node and the size of the data message; and transmitting, to the particular user node, an uplink grant for transmitting the data message.

In another aspect, a system or apparatus comprises a user node of a wireless network having a RACH (random access) channel and a PUCCH (physical uplink control) channel, the user node configured for: transmitting an SR (scheduling request) message of a pre-assigned duration on the PUCCH; and transmitting a BSR (buffer status report) message on the RACH channel synchronously with the SR message, wherein synchronously comprises having a predetermined time relationship between the SR message and the BSR message.

In another aspect, computer-readable non-transient media are in a wireless network comprising a base station in signal communication with a plurality of user nodes, the media comprising instructions for causing the base station to perform a method, the method comprising: receiving one or more messages from a particular user node of the plurality, on an unscheduled channel operating on a frequency at which user nodes have permission to transmit messages without an uplink grant, the one or more messages indicating an identity of the particular user node and a size of a data message that the particular user node wishes to transmit; determining, from the one or more messages, the identity of the particular user node and the size of the data message; and transmitting, to the particular user node, an uplink grant for transmitting the data message.

In another aspect, a system or apparatus comprises a wireless network comprising a base station in signal communication with a plurality of user nodes, the network configured to perform a method comprising: receiving one or more messages from a particular user node of the plurality, on an unscheduled channel operating on a frequency at which user nodes have permission to transmit messages without an uplink grant, the one or more messages indicating an identity of the particular user node and a size of a data message that the particular user node wishes to transmit; determining, from the one or more messages, the identity of the particular user node and the size of the data message; and transmitting, to the particular user node, an uplink grant for transmitting the data message.

In another aspect, a method is for a user node of a wireless network to transmit a wireless data message to a destination outside the wireless network, the method comprising: transmitting one or more messages, the one or more messages comprising an indicator of a destination address of the data message, an uplink request, and a BSR (buffer status report) message; then receiving, on a PDCCH (physical downlink control channel), an uplink grant for uploading the data message; and then transmitting the data message on a PUSCH (physical uplink shared channel); such that the transmitting of the indicator of the destination address before the data message enables a base station or a core network or both to plan a multi-hop transmission methodology for transmission of the data message to the destination address prior to or contemporaneous with the data message being uploaded by the user node to the base station, wherein the transmission of the data message occurs sooner than in a case where the multi-hop transmission is not planned prior to or contemporaneous with the data message being uploaded.

In another aspect, computer-readable non-transient media is in a base station of a wireless network, the base station in signal communication with a plurality of user nodes and operably connected to a core network that is operably connected to a wider network, the media containing instructions for a method, the method comprising: receiving a first message configured to specify a destination address; after receiving the first message, then receiving a separate data message; and then transferring the data message to the destination address.

In another aspect, a method is for a particular user node, of a plurality of user nodes in signal communication with a base station of a wireless network, to transmit a data message to a destination address, the method comprising: transmitting, to the base station, an address message indicating the destination address, such that the base station is enabled to reserve, before receiving the data message, resources for subsequently transferring the data message, or an extract thereof, to the destination address; and then, after transmitting the address message, transmitting the data message to the base station.

In another aspect, non-transient computer-readable media contain instructions, stored in a memory of a user node of a wireless network, the instructions causing the user node to perform a method comprising: transmitting, on an unscheduled channel or subchannel, a header message including: an indication that a data message is to follow; an indicator of a destination address of the data message; and an identification code of the user node; and then transmitting, on the unscheduled channel, the data message.

In another aspect, a method is for a base station of a wireless network, in signal communication with a plurality of user nodes and operably connected to a core network that is operably connected to a wider network, the method comprising: receiving a first message configured to specify a destination address; after receiving the first message, then receiving a separate data message; and then transferring the data message to the destination address.

In another aspect, a system or apparatus comprises a base station of a wireless network, the base station in signal communication with a plurality of user nodes and operably connected to a core network that is operably connected to a wider network, the base station configured to perform a method comprising: receiving a first message configured to specify a destination address; after receiving the first message, then receiving a separate data message; and then transferring the data message to the destination address.

In another aspect, a system or apparatus comprises a user node of a wireless network, the user node configured to transmit a wireless data message to a destination outside the wireless network according to a method comprising: transmitting one or more messages, the one or more messages comprising an indicator of a destination address of the data message, an uplink request, and a BSR (buffer status report) message; then receiving, on a PDCCH (physical downlink control channel), an uplink grant for uploading the data message; and then transmitting the data message on a PUSCH (physical uplink shared channel); such that the transmitting of the indicator of the destination address before the data message enables a base station or a core network or both to plan a multi-hop transmission methodology for transmission of the data message to the destination address prior to or contemporaneous with the data message being uploaded by the user node to the base station, wherein the transmission of the data message occurs sooner than in a case where the multi-hop transmission is not planned prior to or contemporaneous with the data message being uploaded.

In another aspect, a method is for a wireless network to transfer a data message, the network comprising a base station in signal communication with a plurality of user nodes and operably connected to a core network that is operably connected to a wider network, the method comprising: receiving a first message configured to specify a destination address; after receiving the first message, then receiving a separate data message; and then transferring the data message to the destination address.

In another aspect, non-transient computer-readable media are in a wireless network comprising a base station in signal communication with a plurality of user nodes and operably connected to a core network that is operably connected to a wider network, the media containing instructions for a method comprising: receiving a first message configured to specify a destination address; after receiving the first message, then receiving a separate data message; and then transferring the data message to the destination address.

In another aspect, a system or apparatus comprising a wireless network comprising a base station in signal communication with a user node, the network configured to transmit a wireless data message to a destination outside the wireless network according to a method comprising: transmitting, by the user node, one or more messages, the one or more messages comprising an indicator of a destination address of the data message, an uplink request, and a BSR (buffer status report) message; then receiving, on a PDCCH (physical downlink control channel), an uplink grant for uploading the data message; and then transmitting the data message on a PUSCH (physical uplink shared channel); such that the transmitting of the indicator of the destination address before the data message enables a base station or a core network or both to plan a multi-hop transmission methodology for transmission of the data message to the destination address prior to or contemporaneous with the data message being uploaded by the user node to the base station, wherein the transmission of the data message occurs sooner than in a case where the multi-hop transmission is not planned prior to or contemporaneous with the data message being uploaded.

In another aspect, a non-transitory computer readable medium is within a base station of a wireless network, the base station in signal communication with a plurality of user nodes and the base station processing messages from the user nodes according to an initial QoS (quality of service), the medium containing instructions that when executed cause the base station to perform a method comprising: receiving, from a particular user node, a temporary QoS message specifying a particular priority level; then receiving, from the particular user node, one or more additional messages comprising, at least, a data message; and processing the one or more additional messages according to the temporary QoS or the specified priority level or both; then processing a subsequent message according to the initial QoS.

In another aspect, non-transient computer-readable media are in a base station of a wireless network, the base station in signal communication with a plurality of user nodes, the media containing instructions causing the base station to perform a method comprising: receiving, from a particular user node of the plurality, a message comprising a temporary QoS (quality of service) request; determining that the temporary QoS message requests a temporary QoS level different from a default QoS level of the particular user node; and processing, at least in part according to the temporary QoS level, one or more messages related to the particular user node after the temporary QoS request message, the one or more messages comprising at least a data message, wherein the processing with the temporary QoS level is at least in part related to the transmission of the one or more messages to a destination; such that the default QoS level of the particular user node, after the data message has been processed, is the same QoS level as before the temporary QoS request was transmitted.

In another aspect, a method comprises: receiving, by a base station of a wireless network, a temporary QoS (quality of service) request message from a user node of the wireless network, the temporary QoS request message configured to request that a specified data message be processed according to an adjusted QoS level different from a default QoS level of the user node; then receiving, by the base station, the specified data message; processing, by the base station, the specified data message according to the adjusted QoS level; and processing a subsequent data message received by the base station according to the default QoS level of the user node.

In another aspect, a method comprises: transmitting, by a user node of a wireless network, a temporary QoS (quality of service) request message configured to request that a subsequent specified data message be processed according to an adjusted QoS level different from a default QoS level of the user node; and then transmitting, by the user node, the specified data message, such that a base station of the wireless network processes the specified data message at least in part according to the adjusted QoS level, without changing the default QoS level associated with the user node.

In another aspect, a system or apparatus comprises a base station of a wireless network, the base station in signal communication with a plurality of user nodes and the base station processing messages from the user nodes according to an initial QoS (quality of service), the base station configured to perform a method comprising: receiving, from a particular user node, a temporary QoS message specifying a particular priority level; then receiving, from the particular user node, one or more additional messages comprising, at least, a data message; and processing the one or more additional messages according to the temporary QoS or the specified priority level or both; then processing a subsequent message according to the initial QoS.

In another aspect, non-transient computer-readable media are in a user node of a wireless network, the media containing instructions for a method comprising: transmitting a temporary QoS (quality of service) request message configured to request that a subsequent specified data message be processed according to an adjusted QoS level different from a default QoS level of the user node; and then transmitting, by the user node, the specified data message, such that a base station of the wireless network processes the specified data message at least in part according to the adjusted QoS level, without changing the default QoS level associated with the user node.

In another aspect, a system or apparatus comprises a user node of a wireless network, the user node configured to transmit a temporary QoS (quality of service) request message configured to request that a subsequent specified data message be processed according to an adjusted QoS level different from a default QoS level of the user node; and then to transmit, by the user node, the specified data message, such that a base station of the wireless network processes the specified data message at least in part according to the adjusted QoS level, without changing the default QoS level associated with the user node.

In another aspect, a method is for a wireless network, comprising a base station in signal communication with a plurality of user nodes, to provide a temporary QoS adjustment to a user node of the plurality, the method comprising: receiving, from a particular user node, a temporary QoS message specifying a particular priority level; then receiving, from the particular user node, one or more additional messages comprising, at least, a data message; and processing the one or more additional messages according to the temporary QoS or the specified priority level or both; then processing a subsequent message according to the initial QoS.

In another aspect, computer-readable non-transient media are in a wireless network comprising a base station in signal communication with a plurality of user nodes, the media containing instructions causing the network to perform a method comprising: receiving, from a particular user node of the plurality, a message comprising a temporary QoS (quality of service) request; determining that the temporary QoS message requests a temporary QoS level different from a default QoS level of the particular user node; and processing, at least in part according to the temporary QoS level, one or more messages related to the particular user node after the temporary QoS request message, the one or more messages comprising at least a data message, wherein the processing with the temporary QoS level is at least in part related to the transmission of the one or more messages to a destination; such that the default QoS level of the particular user node, after the data message has been processed, is the same QoS level as before the temporary QoS request was transmitted.

In another aspect, a system or apparatus comprises a wireless network comprising a base station in signal communication with a plurality of user nodes, the base station configured to process messages from the user nodes according to an initial QoS (quality of service), the base station further configured to perform a method comprising: receiving, from a particular user node, a temporary QoS message specifying a particular priority level; then receiving, from the particular user node, one or more additional messages comprising, at least, a data message; and processing the one or more additional messages according to the temporary QoS or the specified priority level or both; then processing a subsequent message according to the initial QoS.

In another aspect, non-transient computer-readable media are in a base station, or in a core network operably connected to the base station, the base station in signal communication with a plurality of user nodes of a wireless communication network, the media containing instructions for causing the base station or core network to perform a method comprising: recording, in the memory, a database comprising addresses and index values, each address associated with one of the index values, respectively; receiving, from a particular user node of the plurality, one or more messages comprising a data message and a particular index value; determining, from the database, a particular address associated with the particular index value; and transferring the data message, or a message derived therefrom, to the particular address.

In another aspect, a method is for transferring a wireless message in a wireless network, the method comprising: receiving the wireless message from a user node of the wireless network, the wireless message including an index value; determining, based at least in part on the index value, a destination address; and transferring the message to the destination address.

In another aspect, non-transient computer-readable media are in a base station or core network of a wireless communication network, wherein: the media contains a database comprising a plurality of addresses, at least one address associated with a respective index value; and wherein the base station or core network is configured to receive a wireless message from a user node, the wireless message including a particular index value, and to determine, from the database, a particular address associated with the particular index value, and to cause the message to be transferred to the particular address.

In another aspect, a method is for determining a destination address of a wireless message, comprising: receiving, by a base station, a wireless message comprising a particular index value; and determining, by the base station or a core network operably connected to the base station, the destination address, according to a database comprising a plurality of addresses, at least some of the plurality of addresses corresponding to a respective index value.

In another aspect, a system or apparatus comprising a base station of a wireless network, and a core network operably connected to the base station, the base station in signal communication with a plurality of user nodes of the wireless network, the base station configured to perform a method comprising: recording, in the memory, a database comprising addresses and index values, each address associated with one of the index values, respectively; receiving, from a particular user node of the plurality, one or more messages comprising a data message and a particular index value; determining, from the database, a particular address associated with the particular index value; and transferring the data message, or a message derived therefrom, to the particular address.

In another aspect, a method is for a user node of a wireless network comprising a base station, the method comprising: transmitting a wireless message to the base station, the wireless message including an index value associated with an intended recipient of the wireless message.

In another aspect, non-transient computer-readable media are in a user node of a wireless communication network, wherein: the media contain a listing comprising a plurality of recipients, at least one recipient associated with a respective index value; and wherein the user node is configured to transmit a wireless message to a recipient, the wireless message including a particular index value associated with a particular recipient in the listing.

In another aspect, a system or apparatus comprises a user node of a of a wireless communication network, the user node containing a listing comprising a plurality of recipients, at least one recipient associated with a respective index value; and wherein the user node is configured to transmit a wireless message to a recipient, the wireless message including a particular index value associated with a particular recipient in the listing.

In another aspect, non-transient computer-readable media are in a wireless network comprising a base station, a core network operably connected to the base station, and a plurality of user nodes, the media containing instructions for causing the network to perform a method comprising: recording, in a memory, a database comprising addresses and index values, each address associated with one of the index values, respectively; receiving, from a particular user node of the plurality, one or more messages comprising a data message and a particular index value; determining, from the database, a particular address associated with the particular index value; and transferring the data message, or a message derived therefrom, to the particular address.

In another aspect, a system or apparatus comprises a wireless network comprising a base station, or in a core network operably connected to the base station, the base station in signal communication with a plurality of user nodes of a wireless communication network, the network configured to perform a method comprising: recording, in the memory, a database comprising addresses and index values, each address associated with one of the index values, respectively; receiving, from a particular user node of the plurality, one or more messages comprising a data message and a particular index value; determining, from the database, a particular address associated with the particular index value; and transferring the data message, or a message derived therefrom, to the particular address.

This summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

These and other embodiments are described in further detail with reference to the figures and accompanying detailed description as provided below.

BRIEF DESCRIPTION OF THE DRAWINGS

FIG. 19 is a schematic showing an exemplary embodiment of a resource block including a message and noise, according to some embodiments.

FIG. 29 is a chart showing an exemplary embodiment of a code for a recipient database, according to some embodiments.

Like reference numerals refer to like elements throughout.

DETAILED DESCRIPTION

Figure 1A:
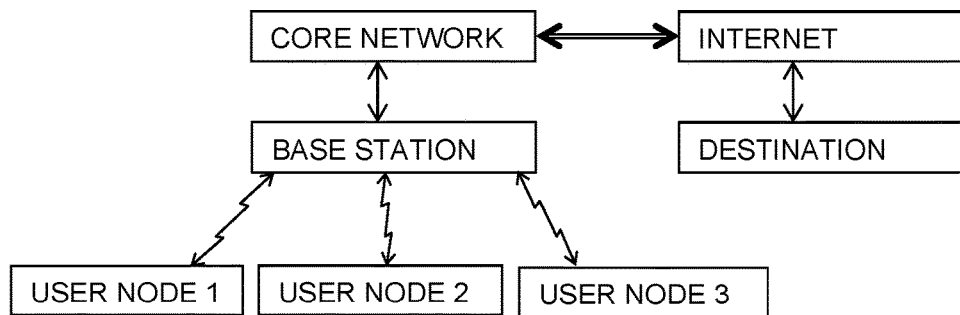
FIG. 1A is a schematic showing communication between user nodes, a base station, core network, the Internet, and a destination address, according to prior art.

Disclosed herein are systems and methods for reducing delays and providing low-latency communication in 5G and future 6G networks. Systems and methods disclosed herein (the "systems" and "methods", also occasionally termed "embodiments" or "arrangements", generally according to present principles) can provide urgently needed wireless communication protocols to reduce access delays, provide low-latency communication, and provide easier network access in managed networks such as 5G and future 6G networks, according to some embodiments. The protocols may include pre-grant information uploads that enable a user node of a network to deliver information to a base station before receiving an uplink grant from the base station. Other protocols include arranging scheduling requests to avoid collisions at high traffic density. Further protocols specify how a destination address can be communicated to enable a core network to arrange a timely transfer. A user-specific address database maintained by the network is also disclosed. Some embodiments include a request for temporary increase in priority, to allow a specific data message to be transmitted without delay when necessary. Artificial intelligence (AI) systems and methods are disclosed that may provide improved network performance including reduced delays and greater throughput, according to some embodiments. In some implementations, a combination of multiple disclosed techniques, or all of the disclosed techniques, may be employed. The methods and procedures disclosed herein may be implemented as a software upgrade rather than involving hardware development, and therefore may be applied at low cost and then modified at low cost, according to some embodiments.

A prior-art wireless network generally includes a base station (or gNB, generation Node B, eNB, evolved Node B, AP, access point, or the like) in signal communication with a plurality of user nodes (or UE, user equipment, terminals, user devices, or the like). In a managed network such as 5G (fifth-generation wireless technology), a user node wishing to transmit a data message is required to first send an SR (scheduling request) message at a pre-assigned time called an "SR opportunity" herein. The base station then sends a grant and the user node uploads a BSR (buffer status report) message or other message indicating the size of the data message, so that the base station can plan a suitable time for the data message to be uploaded. The base station then sends a second grant to the user node indicating when, and on what frequency or subchannel or subchannels etc., the user may transmit the data message. The user node then transmits the data message as instructed. An SR message is generally a single-bit signal encoded in one symbol. The base station may assign particular, periodically repeating, SR opportunities to a user node. For example, the base station can "assign" SR opportunities to a user node by transmitting a message such as an RRC (radio resource control) message to the user node indicating when such SR opportunities are available and on what frequencies, usually the frequency of the PUCCH (physical uplink control channel). When the user node wishes to transmit a message, the user node waits for its next periodic SR opportunity and transmits the SR message on the PUCCH channel at that time. The base station detects the SR message and, based on the time and frequency, determines which node transmitted the SR message. The base station can assign further SR opportunities to other nodes in the network. Any user nodes that lack assigned SR opportunities can initiate communication on the RACH (random access) channel.

Unfortunately, this arrangement is extremely wasteful since most of the SR opportunities are unused. In addition, a user node wishing to transmit must wait a time, often a very significant time, until its next SR opportunity recurs, an unacceptable delay for a low-latency application. The base station could assign more frequent SR opportunities to reduce the average waiting time, but that would waste even more resources. The base station may assign multiple user nodes to "share" the same SR resources, thereby multiplying the number of SR opportunities that each user node may access. However, the base station would not know which of the sharing user nodes had requested the grant. In addition, sharing resources may lead to collisions between user nodes transmitting at the same time. The user nodes may try again upon the next SR opportunity, and therefore they collide again, likely continuing to collide until they exhaust their allocated number of attempts, and then must perform a backoff delay. In some cases, the collision may be resolved by further signaling to identify one of the nodes, but then the other one of the competing user nodes is generally forced to start all over later.

Another bottleneck is the destination address, which is generally encoded in the data message. The base station must receive the data message and decode it to find the destination address, which takes time to upload and represents a burden for a busy base station processor. In addition, the data message generally must be transferred to the recipient in a series of "hops" or handoffs between stations, and time is required to set up that arrangement and reserve bandwidth for the data message.

Disclosed below are systems and methods designed to address these and other limitations to rapid uplink access and easy network communication, according to some embodiments. In some embodiments, the base station may assign multiple user nodes to share certain SR opportunities, and may assign different modulation states to each of the sharing partners, so that the base station may then receive an SR message and determine, from the modulation, which user node requests an uplink grant. In other embodiments, the base station may employ a scrambling code to cause each user node to have different sharing partners upon each SR opportunity, so that any collisions may be rapidly resolved. It may be important for the base station to determine the identity of a user node requesting service so that the base station can provide an appropriate level of service, according to the user node's priority, in scheduling and processing the subsequent messages. As mentioned, the base station may assign the modulation state, scrambling code, etc. to each user node by transmitting unicast messages to the user node such as RRC messages or the like.

Following a collision between SR messages, the colliding user nodes may try again after a variable delay, for which multiple versions are disclosed, in addition to protocols that resolve the collision without delays. For even faster uplink access, some embodiments of the systems and methods may include "pre-grant" information, which is information that a user node may transfer to the base station prior to receiving an uplink grant, thereby avoiding some of the delays involved in current 5G access procedures. For example, a BSR (buffer state report) message may be transmitted in place of the SR message, thereby avoiding a complete message handshake. Alternatively, a BSR message may be transmitted on a random access channel at the same time, or within a time interval, of the SR message on the PUCCH channel, thereby providing both the identity information and the size information pre-grant. Some embodiments further include transmitting the destination address, or a code representing it, or a QoS (quality of service) message requesting special handling, or other pre-grant message, on the random access channel or other unscheduled, monitored channel which is allocated by the base station for user-initiated messages. The base station may then receive the SR message and the time-synchronized pre-grant messages on the random access channel and thereby avoid delays involved in acquiring that information separately. Further embodiments may include transmitting messages on a random access channel, or other monitored but unscheduled channel that the base station may allocate, such as sending the data message along with a header identifying the transmitting node, without waiting for an SR opportunity. The header and data message may contain all the information needed to transfer the data message to the recipient without further delay, thereby providing very low latency in some embodiments. For even faster access, the user node may transmit the header on the random access channel (or other channel) even before the data message is ready to send, by timing the transmission so that the header messages will be finished when the data message becomes ready, thereby providing very low latency.

As used herein, a channel or subchannel is "monitored" if the base station is configured to detect messages transmitted on the channel, and it is "unscheduled" if the base station does not require permission or provide grants for nodes to transmit on the channel. The random access channel is a monitored but unscheduled channel. In addition, the base station may allocate other channels or subchannels for various purposes such as random access, and may indicate that those channels are unscheduled, and may indicate which user nodes may transmit on each such channel. As used herein, a message is transmitted "pre-grant" if the message is transmitted without an associated uplink grant. A message is "user-initiated" if the message is transmitted at a time of the user's choosing, usually on an unscheduled channel. Random access channels are referred to as RACH which generally implies an abstract channel concept, as opposed to PRACH meaning the physical random access channel. However, the network may assign numerous physical channels to be random access operationally. Therefore, herein, all such channels are termed RACH to encompass any and all monitored unscheduled communication channels in the network.

The systems and methods may further include an algorithm, such as an AI (artificial intelligence) algorithm, operated by the base station (or by a core network connected to the base station), configured to assist in decision-making about network operations. In some embodiments, such an algorithm may provide improved network operation by determining how SR opportunities are allocated, how many random access channels are available and which user nodes may access them, which user nodes may be given special services such as using a compact code in place of bulky destination addresses, or requesting a temporary change in priority for a particular data message, for example. The AI algorithm may be based on a QoS or other priority measure of the user node and/or its waiting message, as well as an administrative status of the user node, a fee basis or subscription level of the user node, the current traffic density, the length of the planned data message, the current traffic density, and other factors.

Advanced wireless communication systems implementing embodiments of the systems and methods disclosed herein may obtain fewer and shorter delay times for transmitting a data message, leading to reduced latency and fewer message failures, according to some embodiments. The pre-grant information can inform the base station of the ready node's identity even when the SR message is shared among multiple user nodes, while parallel signaling of the BSR message (or equivalent) may enable the base station to skip a complete grant-response cycle for uplink messaging. Users may request special handling, particularly for critical, low-latency messages. The base station may prepare and maintain a database of addresses for each user node, thereby allowing the user nodes to specify the recipient faster and more conveniently than with the full MAC address. As the 5G rollout proceeds and the next generation 6G technologies are developed, users are going to demand communication improvements such as those disclosed here.

Turning now to the figures, FIG. 1A is a schematic showing communication between user nodes, a base station, core network, the Internet, and a destination address, according to prior art. Radio signals are shown as jagged lines, local wired signals as solid arrows, and long-distance communication (such as fiber optic and microwave beams) as a double arrow. A network such as a cell or LAN (local area network) typically includes a base station in radio signal communication with a plurality of user nodes and operably connected to a core network that provides administration and other non-radio services including interface to a wider network such as the Internet. In the figure, user nodes transmit wireless messages to the base station, which passes the message, or a subset, to the core network, which reconfigures the message as a "relay" message for transfer in the wider network, eventually arriving at the intended destination.

Figure 1B:
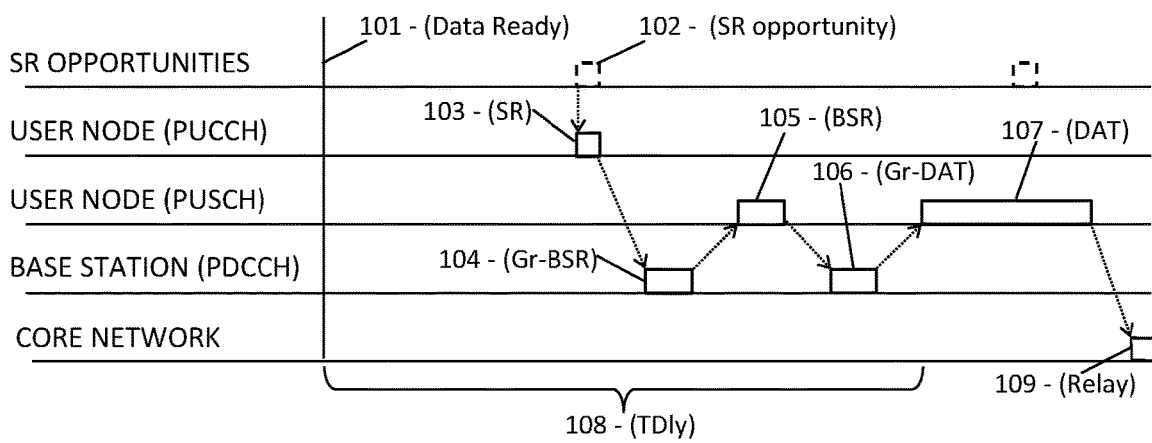
FIG. 1B is a sequence chart showing a prior-art procedure for obtaining uplink access.

FIG. 1B is a sequence chart showing a prior-art procedure for obtaining uplink access in 5G. A sequence chart is a chart with time along the horizontal axis and one or more items shown sequentially along lines representing different signals or channels, similar to an oscilloscope screen or a logic analyzer display. Simultaneity is shown by a vertical dotted arrow and causation or other time synchronization is shown as a tilted dotted arrow, accounting for propagation delays or electronic delays or the like. In FIG. 1, the starting time is indicated by a vertical line 101 at which a data message becomes ready to transmit, or alternatively the BSR register becomes filled with the ready data. The first horizontal line shows SR opportunities 102, rendered in dash since they are not real signals but merely prearranged times at which nodes may transmit SR messages. The second line shows signals of the user node on the PUCCH control channel, the next line shows signals from the user node on the PUSCH (physical uplink shared channel), the next line shows signals from the base station on the PDCCH (physical downlink control channel), and the last line shows signals of the core network. Although signals are shown as time-like rectangles in the chart, each message may be transmitted in multiple subchannels or frequencies at the same time. For example, a message of twelve symbols may be transmitted in twelve simultaneous subchannels. Such a message would occupy a very short time interval corresponding to a single symbol duration. For clarity, however, sequence charts generally show messages as squares or time-like rectangles.

After the Data Ready time 101, the user node waits until an SR opportunity 102 comes around, and then transmits a scheduling request SR 103 at the time of one of the SR opportunities 102. The SR message 103 is a single message symbol in this example, although in other cases a longer SR message of two or more symbols can be arranged. The SR message 103 prompts the base station to download a grant 104 labeled Gr-BSR, enabling the user node to transmit a BSR message and possibly other short related messages, but usually not long enough to accommodate a data message unless the data message is quite short. In the depicted case, the user node responds to grant Gr-BSR 104 by transmitting a BSR message 105 on the PUSCH uplink shared channel, thereby indicating the size of the planned data message. The base station then schedules resources for the data message and issues another grant 106 labeled Gr-DAT for the data message. This enables the user node to transmit the data message DAT 107 on the PUSCH channel. The base station then transfers the data message 107 to the core network, which prepares a relay message 109 (partially visible) from the content of the data message 107, and passes it to other networks in a multi-hop relay process until the relay message 109 reaches the intended recipient. The total transmission delay (TDly) 108, from Data Ready 101 to the transmission of the DAT message 107, is indicated as 108. As used herein, "transmitting" refers to wireless radio communication between a user node and a base station, whereas "transferring" refers to data handoff between stations or core networks by non-radio means (usually), such as coaxial or fiber-optic cable, microwave beams, and the like.

Figure 2A:
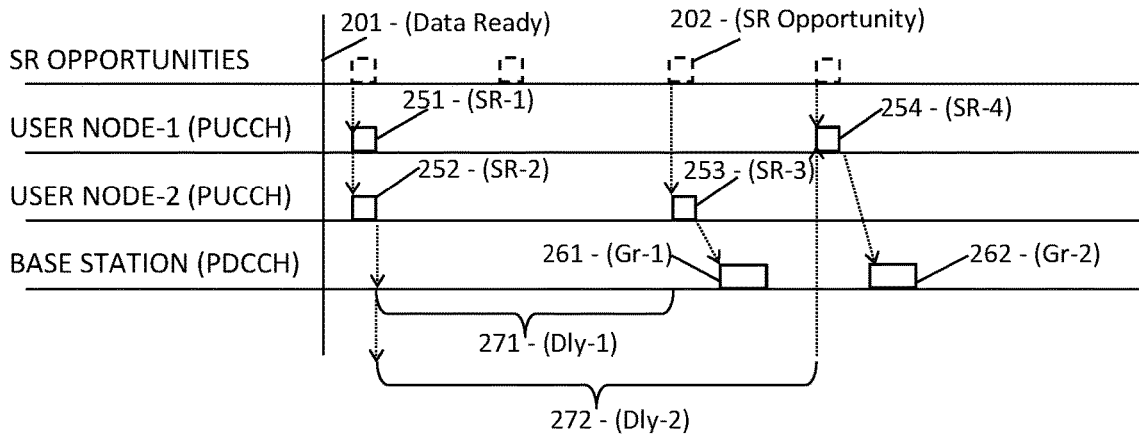
FIG. 2A is a sequence chart showing an exemplary embodiment of a procedure for deconflicting scheduling requests, according to some embodiments.

FIG. 2A is a sequence chart showing an exemplary embodiment of a procedure for resolving collisions between SR messages, according to some embodiments of the systems and methods. The horizontal lines show the SR opportunities 202, signals of a user node-1 on the PUCCH uplink control channel, signals of another user node-2 on the same channel, and signals of the base station, versus time starting with a Data Ready time 201. Here the two nodes user node-1 and user node-2 both have data ready to transmit and therefore they both transmit two SR messages SR-1 and SR-2, 251 and 252, upon the same SR opportunity 202 (that is, at the same time on the same frequency). The SR messages therefore interfere, rendering them unintelligible, and therefore the base station disregards the signal. (As used herein, a message is "disregarded" if it is not further substantively employed in the processing or transmitting of messages.) Upon failing to receive an uplink grant, the two nodes may transmit again after a variable backoff delay, shown as Dly-1 271 for user node-1 and Dly-2 272 for user node-2. Since Dly-1 and Dly 2 are different, the second transmissions SR-3 and SR-4 (253 and 254) occur upon different SR opportunities, and therefore they do not collide a second time, and therefore the base station accepts them by transmitting uplink grants Gr-1 and Gr-2 (261 and 262) to the two user nodes. As used herein, a user node transmits an SR message, or other message, "in" or "on" an SR opportunity if the user node transmits the message at the time and frequency allocated for the SR opportunity. Likewise, a base station receives a message "at" or "on" an SR opportunity if the message is received at the time and frequency allocated for an SR opportunity. Hence the base station, upon receiving the message at the expected time and frequency, may interpret the message as an SR request.

The two backoff delays 271-2 may be calculated by any suitable method that is expected to provide different delay values for the two user nodes. For example, the backoff delays 271-2 may be calculated using a function that takes, as input, a code or number unique to each respective user node, such as its C-RNTI (cell radio network temporary identification) code or its MAC (medium access control) address. The function may also take, as input, another value which varies pseudorandomly but is the same for the two user nodes, such as the time of day or the system clock tick count, for example. The pseudorandom input may provide that each node does not always calculate the same backoff delay, but rather gets different delays at different times, for greater fairness. The function may then take the identity code and the pseudorandom value as inputs, and may calculate from them, as output, a number of microseconds or symbol times or SR opportunities or other measure of delay that each node must wait before retransmitting. Alternatively, the output may be a pointer or index referring to a predetermined table of delay values. The function may also take, as input, conditions such as the current wireless traffic density, the current message collision rate or message failure rate, the priority of the user node, and/or other factors that may influence the choice of delay values. For example, in heavy traffic or in conditions where the message failure rate is high, the function may produce longer delay times, and when traffic is light the function may provide shorter delays on average. In addition, the function may produce longer delay times for long data messages and short delay times for a brief planned data message. The function may produce shorter delays for high-priority user nodes, or none at all for an emergency user.

The procedure of FIG. 2A may be implemented as a system or apparatus, a method, or instructions in non-transient computer-readable media for causing a computing environment, such as a user node, a base station, or other signally coupled component of a wireless network, to implement the procedure.

Figure 2B:
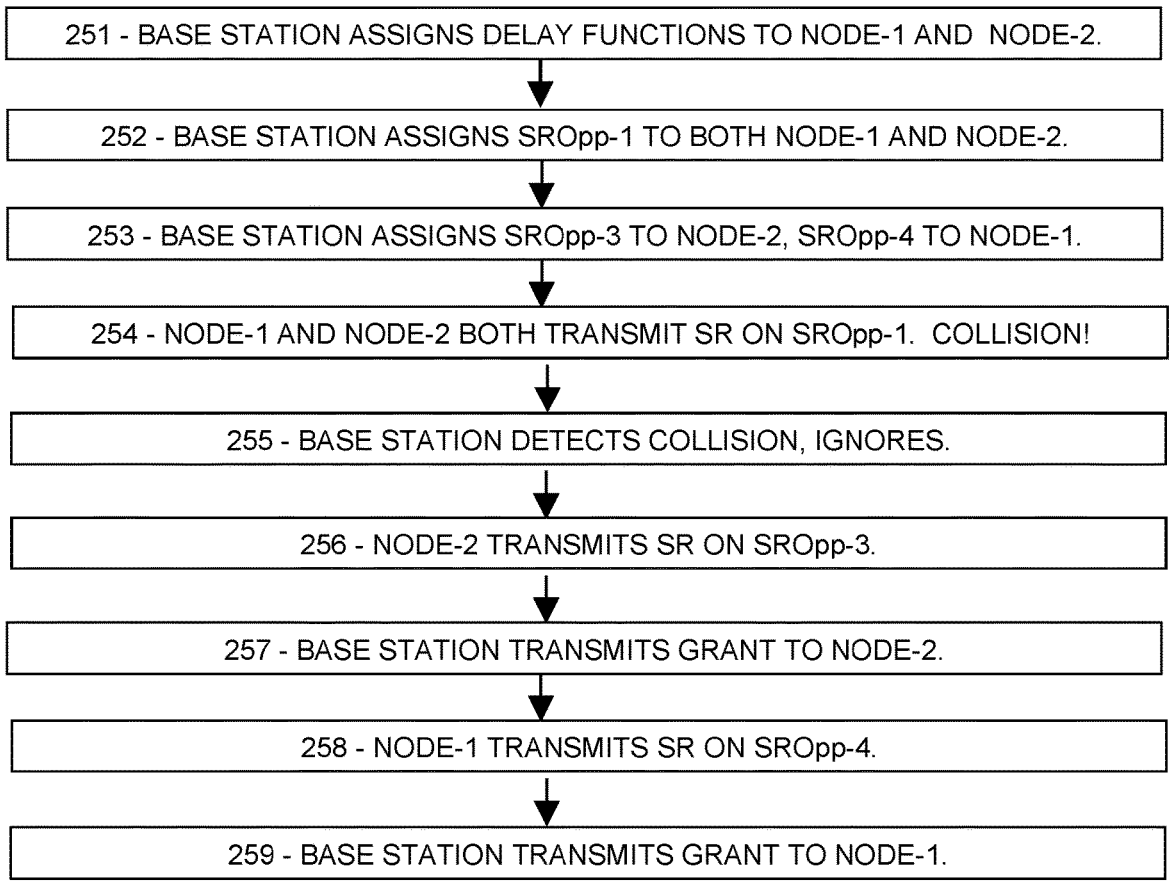
FIG. 2B is a flowchart showing an exemplary embodiment of a method for deconflicting scheduling requests, according to some embodiments.

FIG. 2B is a flowchart showing an exemplary embodiment of a method for deconflicting scheduling requests, according to some embodiments. In this example, the base station assigns multiple user nodes to the same SR opportunities, for faster uplink access. The base station also assigns a different delay pattern for each user node to use after a collision, thereby resolving the collision.

At 251, a base station of a wireless network assigns specific delay functions to the user nodes Node-1 and Node-2 respectively. Node-1 and Node-2 can use the function to calculate post-collision delays according to their own unique identity code, a pseudorandom input such as the network clock, the traffic density or collision rate, the priorities of the user nodes, and other factors.

At 252, the base station assigns an SR opportunity SROpp-1 to both Node-1 and Node-2. Thus Node-1 and Node-2 "share" the same SR opportunity SROpp-1. At 253, the base station assigns a later set of SR opportunities to the nodes: SROpp-3 is assigned to Node-2 and SROpp-4 to Node-1, which are different SR opportunities. Thus, the two nodes do not share SR opportunities when they re-transmit. If they collide in SROpp-1, they will not collide when they try again because SROpp-3 is different from SROpp-4, thereby resolving the collision.

The base station may assign each SR opportunity and modulation state explicitly for each user node, although that may involve downloading large tables to the nodes. Alternatively, and more compactly, the base station may assign a different periodicity in the SR opportunities to the two nodes. SR opportunities are typically assigned with a periodicity or interval between successive SR opportunities. If the two nodes share one SR opportunity, they will not share the subsequent SR opportunity due to the difference in their periodicities. Therefore, if they collide in one SR opportunity, they will probably not collide upon the re-try, due to their different periodicities. As a further alternative, the base station may assign a scrambling code to each user node, the scrambling code configured to determine different SR opportunities for each user node, and may thereby provide that the user nodes have different sharing partners upon each SR opportunity.

In most networks, a sufficient number of SR opportunities are provided that most of the SR opportunities are blank, that is, not employed for an SR message. Upon receiving an SR message, the base station can determine which user node wants to talk according to the SR opportunity of the SR message, and can provide an uplink grant to that ready node. However, in this example, at 254, both Node-1 and Node-2 happen to have a data message ready to send when the first SR opportunity SROpp-1 occurs, and therefore they both transmit SR messages in the same SR opportunity, causing a message collision. The base station can generally determine from the interfering messages that more than one node seeks an uplink grant, and that the ready nodes belong to the subset that shares SROpp-1 according to the time and subchannel on which they are received by the base station. However, it is generally not possible to separate the two short messages transmitted at the same time in the same frequency since their RF waves interfere. The base station therefore does nothing at 255. Alternatively, the base station may interpret the interfering signals as indicating a modulation state equal to the sum or average of the Node-1 and Node-2 modulation states, and may send an unexpected grant to whichever user node is associated with that combined modulation state. In each case, Node-1 and Node-2 both fail to receive uplink grants, and therefore they transmit again upon their next respective SR opportunities. At 256, Node-2 transmits its SR message again on its SROpp-3 instance, and at 257 the base station responds with a grant to Node-2. Then at 258, Node-1 transmits its SR message upon its next SR opportunity which is SROpp-4 (different from SROpp-3) so these two SR messages occur at different times and do not collide a second time. At 259 the base station receives Node-1's SR message and provides Node-1 with an uplink grant. Thus, both nodes have received grants in this manner. An advantage of assigning multiple user nodes to share a particular SR opportunity may be that fewer resource elements are consumed by the SR opportunities than if each user node were assigned its SR opportunities exclusively. In addition, each user node may have access to multiple shared SR opportunities, and therefore would not have to wait as long for the next SR opportunity to occur, than if each node had only exclusive SR opportunities (assuming the same amount of resources dedicated to SR opportunities). Therefore, assigning multiple user nodes to share each SR opportunity can save otherwise wasted resources and can also provide faster uplink access than exclusively assigned SR opportunities, according to some embodiments.

An advantage of assigning a different periodicity to each user node's SR opportunities (or of providing a scrambling code or other formula for varying each user node's assigned SR opportunities) may be that in the subset of user nodes sharing each SR opportunity, each user node may have different sharing partners upon each SR opportunity, so that two user nodes that share one SR opportunity may be unlikely to share a subsequent SR opportunity. Another advantage may be that collisions between SR messages in one SR opportunity may be quickly and automatically resolved when the two competing nodes re-transmit their SR messages in their next (different) assigned SR opportunities.

The procedure of FIG. 2B may be implemented as a system or apparatus, a method, or instructions in non-transient computer-readable media for causing a computing environment, such as a user node, a base station, or other signally coupled component of a wireless network, to implement the procedure.

Figure 3A:
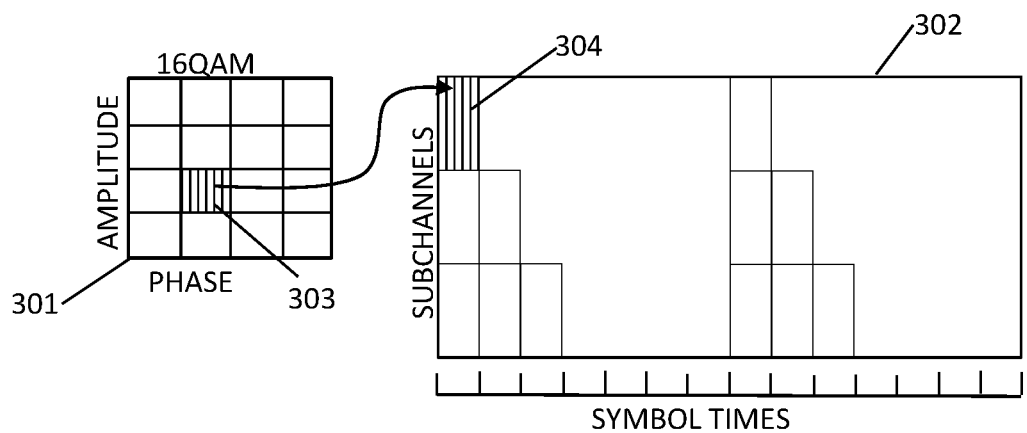
FIG. 3A is a schematic showing an exemplary embodiment of a scheduling request message modulated to identify the ready node, according to some embodiments.

FIG. 3A shows an exemplary embodiment of an SR message in which the ready node is identified by the modulation of the SR message, according to some embodiments. Distinct modulation of each user node's SR messages may thereby enable the base station to identify each user node's request according to the modulation state of the SR message. Multiple nodes may then share the same SR opportunities, each with a different modulation state assigned. Each user node may be identified according to the timing, frequency, and modulation the SR message. Since each SR opportunity is shared among N user nodes, each user node can then access the SR opportunities N times more frequently than otherwise, without wasting additional resources, N being the number of distinct modulation states in the modulation table.

To illustrate this procedure, FIG. 3A shows a modulation table 301 and a resource block 302. The modulation table 301 in this case is 16QAM (quadrature amplitude modulation with 16 distinct modulation states). Each state in the modulation table 301 is generated by one of the amplitude levels and one of the phase levels respectively, as represented by each of the positions in the modulation table 301. A particular modulation state 303 has been assigned to a particular user node, the modulation state indicated by a vertical hatch fill. Up to 15 other nodes may be assigned to the other modulation states of the modulation table 301 such that no two user nodes sharing the same SR opportunity are assigned the same modulation state. Those user nodes can then share the same SR opportunities, since their SR messages will be readily distinguished according to their individual modulation states.

As used herein, a modulation state or an SR opportunity may be "assigned" to a user node by the base station, which transmits a message such as an RRC message to the user node specifying the time and frequency of the SR opportunity, and/or the modulation state to use for SR requests in that SR opportunity. Alternatively, the base station may assign multiple SR opportunities to a user node, along with associated modulation states, by transmitting a message to the user node specifying a formula or algorithm or code by which the user node may calculate the times and frequencies of its assigned SR opportunities, and the modulation states associated with them.

The resource block 302 consists of a number of subchannels in frequency and a number of intervals in time. The intervals are called "symbol times" herein, each symbol time being the width of a single symbol in time. A resource element is a time and a frequency during which a user node may transmit a single modulated symbol of information. Although resource blocks usually have twelve subchannels, for clarity only three subchannels are shown. The resource block 302 includes fourteen symbol times, representing one slot, or two half-slots. Each subchannel and symbol time together define one resource element. The resource block 302 includes several SR opportunities assigned to various nodes in the network, shown as rectangles, each rectangle in the resource block 302 being a separate SR opportunity. The rest of the resource block 302 (outside the rectangles) is not assigned for SR opportunities, but is used for other purposes such as downlink signaling and uplink data transfer.

The particular user node, before transmitting a data message, must first transmit an SR message using its assigned modulation state 303 upon one of its assigned SR opportunities. For example, the resource element 304 has been assigned as an SR opportunity for all sixteen nodes of the modulation table 301, including the particular user node that has modulation state 303. When the particular user node wants to send a data message, it waits for the particular resource element 304 that serves as its SR opportunity, and then transmits an SR message using its assigned modulation state 303, as indicated by an arrow. The particular resource element 304 is shown with vertical hatch fill, indicating that the particular user node has transmitted an SR message at that time using the particular node's assigned modulation state 303. The base station can detect the SR message, and can determine from the time and subchannel of the particular resource element 304, and the particular modulation 303, which of the user nodes has a data message ready to send. The base station can then download a grant to the particular user node, receive a BSR message, send another grant, and receive the full DAT message that the particular node wishes to send.

An advantage of assigning the same resource element 304 to a plurality of user nodes, each user node being assigned a different modulation state in the modulation table 301, may be that the SR opportunities may be provided more frequently than for an unshared SR opportunity. Another advantage may be that fewer resources are wasted since it is more likely that a particular SR opportunity will be occupied when multiple user nodes can access it. An advantage of assigning different modulation states to the various user nodes sharing the same SR opportunities may be that the ready node may be identified according to the time, frequency, and modulation of the SR message, thereby saving time and resolving ambiguities before any grants are downloaded. For example, the base station, knowing which user node seeks a grant and also knowing the QoS or priority of that user node, may decide to delay the grant, or may accelerate the access process for a high-priority or emergency type user node. Providing the identity information in the form of the SR message modulation state, may thereby allow the base station to better manage the communications when multiple user nodes share the same SR opportunities.

The procedure of FIG. 3A may be implemented as a system or apparatus, a method, or instructions in non-transient computer-readable media for causing a computing environment, such as a user node, a base station, or other signally coupled component of a wireless network, to implement the procedure.

Figure 3B:
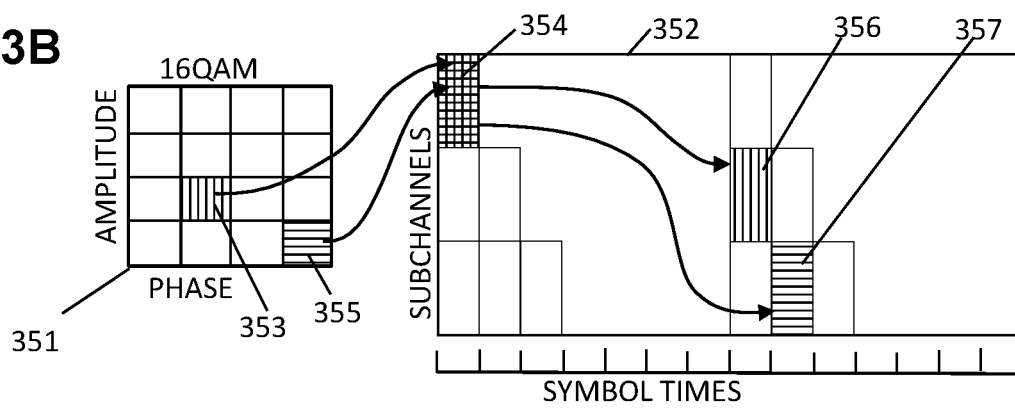
FIG. 3B is a schematic showing an exemplary embodiment of a procedure for mitigating collisions, according to some embodiments.

FIG. 3B shows an exemplary procedure to mitigate collisions between SR messages, according to some embodiments. When multiple user nodes are assigned to the same resource element, collisions are possible in case two of those user nodes decide to transmit at the same time. If the user nodes are assigned the same series of SR opportunities in time and frequency, they will likely collide repeatedly upon each successive SR opportunity because they will both continue trying to gain access, until one or both has exhausted their permitted repeats. A better way to handle such collisions may be to assign different periodicities of SR opportunities to the user nodes, and/or different subchannels in subsequent SR opportunities to the various sharing user nodes, so they will not repeatedly collide. For example, the nodes that share (that is, are mutually assigned to) a particular SR opportunity in one cycle, may be assigned different SR opportunities upon the next cycle. If they collide in one instance, they will then not collide when they transmit on the next available SR opportunity for each node, because they will be in different resource elements on the second time they transmit. More specifically, the user nodes that share a particular resource element at one time may be assigned different subchannels and/or different symbol times when their next SR opportunities occur, and therefore they would not collide a second time, according to some embodiments.

In the depicted example, a first user node is assigned a first modulation state 353 (shown as a vertical hatch fill) and a second user node is assigned a second modulation state 355 (horizontal hatch) in the modulation table 351. The first and second user nodes may be assigned to share an initial SR opportunity such as the resource element 354 of a resource block 352. In addition, the first and second user nodes are also assigned subsequent SR opportunities, continuing in a predetermined pattern of frequencies and times. For example, the first user node may be assigned the initial resource element 354 upon the first instance, and then a first subsequent resource element 356 for its next SR opportunity. Importantly, a different set of user nodes share the first subsequent resource element 356 with the first user node (that is, different from the sharing partners in the initial resource element 356). Likewise, the second user node may be assigned the initial shared resource element 354 along with the first user node, but then for its next SR opportunity it may be assigned a different frequency and/or symbol time than the first user node, such as the second subsequent resource element 357. Thus, the first and second user nodes may share the initial resource element 354 in one instance, but upon their next SR opportunity they have different resource elements 356-357, which are shown with vertical and horizontal hatch fill according to the modulation assignments of the first and second nodes, respectively. The collided resource element 354 is shown with cross hatch fill, indicating that both modulation states 353 and 355 are present at the same time, thereby causing a collision. Curved arrows from the collided resource element 354 to the next set of resource elements 356 and 357 show how the collided messages may be retransmitted in different resource elements 356-357 and therefore would not be collided a second time when retransmitted. A code or plan or table or formula specifying each user node's SR opportunities and modulation states may be assigned by the base station, for example by downloading an RRC message or the like, indicating which resource elements will serve as SR opportunities for each user node separately. The base station may assign a different scrambling code or the like to each of the user nodes, and the user nodes can then determine which SR opportunities they can access, and with which modulation state, according to the scrambling code. The various user nodes in the network may be assigned resource elements according to a scrambling code that causes the user nodes to change sharing partners upon each SR opportunity, or other interval, to avoid repeated collisions between user nodes seeking access.

To recap this example, both user nodes happen to transmit SR messages simultaneously, using modulation states 353 and 355, as indicated by two arrows; hence both SR messages interfere in the initial resource element 354, as indicated by the cross-hatch fill. The base station may detect the collided messages but likely would not be able to demodulate them and would do nothing. The first and second user nodes, upon failing to get a response to their initial SR messages, may then transmit again, but now using the first and second subsequent resource elements 356-357 which do not collide. Therefore, both of the user nodes can successfully transmit their messages to the base station upon their respective subsequent resource elements 356-357, despite the initial collision. Importantly, backoff delays or other long delays are not needed, according to some embodiments. In addition, the base station can readily determine the identities of the two user nodes upon receiving their non-colliding transmissions according to their different modulation states, despite multiple sharing partners being assigned to each SR opportunity 356-357.

The assigning of SR opportunities to the various nodes may be done by the base station explicitly, for example by downloading a table or list of times and frequencies at which each user node is permitted to transmit an SR message. Alternatively, and more compactly, the base station may contrive a "scrambling code" such as an algorithm or computer routine or formula with which each user node may calculate when, and on which subchannel, and with what modulation state, each user node may transmit. The scrambling code may include variables that the base station may set, so that each user node receives a different version, and therefore each node is given different SR opportunities, as intended. The scrambling code may also be configured to provide more SR opportunities to high-priority or high-paying user nodes than for other user nodes, for example. The scrambling codes may also be configured to include, as input, the traffic density or message collision rate, and then to provide SR opportunities less often to each user node when traffic is heavy, to prevent further congestion.

In some embodiments, the scrambling code may be an AI algorithm or an algorithm derived from machine learning or an AI model. For example, the AI model may be configured to determine which user nodes may transmit SR messages on which frequencies and at which times and using which modulation states. The AI model may further provide that all of the user nodes sharing each particular SR opportunity have distinct modulation state assignments so that the base station can determine, from the received modulation state and the time and frequency of the SR message, which user node transmitted it. In addition, the AI model may provide that no two user nodes are assigned the same set of SR opportunities, so that each SR opportunity (time and frequency) is assigned to a different combination of user nodes. In addition, the AI model may provide a distinct algorithm or formula or scrambling code for each of the user nodes respectively, so that each user node may use the algorithm to determine when, and on which frequency, and using which modulation state, that user node may transmit an SR message.

In the depicted example, the first user node uses the same modulation state 353 for both of its SR messages, as can be seen by the same vertical hatch in resource elements 354 and 356. Likewise, the second user node uses its same modulation state 355 for both of its SR messages in resource elements 354 and 357 as shown by the horizontal hatch. However, in a practical implementation, it may be necessary to scramble the modulation assignments of the various nodes as well as their resource elements, to ensure that no two nodes sharing the same resource element will have the same modulation assignment. Thus, the scrambling code may assign a different set of SR opportunity periodicities to each user node, and a different pattern of subchannel changes, and a different series of modulation states, upon each SR opportunity, for each user node in the network. With that arrangement, each user node may have a different modulation state from all of its sharing partners upon each SR opportunity instance, and therefore the base station can identify the ready node according to its unique modulation state in each SR opportunity. To the human mind, this continual reshuffling of the times, frequencies, and modulations of the various nodes may be difficult to keep track of, but for a computer it is quite trivial. The base station may inform each user node of its SR opportunities and modulations by transmitting the scrambling code, or other indication of the periodicities and particular SR resources that the user node is to use, along with synchronization information about the system clock and other system information, in an RRC message or the like. The base station may assign the SR periodicities and modulations and scrambling code to each user when it joins the network, or when the SR opportunities are assigned, or at another time of the base station's choosing. Each user node can then follow the indicated code or periodicity to determine which subchannel, symbol time, and modulation state is to be used for each SR message.

An advantage of varying the resource elements and modulation assignments of the various user nodes among different successive SR opportunities may be that collisions may be automatically resolved when the user nodes re-transmit their SR messages, since each node has different sharing partners upon each SR opportunity. Another advantage may be that the base station, by detecting the collided SR messages, may determine when the collision rate rises above a predetermined threshold, and then may assign more resource elements for use as SR opportunities to handle the increased traffic demands. The base station may also determine when the collision rate of SR messages has become sufficiently low that some of the resource elements assigned to SR messaging are not needed and may be reassigned to other tasks. Another advantage may be that the procedure may be implemented as a software update, a low-risk low-cost way of providing the improvements suggested, according to some embodiments.

As a further option, the base station or core network may use artificial intelligence (AI) to allocate SR opportunities to the various user nodes in a network. Optimizing the number and timing of the SR opportunities is a complex problem because each SR opportunity has a cost in terms of resources allocated to the SR opportunities, and also in terms of the attention of the base station, since the base station is expected to monitor each allocated SR opportunity along with numerous other channels and simultaneous tasks. On the other hand, each user node would like to have more SR opportunities assigned to it, so as to minimize the waiting time when it wishes to transmit. Each user node also desires fewer sharing partners, preferably zero, and more SR opportunities. Each user node has different priorities, different QoS requirements, different message sizes and usage rates, among many other factors that may influence the allocation of resources. If the base station provides frequent, near-continuous SR opportunities for each user node in the network, and gives each user node exclusive use of its allocated SR opportunities, then vast amounts of bandwidth may be wasted. Although each user node may desire such broad access for its own use, the effect of providing it to all the user nodes may be wasteful of resources and may crash the base station which generally has a limited number of channels that it can monitor at any time. In addition, conditions such as the traffic density, presence or absence of external interference, geographical extent of the user nodes relative to the base station, presence or absence of electromagnetic absorbers or scatters (such as hills and tall buildings) potentially blocking certain users, may also influence the success of the resource allocation. Finally, the conditions may fluctuate on a millisecond basis.

In a problem of this complexity, AI may be able to offer substantial assistance by providing methods or algorithms which base stations may use to simplify decision-making relative to allocation of SR opportunities and related resources. Development of an AI model generally starts with a large number of observations under varying conditions, and then performs an iterative relaxation calculation such as guided learning based on those examples, and attempts to derive predictive outputs based on the input parameters. The outputs may be a prediction of the subsequent network performance given the current conditions, or it may provide a recommended plan of SR opportunities such as the number and periodicity of SR opportunities, the number of nodes to share each SR opportunity, and the like. The inputs to the AI model may include the number of user nodes in the network, the traffic density, and many other parameters that the base station or core network may measure. A further input may be a network performance metric that the network wishes to optimize, such as throughput, reducing delays, reducing dropped calls, enhancing user satisfaction according to some measure, or a combination of these, for example. With sufficient example data and sufficient time, an acceptable solution capable of sufficiently accurate prediction of network performance, guided by the teachings herein, may usually be found. Then, the AI model may be passed to the base station or core network for its use, or more preferably a simplified version of the AI model may be provided, for example as an algorithm or computer program or table of values, among other possible modes of use. In addition, the network may accumulate further valuable data by recording the performance metric obtained while following the algorithm's recommendations, and the AI model may then process that further data and thereby derive an even more effective solution. While not guaranteed to find an optimal solution to complex problems, an AI model, given enough data examples to work with and given a sufficiently capable computer to process the data, guided by the teachings herein, can usually derive algorithms that improve the desired network performance.

As a further option, a user node may request advantages regarding scheduling requests. For example, a user node may request exclusive use of certain SR opportunities rather than sharing them with other user nodes. Alternatively, a user node may request more frequent SR opportunities than other user nodes. In a network wherein user nodes calculate a backoff delay following an SR collision or other mishap, a user node may request a function that calculates shorter average delay times than other nodes. The base station or core network may determine whether to provide those and other advantages according to a function. The function may take, as input, parameters such as the priority or special status of the user node, such as an emergency response site or law enforcement or pandemic management site for example. The parameters may further include whether the user node has paid for the advantages, such as a monthly or yearly subscription that accords the advantages, or a per-message fee arrangement for each advantage invoked, for example. The base station may permit the requested advantages to be invoked without cost or contest temporarily (such as allowing the advantages one time, or other number of times), and then may require either payment or proof of special status to access the advantages thereafter. The cost per message or per subscription may depend on the messages involved, such as a long message costing more than a short message, and a very short message perhaps being allowed to invoke the advantages for free, among many other options for allocating the advantages, and particularly regarding uplink scheduling requests.

The procedure of FIG. 3B may be implemented as a system or apparatus, a method, or instructions in non-transient computer-readable media for causing a computing environment, such as a user node, a base station, or other signally coupled component of a wireless network, to implement the procedure.

Figure 4A:
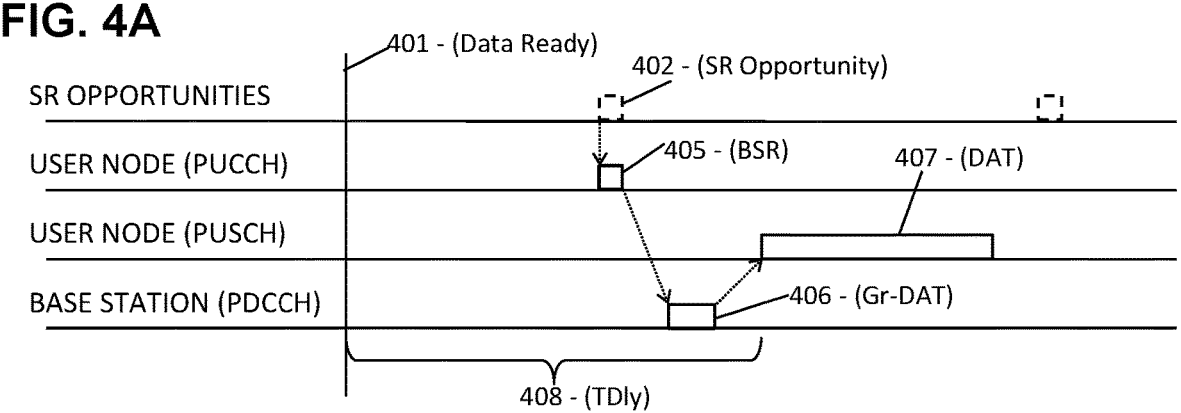
FIG. 4A is a sequence chart showing an exemplary embodiment of a procedure for encoding a BSR message in an SR signal, according to some embodiments.

FIG. 4A is a sequence chart showing an exemplary embodiment of an access procedure according to some embodiments of the systems and methods. In this example, the user node transmits a BSR message in place of an SR message, thereby informing the base station of the size of the data message. In the sequence chart, the horizontal lines again represent SR opportunities, signals from the user node on the PUCCH and PUSCH, and signals from the base station on the PDCCH, with time on the horizontal axis. The data becomes ready to transmit at 401, and thereafter the user node waits until an SR opportunity 402 comes around, and then transmits a scheduling request. However, in this example, the scheduling request is modulated as a BSR message 405. The BSR message 405 indicates the size of the planned data message according to a predetermined table. The number of bits available to represent the size of the data message is limited to the number of bits represented by the modulation of the BSR message 405. For example, if the BSR message 405 is modulated as 256QAM (quadrature amplitude modulation with 256 distinct modulation states), which represents 8 bits of data, the BSR message can indicate the size of the planned data message according to a table with 256 levels. If, however, the BSR message 405 is modulated with a lower code such as 16QAM with 16 states representing 4 bits, then the size of the data message can be specified according to a size table with 16 levels, that is, a lower precision. This assumes, as above, that the SR opportunity 402 is only one symbol in length, and so the BSR message 405 is restricted to be only one symbol in length. If the SR opportunity 402 is configured to accommodate longer messages, such as two symbols, then the BSR message 405 can provide up to 8 bits of data with two symbols at 16QAM, again representing 256 size levels. Alternatively, the first symbol could be used as a calibration signal such as a DMRS (demodulation reference signal), thereby assisting the receiver in demodulating the second symbol.

Upon receiving the scheduling request configured as a BSR message 405, the base station then transmits a grant 406 (labeled Gr-DAT) for uploading the data message 407. The base station did not need to request a BSR message because that information was already provided in the form of the modulated SR message, the BSR 405. The base station, reading the BSR 405 message and determining the size of the data message therefrom, can then schedule sufficient resources to accommodate the data message. The user node, upon receiving Gr-DAT 406, then transmits the data message DAT 407 at the time specified in the grant 406, on the PUSCH or whichever channel the base station has specified in the grant 406.

The transmission delay TDly 408, extending from the Data Ready time 401 to the beginning of the DAT message 407, is now shorter than that of FIG. 1 because a complete "handshaking" cycle of Gr-BSR and BSR transmission have been avoided. Since the size information was conveyed in the modulated SR message, representing a BSR size code, the base station could determine how much time to allocate for the data message without the need for a separate grant. Applications requiring low latency may benefit from such a reduced transmission delay 408.

As an alternative, the base station may assign multiple user nodes to share the SR opportunity 402, with each sharing partner having a different assigned modulation state. Also, the SR opportunity 402 may include two symbols. Then the user node may transmit an SR message, modulated according to its own identifying modulation state, in the first symbol of the SR opportunity 402, and the BSR message 405 in the second symbol. The base station can then determine, from the messages, both the identity of the ready node and the size of the pending data message.

The user node and the base station may exchange messages to agree on the meaning and format of the SR message, such as an SR message modulated to identify the user node, or an SR message modulated as a BSR message, or other configuration as appropriate. The user node may convey its capabilities to the base station upon joining the network, and the base station may determine which types of SR messages may be accommodated at that time, or at a subsequent time using, for example, an RRC message.

The procedure of FIG. 4A may be implemented as a system or apparatus, a method, or instructions in non-transient computer-readable media for causing a computing environment, such as a user node, a base station, or other signally coupled component of a wireless network, to implement the procedure.

Figure 4B:
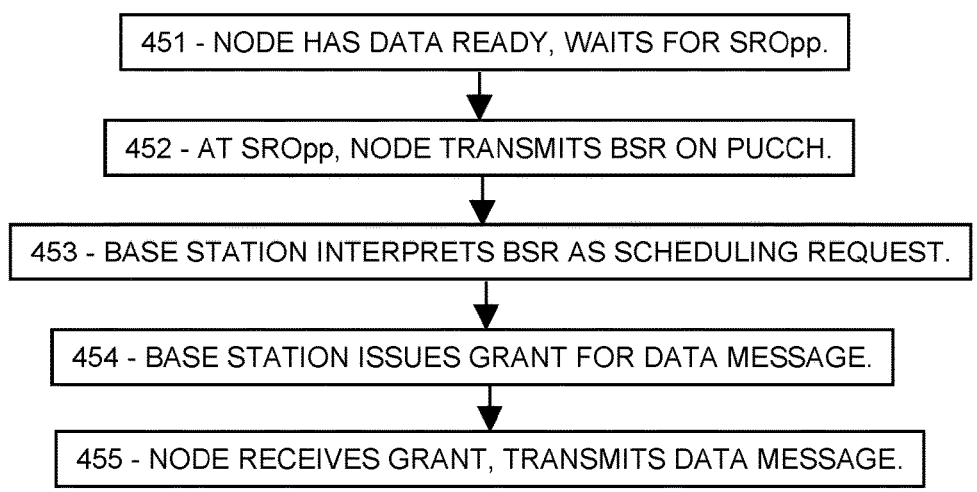
FIG. 4B is a flowchart showing an exemplary embodiment of a method for encoding a BSR message in an SR signal, according to some embodiments.

FIG. 4B is a flowchart showing an exemplary embodiment of a method for encoding a BSR message in an SR opportunity, according to some embodiments. In this example, a user node transmits a "size" message, here a BSR message, configured to indicate the size of the pending data message, upon a resource element assigned to that user node as an SR opportunity. Thus, the user node indicates that it seeks an uplink grant and also indicates the size of the data message that the grant is for. If the ready node has exclusive access to the SR opportunity (that is, no sharing partners), then the base station may determine the user node's identity according to the time and frequency of the message, and can also determine the size of the data message according to the modulation as a BSR message. If, however, the ready node has been assigned to share the SR opportunity with other user nodes, each assigned a different modulation state, then the modulated SR request and the BSR message may be combined, so that the base station can determine both the identity of the ready node and the size of the data message.

For example, the SR message may occupy the first symbol of a two-symbol SR opportunity, modulated according to the assigned modulation state and thereby identifying the user node, and the BSR can occupy the second symbol, thereby disclosing the size of the data message. Alternatively, the SR request and the BSR message may be multiplexed, if the SR opportunity permits a high enough modulation. For example, the SR message may be modulated according to a 4-bit table such as 16QAM (hence 16 user nodes can share this SR opportunity) and a 4-bit BSR message can indicate the size of the data message according to a 16-level table. Those two messages may be multiplexed into a single 8-bit symbol modulated according to, for example, 256QAM. The base station can then demultiplex the symbol and thereby determine both the identity of the ready node and the size if its data message from the single-symbol SR opportunity, a substantial savings in time and computational resources.

At 451, the user node has a data message ready to send, and therefore waits for its next assigned SR opportunity SROpp. At 452, the SR opportunity (SROpp) has arrived, and the node transmits, upon the assigned resource element (time and frequency), a message that includes a BSR message or other indication of the size of the data message. As mentioned, if the SR message is modulated according to a 4-bit modulation table with 16 distinct modulation states, the BSR message may refer to a 16-level size table, and if an 8-bit modulation is used, the BSR may refer to a size table with 256 levels, among other possibilities. As a further option, an 8-bit message may include multiplexed information, such as 4 bits representing size and 4 more bits representing the identity of the transmitting node. As a further option, 4 bits may represent a code or index pointing to a table that holds the destination address of the data message. As yet a further option, bits of the SR message may alternatively represent a temporary QoS (quality of service) adjustment request. In other embodiments, the SR opportunity may include two resource elements, in which case the BSR message may provide a full 8-bit size resolution using two symbols each modulated by a 4-bit table, for example. Alternatively, with a two-symbol SR opportunity, a calibration symbol, such as a DMRS or PTRS (phase tracking reference signal), may be appended or prepended to the BSR message, to assist the base station in demodulating the BSR message (plus the other bits representing identity, QoS, address, etc. if present).

At 453, the base station receives the SR message and interprets the modulation as a BSR message indicating the size of the pending data message, plus the other bits if present. The user node and the base station may have agreed upon this option, of using the SR opportunity to communicate the size of the data message (and other items as listed above), at an earlier time, such as when the user node first joined the network, or other time. For example, the user node may have sent a message to the base station informing the base station of the user node's intent to transmit a BSR message at a time and frequency allocated for an SR message, and the base station may then send a message to the user node agreeing to interpret such an SR message as a request for a grant and also an indication of the size of the data message. (In this context, the user node and the base station "agree" by exchanging messages such as RRC messages and the like, to determined how they will interpret subsequent messages.) Alternatively, the base station may send a message, such as an RRC message, to the user node indicating that the network can accept a BSR message as an SR request, and the user node may reply with a message agreeing to this plan. Thus, the base station may be prepared to interpret the modulation of the SR message as intended, that is, as an indication of the size of the data message. The base station may retain, in memory, a table or the like indicating how each of the user nodes plans to employ its SR opportunities, such as to configure the SR message to indicate the size or other feature of the data message.

At 454, the base station has interpreted the SR message as a BSR, and thereby knows how much resources (time and bandwidth) to allocate to the user node for the data message upload. The base station accordingly issues an uplink grant to the user node for sufficient resources to accommodate the pending data message. At 455, the node receives the grant and transmits the data message as directed.

An advantage of encoding the SR message as a BSR, or other size message, may be that delays involved in subsequently requesting and transmitting the BSR message may be avoided. Hence the base station may issue a grant for the data message responsive to the SR message, instead of a grant for a BSR message, thereby providing lower latency, according to some embodiments.

Another advantage may be that further information may be provided to the base station pre-grant (that is, before receiving an uplink grant) such as the destination address of the data message, a special QoS request, an indication of the identity of the ready node, or other information that may further improve latency or reliability, according to some embodiments. Another advantage may be that the procedure may be implemented as a software or firmware update, and therefore may be implemented at low cost, according to some embodiments. Another advantage, of assigning specific modulation states for user nodes to use in their SR requests, may be that the computational resources of the user node as well as the base station may be eased, thereby making the user devices run "better", such as with less energy consumption and less complexity, according to some embodiments.

The procedure of FIG. 4B may be implemented as a system or apparatus, a method, or instructions in non-transient computer-readable media for causing a computing environment, such as a user node, a base station, or other signally coupled component of a wireless network, to implement the procedure.

Figure 5A:
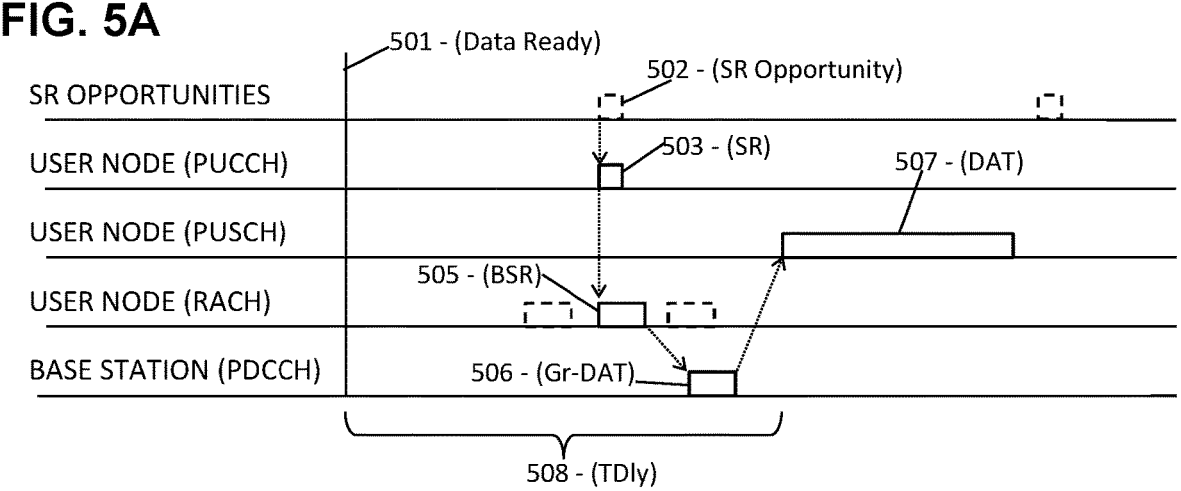
FIG. 5A is a sequence chart showing an exemplary embodiment of a procedure for transmitting a BSR message on a random access channel, according to some embodiments.

FIG. 5A is a sequence chart showing an exemplary embodiment of a procedure according to some embodiments of the systems and methods. In this example, a user node transmits a BSR message on the random access channel at the same time as its SR message on the PUCCH channel. The entitles plotted are the SR opportunity times, signals of the user node on the PUCCH, PUSCH, and RACH (random access) channels, and signals of the base station on the PDCCH. A data message becomes ready to send at the Data Ready time 501. The user node waits for the next SR opportunity 502 and then transmits an SR message 503 indicating that the user node has a data message ready to send. The SR message 503 may be a standard single-bit SR request, or it may be a symbol modulated to identify the transmitting node, or modulated to request special handling, for example.

In addition, the user node also transmits a BSR message 505 on the RACH channel simultaneously with the SR message 503 (assuming the PUCCH and RACH are on different frequencies). Alternatively, the BSR message 505 may be transmitted before or after the SR message by a predetermined amount, as indicated in dash. Since the base station monitors the RACH channel as well as the PUCCH and PUSCH channels, the base station can detect both the SR message 503 and the BSR message 505 occurring simultaneously, or according to the pre-arranged time relationship with the SR 503. Messages that are transmitted simultaneously or within a predetermined interval of each other are called "synchronous" herein. The base station thereby knows, from the time synchrony, that the SR 503 and the BSR 505 refer to the same data message. In other words, the SR and BSR messages 503 and 505 are synchronized according to an agreed-upon time criterion. The BSR message 505 indicates the size of the data message that the SR message 503 is requesting permission to upload. The base station accordingly issues a grant 506 Gr-DAT for the data message, and the user node then transmits the data message DAT 507 on the PUSCH. The transmission delay 508 in this case is about equal to the transmission delay 408 of FIG. 4 because in both cases the BSR information is delivered at the SR time, and in both cases a separate grant Gr-BSR is not needed.

An advantage of placing the BSR message 505 on the RACH channel, or other monitored but unscheduled channel, may be that more bits of data may be provided than the SR opportunity 502 can accommodate. For example, the SR message 503 may be limited to a single bit of information by convention, or may be limited to four bits by modulation, whereas signals on the RACH may be modulated at a higher level and/or can include multiple symbols, and can therefore carry more significant size information. For example, the RACH BSR message 505 may be two symbols wide, each symbol being modulated as 16QAM, totaling eight bits of data, which is sufficient for a standard BSR message referring to a size table with 256 size values. In addition, a calibration symbol, such as a DMRS symbol (not shown), can be prepended or appended to the BSR message 505, further enhancing the reliability of the demodulation.

The BSR message 505 is depicted as coincident with the SR message 503. However, some user nodes may not be able to transmit at two different frequencies at the same time, or the two channels may share the same frequency band and use TDD (time-division duplexing) to separate the two information streams. In that case, the user node may transmit the BSR message 505 on the RACH channel at a different time, such as a particular interval before or following the SR message 503 (as shown in dash), to give the user node enough time to switch frequencies. For example, the user node may transmit the BSR message on the RACH first, while waiting for the SR opportunity, and then switch frequencies, and then transmit the SR message on the PUCCH at the next SR opportunity. An advantage of this latter scheme (BSR before SR) may be that the BSR message and frequency-change delay would not contribute to the net transmission delay, since the early BSR would then be transmitted in the waiting time before the SR opportunity 502 occurs.

To ensure that the base station correctly correlates the BSR message with the SR message, the user node may specify what type of synchrony it will use to transmit BSR messages on the RACH. The user node may specify that it will transmit the BSR at the same time as the SR message, or some number of microseconds or symbol times after the SR message, or some number of microseconds or symbol times before the SR message, for example. The user node may transmit that plan to the base station upon joining the network along with other data about the user node's capabilities, for example, or at some other time. Alternatively, the base station or core network may determine the type of synchrony to be used and may communicate that plan to the user node, preferably based on the user node's capabilities.

In some networks, the RACH channel is not open all the time, but rather is allocated for uplink only during particular slots or symbols ("windows") which may recur periodically or otherwise. The base station may communicate this schedule to the user nodes in an RRC message, for example. In that case, the user node may transmit the BSR message on the RACH channel during whichever RACH window is closest to the SR opportunity, or whichever RACH window occurs after some number of microseconds or symbol times preceding or following the SR transmission, for example. In that way, the user node can comply with the base station's schedule of SR opportunities and RACH windows, while transmitting the BSR message as close in time as possible to the SR message, consistent with the frequency-switching capabilities of the user node. When informed of the user node's plan for transmitting the BSR message in relation to the SR message, the base station can then detect both messages and correctly determine that the BSR specifies the size of the data message that the SR refers to.

An advantage of the depicted embodiment may be that the user node may convey the size information to the base station and avoid a BSR-grant handshaking delay, even if the SR message cannot accommodate the kinds of modulations required for a BSR message. Another advantage may be that the user node may convey the size information even if the user node cannot transmit on two frequencies at the same time, by agreeing to place the BSR message on the random access channel at a predetermined interval before or after the SR message, according to some embodiments.

Another advantage of the depicted scheme may be that it may "fail gracefully", meaning that any likely failure mode may result in little or no harm done, according to some embodiments. For example, if something goes wrong (such as interference or a collision) that prevents the base station from receiving the BSR message 505, the base station can proceed by providing a grant to the user node for uploading the BSR message again, which the user node could then do on the PUSCH. In a similar way, if the base station receives the RACH BSR message 505 but fails to detect the SR message 503, then the base station would likely do nothing. The user node would then determine that the SR failed and would try again upon the next SR opportunity. In other words, consequent to a message failure in the depicted sequence, the user node and base station may recover readily and proceed with the message sequence. Each of the exemplary systems and methods presented herein was designed to fail gracefully in this way, according to some embodiments.

The procedure of FIG. 5A may be implemented as a system or apparatus, a method, or instructions in non-transient computer-readable media for causing a computing environment, such as a user node, a base station, or other signally coupled component of a wireless network, to implement the procedure.

Figure 5B:
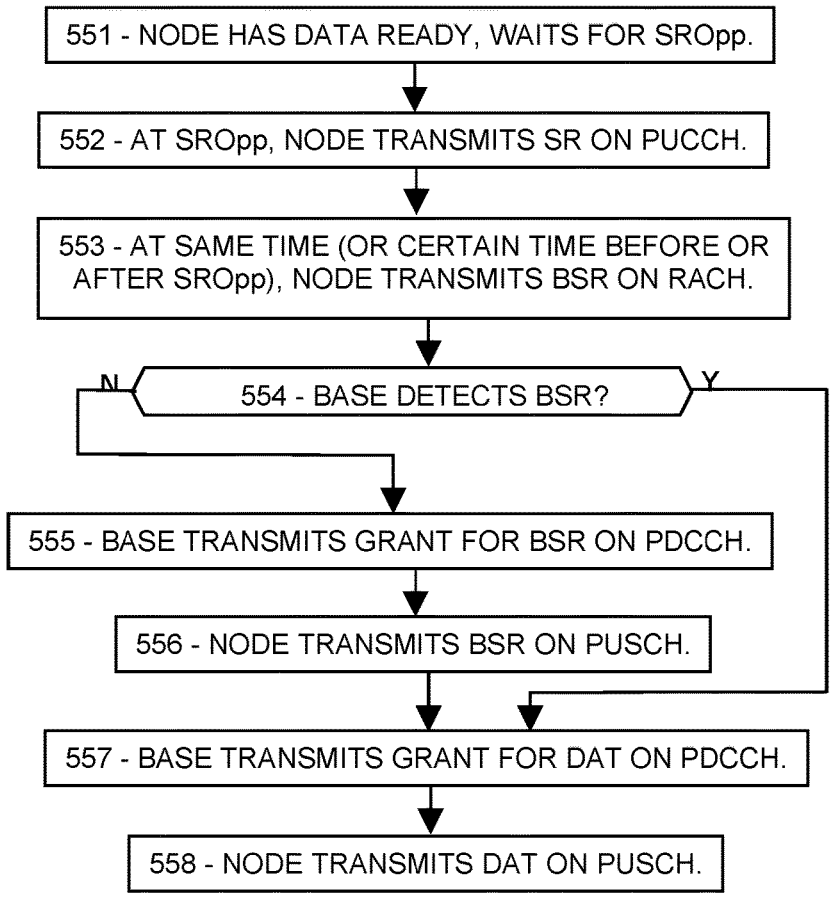
FIG. 5B is a flowchart showing an exemplary embodiment of a method for transmitting a BSR message on a random access channel, according to some embodiments.

FIG. 5B is a flowchart showing an exemplary embodiment of a method for transmitting a BSR message on a random access channel, according to some embodiments. In this example, a user node transmits an SR message upon an assigned SR opportunity, and also transmits a BSR message on the random access channel RACH. The BSR (or other size message) may be time-synchronized with the SR message so that the base station can determine that the two messages are related. For example, the BSR message may be simultaneous (that is, the same symbol time but different frequencies) with the SR message, or the BSR message may be transmitted within a predetermined interval before or after the SR message. The user node may have informed the base station of the type of synchrony and the predetermined interval at an earlier time, such as when the user node first joined the network.

At 551, the user node has prepared data for a data message and waits for its next SR opportunity. At 552, the SR opportunity has arrived, and the user node transmits an SR message on the assigned PUCCH channel. At 553, the user node also transmits a BSR (or other size indication) on the RACH channel (or other channel allocated by the base station for this purpose). As mentioned, the BSR message may be simultaneous with the SR message, or a predetermined interval before or after the SR message. An advantage of transmitting the BSR message before or during the SR message may be that the time required for the BSR message would not contribute to the overall delay of the data message, and hence may provide lower latency than otherwise, according to some embodiments.

At 554, the base station has received the SR message and then determines whether it has detected the BSR message on the RACH at the agreed-upon time. If so, then the flow drops down to 557, where the base station transmits an uplink grant to the user node for the data message, typically on the PDCCH channel. If the base station did not detect the BSR message, due to a collision on the RACH channel for example, then at 555 the base station transmits a grant to the user node configured for a BSR message instead of the data message. At 556, the user node receives the (usually smaller) grant, sized for the BSR message, and determines that its original BSR message was faulted. The user node therefore re-transmits the BSR, but this time on the scheduled (and more reliable) PUSCH channel. In either case, the base station then provides the data message grant at 557, and at 558 the user node transmits the data message on the PUSCH as directed. As an alternative, the base station may instruct the user node to transmit the BSR message and/or the data message on the RACH channel, for example to avoid overloading the PUSCH channel or to accommodate a user node that has difficulty changing transmission frequencies.

As a further option, the user node may transmit another message on the RACH along with the BSR message. For example, if the user node shares the SR opportunity with other nodes, and if the SR message is a single-bit message with a prescribed format that provides no identity information, then the user node may combine or append or prepend an identification message to the BSR message on the random access channel, and may thereby enable the base station to determine which node wants to send a data message as well as the size of the data message. An advantage of knowing which user node seeks a grant may be that the base station may then process the request according to a priority appropriate for that user node, which would not be possible absent the identification information.

An advantage of transmitting the BSR message on the random access channel may be that the time required for a grant-BSR cycle may be avoided, and may thereby provide lower latency, according to some embodiments. Another advantage may be that the BSR message can be provided to the base station even if the SR message is restricted to a fixed or predetermined or arbitrary modulation state, and therefore cannot accommodate the BSR message on the PUCCH as shown in FIG. 4A. Another advantage may be that the procedure may be implemented in software without the need for developing new hardware, a cost-saving feature, according to some embodiments.

The procedure of FIG. 5B may be implemented as a system or apparatus, a method, or instructions in non-transient computer-readable media for causing a computing environment, such as a user node, a base station, or other signally coupled component of a wireless network, to implement the procedure.

Figure 6A:
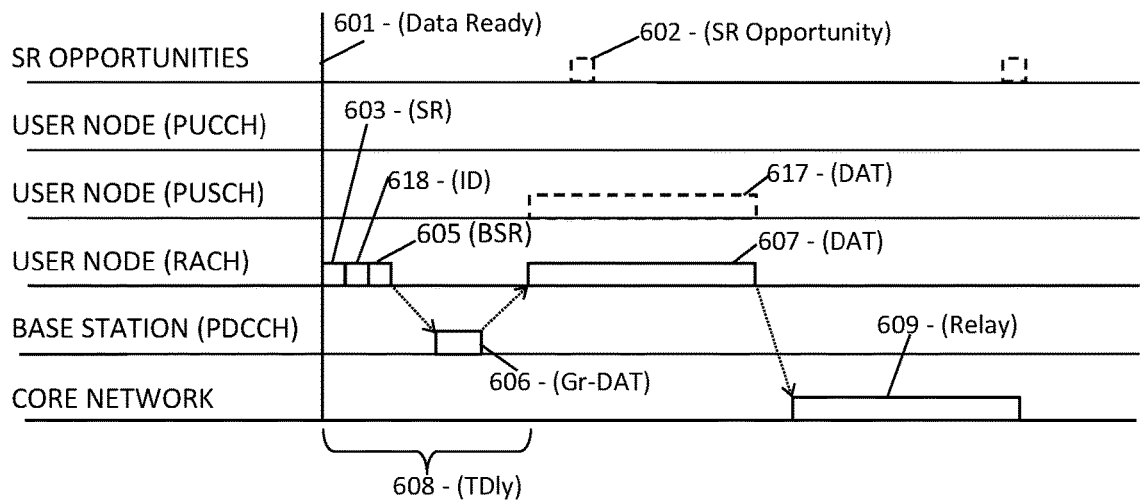
FIG. 6A is a sequence chart showing an exemplary embodiment of a procedure for transmitting a scheduling request on a random access channel, according to some embodiments.

FIG. 6A is a sequence chart showing an exemplary embodiment of a procedure for a user node to provide pre-grant information to the base station, according to some embodiments. In this example, the user node transmits a series of short messages on the random access channel at will, and then requests a grant for the remaining data message. SR opportunities 602 are shown, along with user node signals on the RACH channel, base station signals on the PDCCH, and signals from the core network. Also shown are the PUSCH and PUCCH.

At the Data Ready time 601, the user node transmits an SR message 603, an identification message ID 618, and a BSR message 605 on the RACH channel. The SR message 603 may include, for example, a pre-established code indicating that a user node wishes to transmit a data message and needs an uplink grant. The SR message 603 thereby provides the same information (that the node wants a grant) as a prior-art SR message on the PUCCH. The ID message 618 may include a code identifying the user node, such as its C-RNTI, thereby indicating to the base station which user node wants to talk. The BSR message 605 indicates the size of the planned data message. The base station, upon receiving these messages 603, 618, 605 then has the information it needs to schedule the data message upload, and accordingly transmits a grant (Gr-DAT) 606 on the PDCCH for the data message. The user node receives the grant 606 and then transmits the data message DAT 607 on the RACH channel, or alternatively on the PUSCH (in dash, 617) or other channel as specified in the grant 606 by the base station. The base station then receives the data message 607 (or 617) and transfers it to the core network, which forwards it (as a relay message 609) to the recipient, usually via one or more intermediate stations. The transmission delay 608, from Data Ready 601 to the start of the data message 607 upload, is shorter than the transmission delay 508 of FIG. 5, because the user node in FIG. 6 did not have to wait for an SR opportunity 602, but rather was able to begin transmitting the pre-grant information (603,618,605) as soon as the data message 607 was ready. Optionally (not shown) one or more calibration symbols such as DMRS or PTRS may be added, or more preferably prepended, to the messages for ease of demodulation.

The procedure of FIG. 6A may be "robust" in the sense that message failures may be detected and readily mitigated. This is particularly important for communications on the RACH because collisions can occur on this unscheduled, contention-based channel. If the SR message 603 is faulted, the base station may ignore the ID and BSR 618-605 messages, in which case the user node may fail to receive a grant when expected, and therefore may determine that a failure had occurred, and may then try again by re-transmitting the pre-grant messages 603,618,605 (preferably after first checking that the RACH is free of traffic for a predetermined interval). Likewise if the ID message 618 is faulted, the base station would not know which node is involved and may ignore the request, and again the user node can retransmit after a short delay. If the SR and ID 603-618 messages are received without fault, but the BSR 605 is faulted, then the base station can send a grant to the user node requesting the BSR, and the user node can then again send its BSR message as requested. If the pre-grant messages are good but the Gr-DAT message 606 is faulted, then the user node would fail to receive a grant and may re-transmit the pre-grant messages again. If the data message 607 is faulted, the base station can transmit a non-acknowledgement message (not shown) and the user node can re-transmit the data message 607. Thus, each step of the depicted procedure can be mitigated readily upon a message failure.

An advantage of providing the pre-grant messages at the Data Ready time 601 instead of waiting for the SR opportunity 602 may be that lower latency is provided, since the user node avoids the delay of waiting for the SR opportunity 602. Another advantage may be that the base station, knowing the identity of the ready node, may apply an appropriate QoS in allocating resources and other processing. Another advantage may be that the usual BSR-grant handshake may be avoided since the base station knows how big the data message will be. Another advantage may be that the procedure may be implemented in software without the need for developing new hardware, a cost-saving feature, according to some embodiments.

The procedure of FIG. 6A may be implemented as a system or apparatus, a method, or instructions in non-transient computer-readable media for causing a computing environment, such as a user node, a base station, or other signally coupled component of a wireless network, to implement the procedure.

Figure 6B:
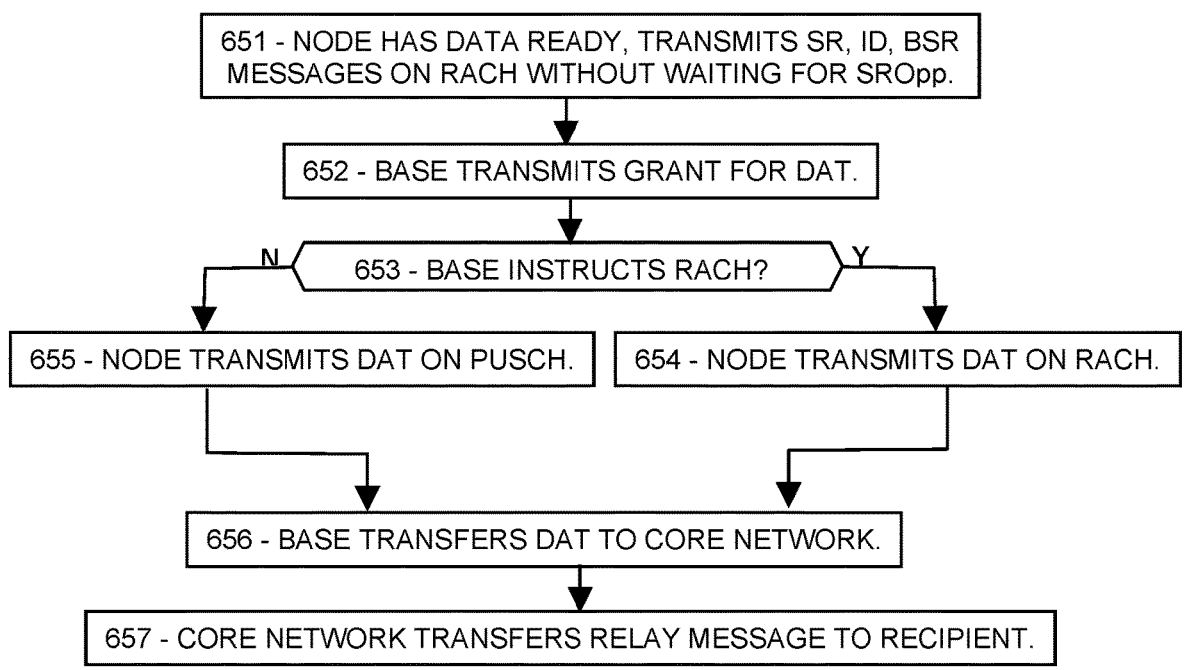
FIG. 6B is a flowchart showing an exemplary embodiment of a method for transmitting a scheduling request on a random access channel, according to some embodiments.

FIG. 6B is a flowchart showing an exemplary embodiment of a method for transmitting a scheduling request on a random access channel, according to some embodiments. In this example, a user node does not wait for an SR opportunity, but rather transmits an SR message on the RACH along with an identification message and a BSR. These pre-grant messages are transmitted "asynchronously", meaning "at will" or "not according to an SR opportunity or an uplink grant". However, asynchronous does not imply a completely arbitrary time, since all messages in 5G are required to comply with the established symbol boundaries and timing so that the receiver can demodulate them.

At 651, the user node has data ready to transmit, but first requests an uplink grant on the random access channel using an SR message (or the like) along with an identification message (ID) configured to identify the user node, and a BSR message (or the like) indicating the size of the planned data message DAT. The identification message may be needed because the SR message is not transmitted at the time and frequency that the base station has assigned to the user node (if any), and therefore the base station may be unable to determine which user node requests a grant from the SR message alone.

At 652, the base station has acquired all the information needed for the data message upload, including the grant request, the identity of the node, and the size of the data message, based on the pre-grant messages. The base station then issues an uplink grant for the data message. At 653, the base station instructs the user node, in the grant, whether to transmit the data message on the PUSCH, or to remain on the RACH, or some other channel. At 654, the user node transmits the data message on the RACH, or on the PUSCH 655, or whichever channel the grant specifies. Then at 656 the base station transfers the data message to the core network, which then determines the destination address by decoding the data message (if not already done by the base station). The core network then 657 prepares a relay message and begins transferring it to the recipient via other stations in the larger network.

An advantage of providing a scheduling request, an identification message, and a size message on an unscheduled channel as soon as the data message is ready, may be that the delay involved in waiting for an SR opportunity is eliminated. Another advantage may be that the base station, receiving the BSR message pre-grant, may avoid the delay involved in soliciting and receiving the BSR message separately. Another advantage may be that the base station, identifying the user node according to the ID message, may thereby provide service at a priority level appropriate to that user node. Therefore, the pre-grant messages may provide lower latency than waiting for an SR opportunity, according to some embodiments.

The procedure of FIG. 6B may be implemented as a system or apparatus, a method, or instructions in non-transient computer-readable media for causing a computing environment, such as a user node, a base station, or other signally coupled component of a wireless network, to implement the procedure.

Figure 7A:
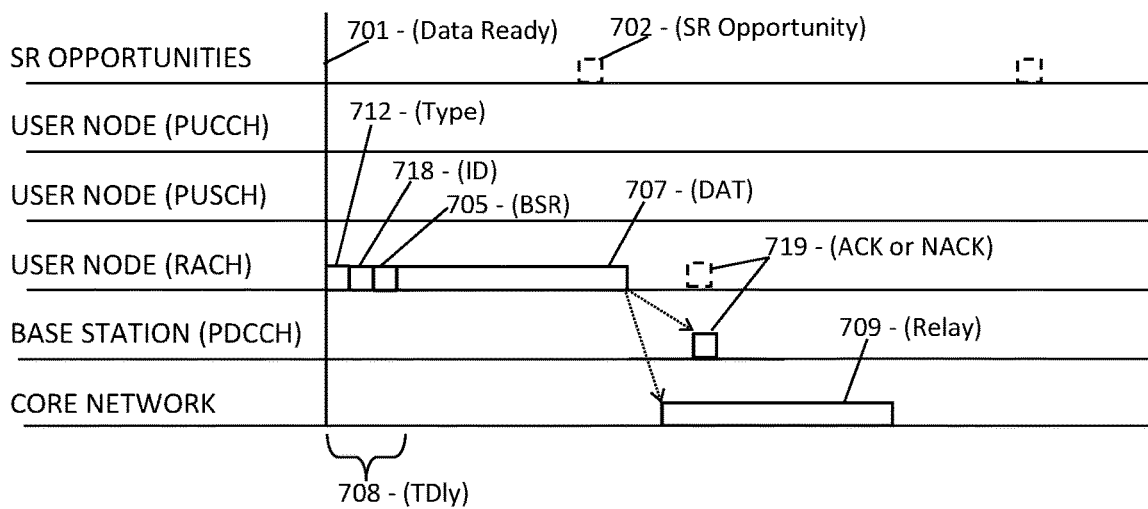
FIG. 7A is a sequence chart showing an exemplary embodiment of a procedure for transmitting a data message on a random access channel, according to some embodiments.

FIG. 7A is a sequence chart showing an exemplary embodiment of a procedure according to the systems and methods for transmitting a data message with minimal delays, according to some embodiments. In this example, the user node transmits an "actionable" message sequence on the random access channel, actionable meaning that the message sequence provides all the information that the base station needs to deliver the data message without further information from the user node. Depicted are SR opportunities 702, the PUCCH and PUSCH and RACH channels, the base station PDCCH channel, and core network signals. At 701 Data Ready, the user node transmits, on the RACH, a series of messages including a "type" message 712 that indicates that a data message follows, an identification 718 message, an optional BSR 705 message, and the data message 707. The messages 712, 718, 705, and 707 may be concatenated or otherwise combined as an integrated message. Alternatively, the type-ID-BSR combination 712,718, 705 may be formed as a header to the DAT 707 portion. The type 712 message may also indicate which other messages are included, while the ID 718 identifies the user node. The BSR 705 is included here; however, the BSR 705 may not be necessary because no grant is being requested. The base station, upon receiving the messages, can determine the size of the DAT message as-received, and may then transfer the DAT 707 portion, or alternatively the entire message sequence, or other portion thereof, to the core network for transferring as the relay message 709 to the recipient. The message sequence is "actionable", as used herein, since it provides all the information that the base station needs to transfer the data message to the recipient, without receiving anything else from the user node (except perhaps a DMRS or PTRS, not shown) or transmitting anything to the user node (except perhaps an optional acknowledgement, which is not counted in the transmission delay).

As mentioned, the BSR 705 is optional. However, it may assist the base station in receiving the DAT message 707, particularly if the data message is long. Also, the order of the various messages 712, 718, 705, 707 may be different than depicted, so long as the base station receives the DAT 707 along with enough information to determine how to transfer it to the destination. In addition (not shown), a CRC (cyclic redundancy code) or other error-checking code may be included with the DAT 707 message, and calibration signals such as DMRS and PTRS may be included, preferably before the type message 712. The error-check code may span the DAT 707 portion only, or the header portion only, or the entire sequence 712-707, for example. Alternatively, two separate error-check codes may be provided, for the header portion (messages 712, 718, 705) and the data portion (707) separately. The base station may use the error-check code(s) to determine whether a fault occurred during transmission on the RACH channel, and may transmit an acknowledgement 719 or non-acknowledgement message to the user node. The user node can re-transmit the data portion 707, or the header portion 712-705, or all the messages upon receiving a non-acknowledgement. The user node may also re-transmit the messages upon failing to receive the acknowledgement message 719 at all. As a further alternative, the user node may include, in one of the messages 712-707, or in another message of the sequence, an indication whether an acknowledgement 719 is desired, since sometimes it is not needed.

Transmitting on the random access channel has risks which are not present, or less so, when transmitting on a scheduled channel. For example, the data message 707 could be faulted due to a collision or noise, or the base station may be too busy to accommodate asynchronous requests, among other possible problems. In that case, the base station can indicate that the transmission succeeded by sending an acknowledgement ACK message 719 on the PDCCH channel (or alternatively on the RACH channel, shown in dash) after the DAT message 707 has been transmitted. Or, if any of the messages is faulted, the base station can transmit a NACK instead, or simply not reply. The user node can monitor the PDCCH channel (or the RACH channel) to detect the ACK or NACK 719, and upon a failure may either re-transmit on the RACH or start over using an SR opportunity 702 to request a grant. The user node and the base station may exchange messages, before the depicted sequence, to agree on the presence or absence of an acknowledgement, whether the data message is to be transmitted on the RACH or PUSCH or other channel, and other options.

To prevent other user nodes from interrupting the message sequence, the header messages 712-718-705 and the data message 707 are preferably transmitted contiguously or without gaps or at least without gaps as large as a sensing slot, which is the time that user nodes are required to monitor a channel before transmitting. If one of the messages, such as the data message, is unexpectedly delayed, the user node may transmit buffer symbols (not shown) such as unmodulated carrier or DMRS or PTRS or the like to keep control of the channel and prevent others from transmitting until the delayed message can be transmitted. If, however, such an interruption does occur, or other interference such as noise during the transmissions, or upon receiving a NACK 719, the user node may retransmit the header and data messages again, optionally after a backoff delay.

As a further alternative, the base station may allocate a special channel, such as special random access channel, or other unscheduled but monitored channel, for use in transmitting asynchronous, grantless, actionable messages, and may thereby provide low latency for user nodes that need it. The user node (having permission to access the special random access channel) may transmit the messages listed, and may thereby have a reduced likelihood of a collision or other fault, since access to the special channel may be restricted. The special channel may also assist the base station by abbreviating many protocol steps. For example, when the special channel is reserved for complete actionable message sequences (including the type, ID, BSR, and data message for example), the base station is relieved of responsibility for issuing grants. In addition, the base station and core network can deliver the message as-received, thereby avoiding the delays inherent in grant requests and transmissions. A special channel for actionable messages may also relieve congestion on the other non-special random access channels, as well as the scheduled channels.

As another alternative, the base station may allocate an emergency channel for asynchronous grantless emergency messages, which may be transmitted at any time. Messages on the emergency channel may be automatically forwarded to a first responder station, or alternatively the base station may receive the emergency messages and relay them to the first responder station, among other options. Nodes requiring emergency assistance may then access the emergency channel with little chance of a collision or interference. Preferably, the base station may process such messages with the highest priority. In addition, and preferably, the usual formatting requirements and accessibility procedures and other requirements of nodes operating on the network, may be waived for such emergency messages. Specifically, the emergency message may be actionable in the sense illustrated, and therefore may be received and processed by the base station without grants or message handshaking or other delays or complications. Preferably a simple and reliable modulation scheme not dependent on amplitude calibration, such as QPSK (quadrature phase-shift keying), may be employed so that amplitude calibration may be waived. Alternatively, if amplitude modulation is included, then one or more DMRS message may be included in the messages to calibrate the demodulator. Also, if the timing is not already determined, a PTRS message may be included to define symbol boundaries and phase timing in the emergency message.

An advantage of the depicted sequence may be that the transmission delay 708 is extremely short, amounting to just the duration of the header messages 712-705, after which the data portion 707 begins immediately, in the depicted example. A user node requiring very low latency may benefit from the very short transmission delay 708 of a RACH message sequence.

The procedure of FIG. 7A may be implemented as a system or apparatus, a method, or instructions in non-transient computer-readable media for causing a computing environment, such as a user node, a base station, or other signally coupled component of a wireless network, to implement the procedure.

Figure 7B:
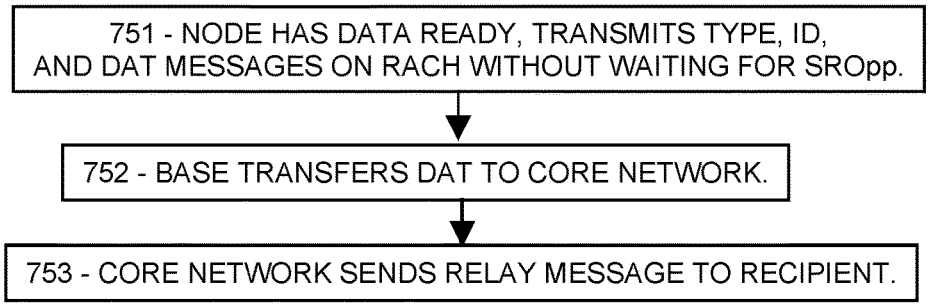
FIG. 7B is a flowchart showing an exemplary embodiment of a method for transmitting a data message on a random access channel, according to some embodiments.

FIG. 7B is a flowchart showing an exemplary embodiment of a method for transmitting a data message on a random access channel, according to some embodiments. In this example, a user node transmits pre-grant messages on the RACH including the data message, and thereby achieves a short transmission delay. At 751, the user node has prepared data for upload. Without waiting for an SR opportunity, the user node transmits, on the random access channel or another frequency allocated by the base station for this purpose, a series of messages including a type message, an ID message, optionally a BSR message, and the data message DAT. The type message is configured to indicate to the base station that a data message is forthcoming and a grant is not necessary; hence the lack of a scheduling request message. The ID message indicates the identity of the user node, and the BSR, if present, indicates the size of the data message.

At 752, the base station transfers the data message, or an extract or portion of it, to the core network, which at 753 prepares a relay message containing the data and transfers it to the recipient.

The BSR message may not be needed since there is no grant request, and the BSR is generally used by the base station to allocate resources sufficient for the data message, all of which is avoided in this case. On the other hand, the BSR message may assist the base station in receiving the data message, especially if long. Therefore, the user node may opt to include the BSR message if the DAT message is longer than some threshold, and to skip the BSR message if the DAT is shorter.

Optionally (not shown) the messages may be prepended by calibration signals such as DMRS or PTRS, and followed by an error-check code such as a CRC message.

An advantage of transmitting the pre-grant messages, including the data message, on a random access channel as soon as the data is ready, may be that a very short transmission delay is thereby obtained, since the multi-step grant process with inherent delays are avoided, according to some embodiments. Another advantage may be simplicity, since a low-cost low-performance user node may transmit messages on a single frequency, the RACH, while avoiding some of the complex requirements of 5G, according to some embodiments. Another advantage may be that the improvements may be implemented in software, generally at less cost than a hardware development, in some embodiments.

The procedure of FIG. 7B may be implemented as a system or apparatus, a method, or instructions in non-transient computer-readable media for causing a computing environment, such as a user node, a base station, or other signally coupled component of a wireless network, to implement the procedure.

Figure 8A:
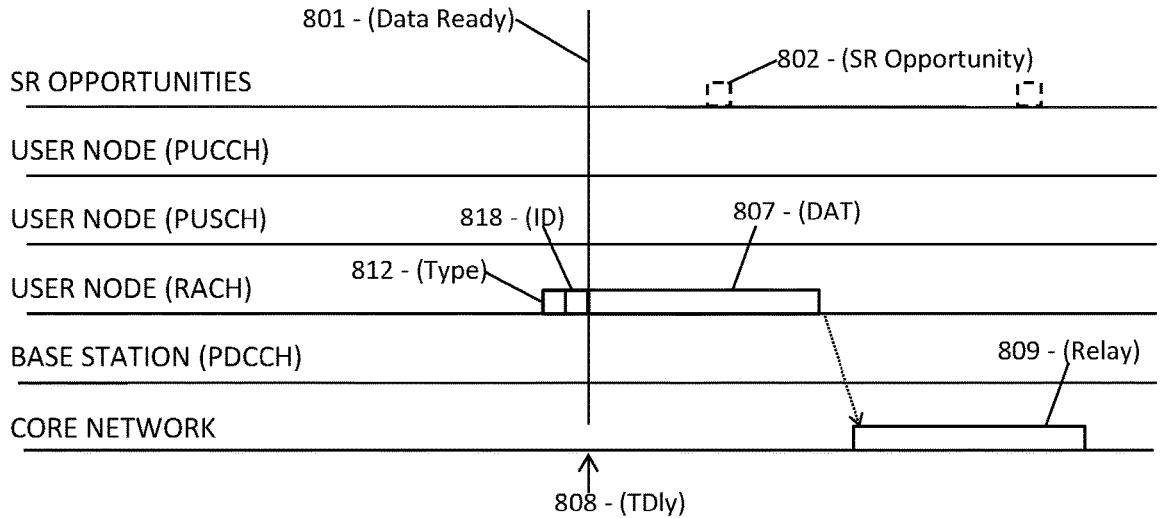
FIG. 8A is a sequence chart showing an exemplary embodiment of a procedure for transmitting header files before a data message is ready, according to some embodiments.

FIG. 8A is a sequence chart showing an exemplary embodiment of a procedure according to the systems and methods, for very low transmission delays, according to some embodiments. The lines represent SR opportunities 802, user node signals on the PUCCH and PUSCH and RACH, base station signals on the PDCCH, and actions of the core network. In this example, the user node has determined the size of the data message 807 before the data message 807 is ready to transmit at 801. This is a common situation, in which a data file of predetermined size is still in preparation before being transmitted. However, the user node knows when it will be ready and therefore can transmit a series of messages before the data is ready, and then transmit the data message afterwards. Specifically, the user node calculates when the data message 807 is expected to be ready, and also how long it will take to transmit the type message 812 and the ID message 818. The user node then transmits a type message 812 indicating that a data message 807 is imminent, and an identity 818 message of the user node, starting at a calculated time so that those messages end at the Data Ready time 801. Then, the user node continues by transmitting the data message 807. The base station passes the data message 807 to the core network when received, and the core network configures a relay message 809 and transfers it to other cells toward the destination, without further communication with the user node; hence the messages are "actionable" as used herein. Thereafter, the base station transmits an ACK or NACK message 719, on the PUCCH or the RACH (dash), indicating whether the message sequence was received or faulted. Optionally, a BSR message may also be transmitted before the Data Ready time 801. Optionally, the type and ID messages may be timed to slightly exceed the Data Ready time 801 by a small amount, such as one or a few symbol times, to avoid having a gap between the header messages and the data message. Optionally, one or more DMRS or PTRS or CRC messages may be transmitted as well.

As an alternative, the user node may transmit the messages 812, 818, 807 on a sidelink channel to another user node in the same cell or network. For example, vehicles may exchange messages with other proximate vehicles to coordinate an emergency response such as a collision avoidance maneuver. In such cases, communication speed is crucial, and so the time savings obtained by transmitting the header messages (in this case the type message 812 and the ID message 818) before the data message 807 is ready may provide the recipient vehicle extra time to respond to the emergency, potentially saving lives.

An advantage of transmitting the type and identity messages 812-818 before the Data Ready time 801 may be that the transmission delay 808 may be reduced to substantially zero, as indicated by an arrow. All of the required information is provided ahead of the Data Ready time 801, so that the user node is ready to transmit the data message 807 as soon as it is ready. Such a zero-transmission-delay procedure may provide low latency to users that require it, as long as the user is able to determine the size and timing of the data message in advance. In the depicted case, the transmission delay 808 is substantially zero or, if the header messages are timed to slightly exceed the Data Ready time 801 by a few symbols, the transmission delay 808 would substantially equal the amount that the header messages exceed the Data Ready time 801.

The procedure of FIG. 8A may be implemented as a system or apparatus, a method, or instructions in non-transient computer-readable media for causing a computing environment, such as a user node, a base station, or other signally coupled component of a wireless network, to implement the procedure.

Figure 8B:
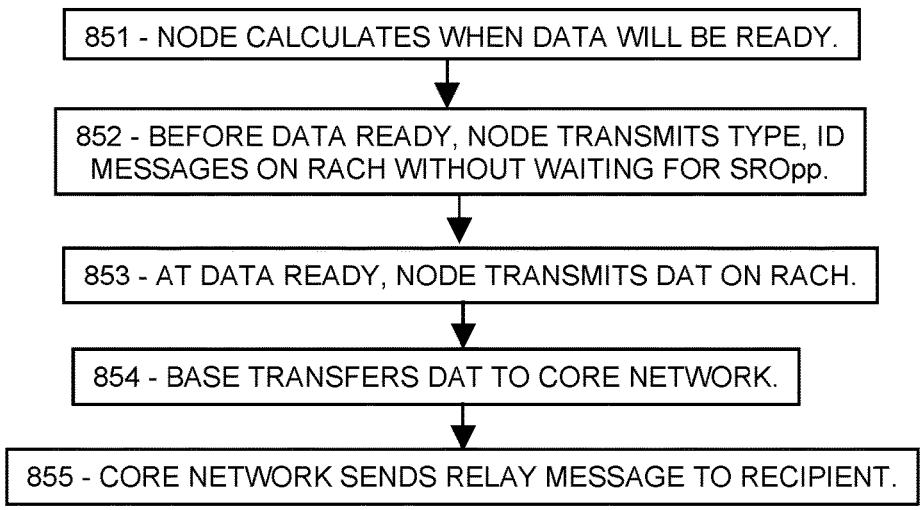
FIG. 8B is a flowchart showing an exemplary embodiment of a method for transmitting header files before a data message is ready, according to some embodiments.

FIG. 8B is a flowchart showing an exemplary embodiment of a method for transmitting header files before a data message is ready, according to some embodiments. In this example, a user node transmits header messages before a data message is ready, and then transmits the data message, all on the RACH without a grant, for low latency.

At 851, the node first calculates when the data message will be ready, and how much time is required to transmit a type and ID messages, and thereby at 852 begins transmitting the type and ID messages to finish at or about the time the data message is expected to be ready. If desired, or if required by the base station, a BSR or other size message may also be transmitted, and timed to finish at about the Data Ready time. Optionally, the header messages may be timed to finish shortly after the expected Data Ready time, such as one symbol time or a few symbol times or one slot or a half-slot after the expected Data Ready time, for example, to avoid having a gap between the ID message and the data message. At 853, the data message is ready and is transmitted, preferably with little or no gap, such as less than a gap equal to an interval that nodes are required to wait before transmitting on the random access channel. Optionally, one or more calibration symbols such as CMRS or PTRS may be transmitted as well, preferably before the type message. Optionally, the user node may arrange with the base station at an earlier time, such as when joining the network, to be prepared for actionable messages on the random access channel. Optionally, the base station may allocate a special unscheduled channel for such messages. Optionally, the user node may arrange a paid subscription or fee-per-use or other payment plan for such access.

At 854, the base station, having received the messages including the data message, transfers the data message, or a portion thereof, to the core network, which at 855 transfers a relay message containing the data message toward the recipient.

An advantage of transmitting the header messages, in this case a type message configured to tell the base station that a data message follows and an ID message configured to identify the transmitting node, before the data message is ready, may be to provide low latency, since the data message can then be transmitted as soon as it is ready. An advantage of transmitting the messages on the random access channel, or other monitored unscheduled channel allocated by the base station for this purpose, may be that unscheduled channels do not require permission to transmit, whereas scheduled channels such as the PUSCH require permission before transmitting. Another advantage may be simplicity, since a low-performance node may access 5G networking even if it is unable to comply with the formatting and other requirements of scheduled communications.

The procedure of FIG. 8B may be implemented as a system or apparatus, a method, or instructions in non-transient computer-readable media for causing a computing environment, such as a user node, a base station, or other signally coupled component of a wireless network, to implement the procedure.

Network operators generally face difficult management decisions regarding the number of random access channels and which user nodes may access them. User nodes would like as many monitored unscheduled channels as possible so that they can select an unoccupied channel for signaling. But the base station is obligated to monitor every unscheduled channel to detect new uplink messages, and the base station electronics can handle only a certain number of parallel tasks. In heavy traffic conditions, the network may choose to close some of the random access channels or convert them to scheduled channels to handle downlink traffic, for example. Cost-benefit analysis is generally difficult because each user node has a different priority and a different set of messaging plans, while rapidly fluctuating incoming messages further complicate the base station's task.

AI or artificial intelligence may provide substantial relief by assisting networks in allocating random access channels, or other monitored unscheduled channels, to optimize a network performance metric according to current operating conditions. Each unscheduled channel may be accessed by a select subset of the user nodes, or by all of the user nodes, under different conditions. The AI can be implemented as an algorithm that takes as input a number of current network conditions and provides as output a prediction of future performance in terms of the metric. Alternatively, the algorithm may be configured to compare options, determine which available option would likely provide the best future performance metric, and pass that recommendation to the network operators. The algorithm may also take as input the QoS requirement or priority level of each competing user node, its administrative status such as a police or medical emergency response station, its subscription status or fee basis such as a fee-per-message or the like, whether the planned data message is long or short, and other parameters affecting each user node differently. The network performance metric may include financial aspects as well as operational aspects, such as adjusting the number and allocation of random access channels to optimize a metric equal to the expected revenue, times the current throughput, minus an average delay time, for example. In these cases, the algorithm may assist network operators in allocating limited resources (bandwidth, energy consumption, base station parallel processing limits, among others) among competing users with disparate demands, to optimize (or at least improve) the network performance metric.

As discussed in more detail below, the AI algorithm may be prepared by acquiring a very large amount of empirical data on network performance under various conditions, developing an AI predictive model with a large number of adjustable internal variables, iteratively adjusting the variables to bring the predictions incrementally closer to the actual observed network performance, and then when the AI model is sufficiently proficient in performance prediction, condensing it into a readily usable algorithm that the networks can use to make complex operational decisions. The decisions are then expected to be more effective than arbitrary or ad-hoc operational decisions because the algorithm's suggestions are based on historical precedent.

Alternatively, development of a portable and readily usable algorithm for determining network parameter settings and choices, to optimize or at least improve one or more network performance metrics, may be a specialized optimization problem. Such an optimization problem may be resolved by providing a large amount of network operation data under various conditions and parameter settings, and adjusting variables such as variables affecting relationships between network operating parameters and the performance metrics, to obtain predictions about subsequent network performance, which can then be compared to the actual network performance subsequently observed. Iterative adjustment of the variables may then result in the algorithm providing sufficiently accurate predictions, such that the base station may be able to use the algorithm for network operations under at least some conditions, and may thereby obtain improved network performance, according to some embodiments.

Figure 9A:
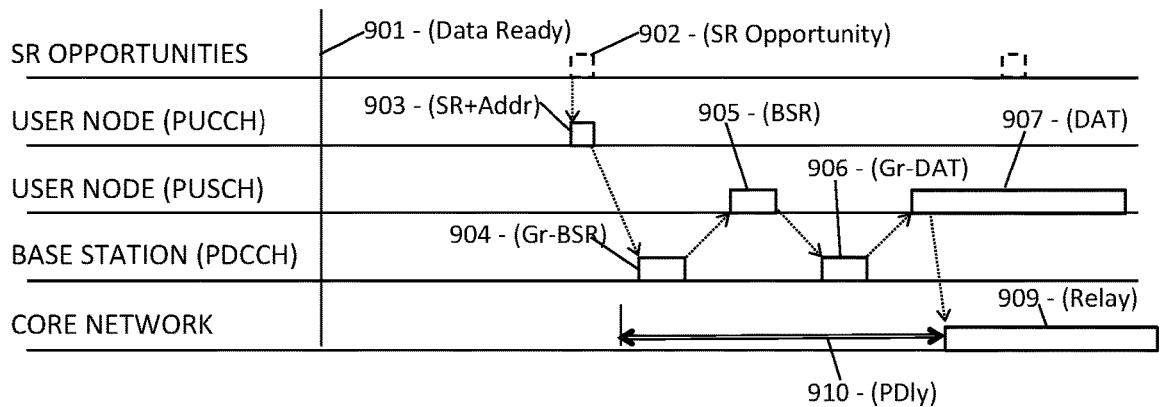
FIG. 9A is a sequence chart showing an exemplary embodiment of a procedure for encoding a destination address in an SR message, according to some embodiments.

FIG. 9A is a sequence chart showing an exemplary embodiment of a procedure according to the systems and methods, in which a user node specifies the destination address of a data message early in the procedure, according to some embodiments. In this example, the user node configures the SR message as an address message, representing the destination address of the data message. The lines represent SR opportunities, user node messages on the PUCCH and PUSCH channels, base station messages on the PDCCH, and actions of the core network. The data to be transmitted becomes ready at the Data Ready time 901. The user node waits for the first SR opportunity 902 and transmits a modified scheduling request message 903 on the PUCCH at that time, labeled "SR+Addr", wherein the SR message is modulated according to the destination address of the planned data message, such as the recipient's MAC address, or more preferably a code or pointer indicating the address. In this example, it is assumed that each SR opportunity has sufficient time allotted for transmitting the destination address, or alternatively that a code or pointer is used as the SR message with a length that fits in the allotted SR opportunity 902. The MAC address is generally 6 bytes, representing 6 symbols with 256QAM modulation, or 12 symbols at 16QAM, whereas examples of codes or pointers with 4 or 8 bits are described below. As an alternative, the SR+Addr message 903 may be more than one symbol wide, and may accommodate a regular SR message according to 5G, plus an address message, so that the base station may determine from the SR portion that the user node requests a grant, and from the Address portion what the destination address is.

Responsive to the scheduling request 903 modulated as the destination address (or code representing the address), the base station issues grant Gr-BSR 904 on the PDCCH, and the user node uploads a BSR message 905 on the PUSCH. At that point, the base station knows both the size of the data message 907 and the destination address, and therefore may prompt the core network to begin setting up a multi-hop relay agreement with other stations leading to the recipient's cell (not shown). The base station then issues grant Gr-DAT 906 for the data message 907 upload, which the user node then provides on the PUSCH. The base station receives the data message 907 and transfers it to the core network, which then transfers the data as a relay message 909 to other networks toward the recipient's cell. In this case, the user node has provided the destination address in advance of the data message. Therefore, it is not necessary for the base station or core network to wait for the data message 907 to be fully uploaded before arranging the handoff to other stations, and optionally beginning to transfer portions of the data message 907 to the core network while the data message 907 is still being uploaded by the user node. As shown, the base station can set up the multi-hop arrangement as soon as the destination address and message size are known, a time-saving advantage. In addition, if the arrangement is in place and acknowledged while the data message 907 is still being uploaded, then the base station may begin transferring portions of the data message to the core network incrementally, as each portion is received. The core network may begin transferring the data incrementally as a relay message 909 or a series of small relay messages, as soon as each symbol or subframe, or other unit, of the data message 907 is received by base station.

An advantage of providing the size and destination information before the data message 907 may be that doing so may provide additional time for the core network to arrange the relay transfer between other stations, which can be complicated. An advantage of transferring the data message 907 incrementally to the core network, while the data message is still being uploaded, may be that the core network may proceed to deliver each portion of the data message to the recipient as soon as that portion is received, and therefore the recipient can receive it sooner than if the transfer had been delayed until after the full data message 907 is received by the base station.

A delay termed the "procedure delay" or PDly 910, indicated by a double arrow, shows the time between the end of the scheduling request 903 and the start of the relay message 909. Reducing the procedure delay 910 is one of the goals of the systems and methods disclosed herein, according to some embodiments.

The procedure of FIG. 9A may be implemented as a system or apparatus, a method, or instructions in non-transient computer-readable media for causing a computing environment, such as a user node, a base station, or other signally coupled component of a wireless network, to implement the procedure.

Figure 9B:
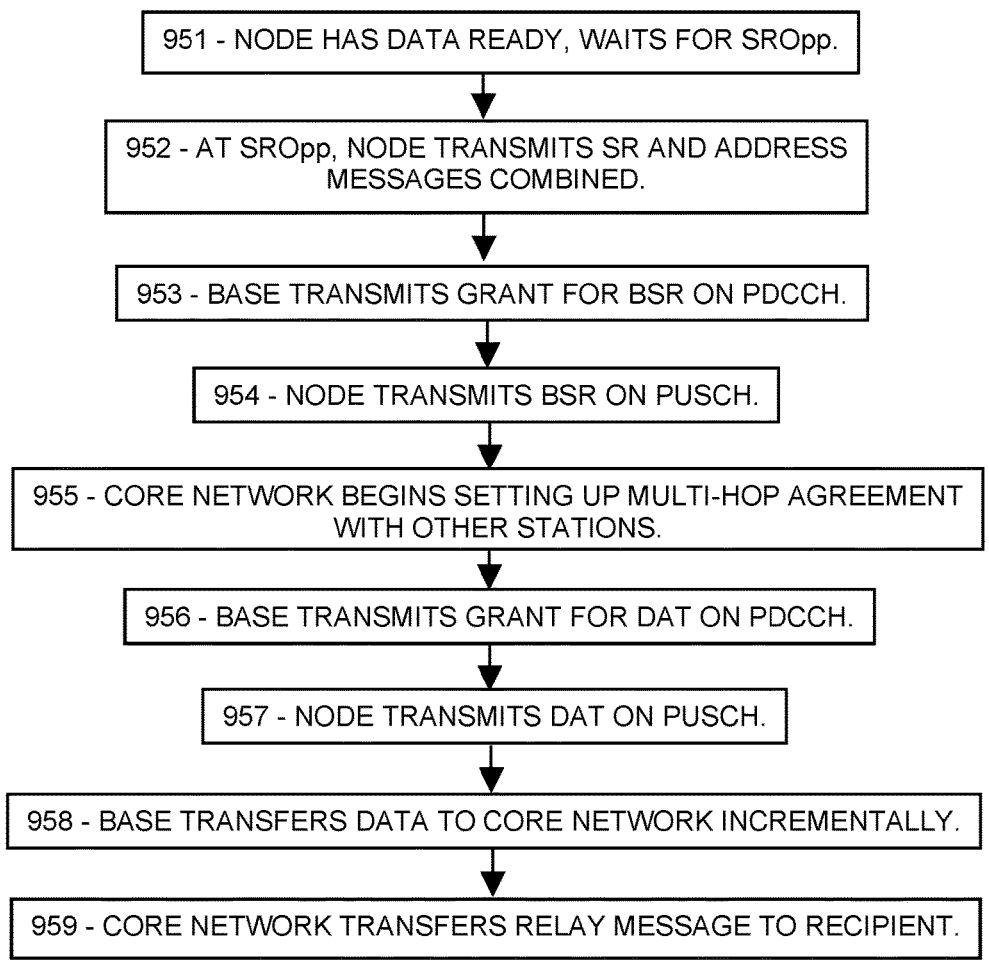
FIG. 9B is a flowchart showing an exemplary embodiment of a method for encoding a destination address in an SR message, according to some embodiments.

FIG. 9B is a flowchart showing an exemplary embodiment of a method for providing a destination address in an SR message, according to some embodiments. In this example, a user node transmits the destination address, or a code representing it, as an SR request (or in association with an SR request message) upon a pre-allocated SR opportunity. Alternatively, an unmodified scheduling request may be transmitted along with an indication of the destination address, such as two single-symbol messages in series, or a multiplex of the scheduling request with the size data, assuming the SR opportunity is wide enough to accommodate the two items of information. Disclosure of the destination address as the SR message may allow the base station to avoid decoding and interpreting the data message, thereby reducing demands on the base station and reducing delays. Early disclosure of the address may also help the core network to set up a multi-hop relay arrangement with other stations toward the recipient's cell, thereby reducing overall delays. In some cases, the transfer of data to the recipient may begin even as the data message is being uploaded, thereby allowing the message to reach the recipient sooner than if the transfer had been withheld until after the entire data message had been uploaded.

At 951, a user node has data ready to transmit, and waits for an SR opportunity, then 952 at the next SR opportunity, it transmits an SR message including the destination address of the data message, or a pointer or code representing the destination address, at the time and frequency allocated for SR messages. The pointer or code may be associated, in a look-up table for example, with each destination address being associated with one pointer or code, respectively. The pointer or code may be shorter than the destination address, thereby saving transmission time. The user node may transmit a message referencing the pointer or code in place of the destination address, and the base station may then find the destination address according to the pointer or code in the look-up table, and deliver the message to the destination address.

In an embodiment, the user node may transmit an address message in place of the SR message, the address message including the destination address or a code thereof. The address message, appearing at a resource element allocated for scheduling requests, may thereby indicate to the base station that a grant is requested. Alternatively, the combined SR and address messages, transmitted within one SR opportunity, may represent a request for a grant, and also informs the base station of the address of the recipient. Alternatively, the user node may multiplex the SR request with the address pointer, among other possible ways to inform the base station of the user node's intent to send a data message to the provided address. The user node may arrange, with the base station, to agree on which type of message combination will be used as SR requests, and how to interpret each bit or symbol of the combined SR+Address communication. Such negotiation may be completed at the time of the user node joining the network, or may be instructed by the base station to the user node in, for example, an RRC message.

At 953, the base station has received the SR request and the destination address, and therefore transmits an uplink grant for a BSR message on the PDCCH channel. The user node then at 954 transmits the BSR as instructed.

If the address message is a pointer or code representing the address, such as an index associated with the MAC address of the recipient, then the base station or core network may substitute the actual address for the pointer at this time. Since the base station then has both the destination address and the size of the data message, which are needed to set up the relay transfer, the base station may inform the core network of the size of the planned data message and its destination address without waiting for the full data message upload. Then at 955, the core network may begin negotiating a multi-hop relay transfer through other stations.

Responsive to the BSR message, the base station at 956 provides an uplink grant for the data message, and the user node begins transmitting it at 957. At 958, the base station begins transferring the data message portions to the core network incrementally, as each portion is received. At 959, the core network begins transferring a relay message based on the data message to the wider network, continuing while the data message continues to be uploaded. Alternatively, the transfer may be done after the data message has been uploaded if incremental transfer is not supported or if the relay agreements are not yet in place.

An advantage of providing the destination address, or a code representing it, upon the SR opportunity may be that this early disclosure of the address may help the core network in setting up the relay transfer to the recipient. In addition, early disclosure may allow the base station to avoid decoding and interpreting the data message to extract the destination address, thereby saving time and reducing demands on the base station. In addition, the early disclosure of the destination along with the BSR message may enable the core network to transfer the message to the recipient incrementally, rather than delaying the transfer until the upload is complete, a further time savings, according to some embodiments.

The procedure of FIG. 9B may be implemented as a system or apparatus, a method, or instructions in non-transient computer-readable media for causing a computing environment, such as a user node, a base station, or other signally coupled component of a wireless network, to implement the procedure.

Figure 10A:
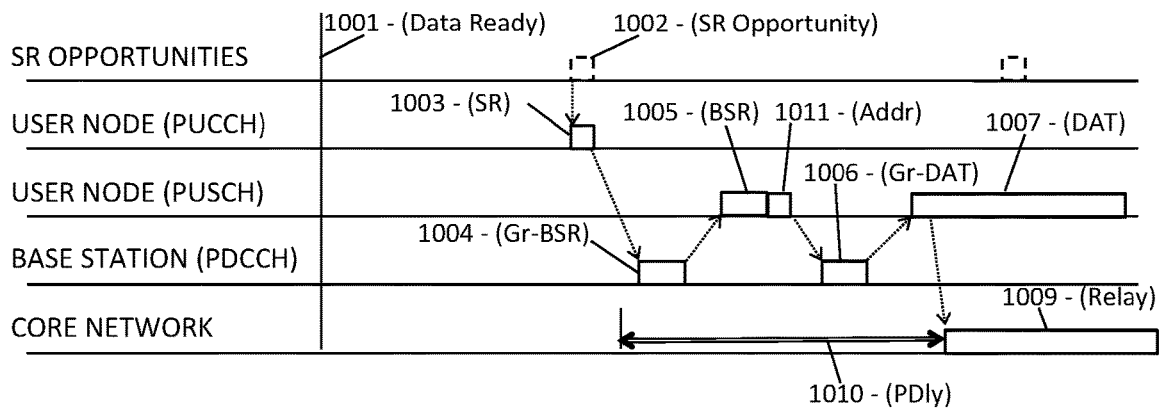
FIG. 10A is a sequence chart showing an exemplary embodiment of a procedure for including a destination address with a BSR message, according to some embodiments.

FIG. 10A is a sequence chart showing an exemplary embodiment of a procedure according to the systems and methods, in which a user node combines the destination address with a BSR message, according to some embodiments. The lines represent SR opportunities, user node messages on the PUCCH and PUSCH channels, base station messages on the PDCCH, and actions of the core network. The data to be transmitted becomes ready at the Data Ready time 1001. The user node waits for the next SR opportunity 1002 and transmits a standard scheduling request message 1003 on the PUCCH at that time. The base station then sends a grant Gr-BSR 1004, prompting the user node to transmit a BSR message 1005 on the PUSCH. The user node then transmits the BSR message 1005, and then continues transmitting, without a gap in this case, an address message 1011 including the destination address. The base station receives the BSR and address messages 1005, 1011 and sends a grant Gr-DAT 1006 for the full data message 1007, enabling the user node to upload the data message 1007. The base station transfers the data message 1007 to the core network incrementally in real-time, whereupon the core network configures a relay message 1009 containing the data and forwards it to other links toward the destination incrementally, that is, each uploaded portion being transferred when ready. Optionally, the address message 1011 may include a code or pointer indicating the destination address, rather than the full address, the code or pointer being shorter than the full address, and therefore being more likely to fit within the limited Gr-BSR grant 1004. As another option, the address message 1011 may be multiplexed with the BSR message, such as a 4-bit BSR multiplexed with a 4-bit address pointer, thereby making up an 8-bit symbol in the resource element provided by the Gr-BSR grant 1004.

An advantage of appending the address message 1011 to the BSR message 1005 may be that the core network may begin setting up the relay agreement in advance, thereby reducing latency. In addition, the data message 1007 may be transferred from the base station to the core network incrementally, such as one slot or some number of symbols or some block of decoded bits at a time, and the incremental portions may be delivered to the recipient when each portion is ready. The recipient may thereby receive the complete message sooner than if the transfer had waited until the complete data message had been uploaded. The procedure delay PDly 1010 is shown, and is shorter than for the case of FIG. 9 due to these delay-avoidance measures.

The procedure of FIG. 10A may be implemented as a system or apparatus, a method, or instructions in non-transient computer-readable media for causing a computing environment, such as a user node, a base station, or other signally coupled component of a wireless network, to implement the procedure.

Figure 10B:
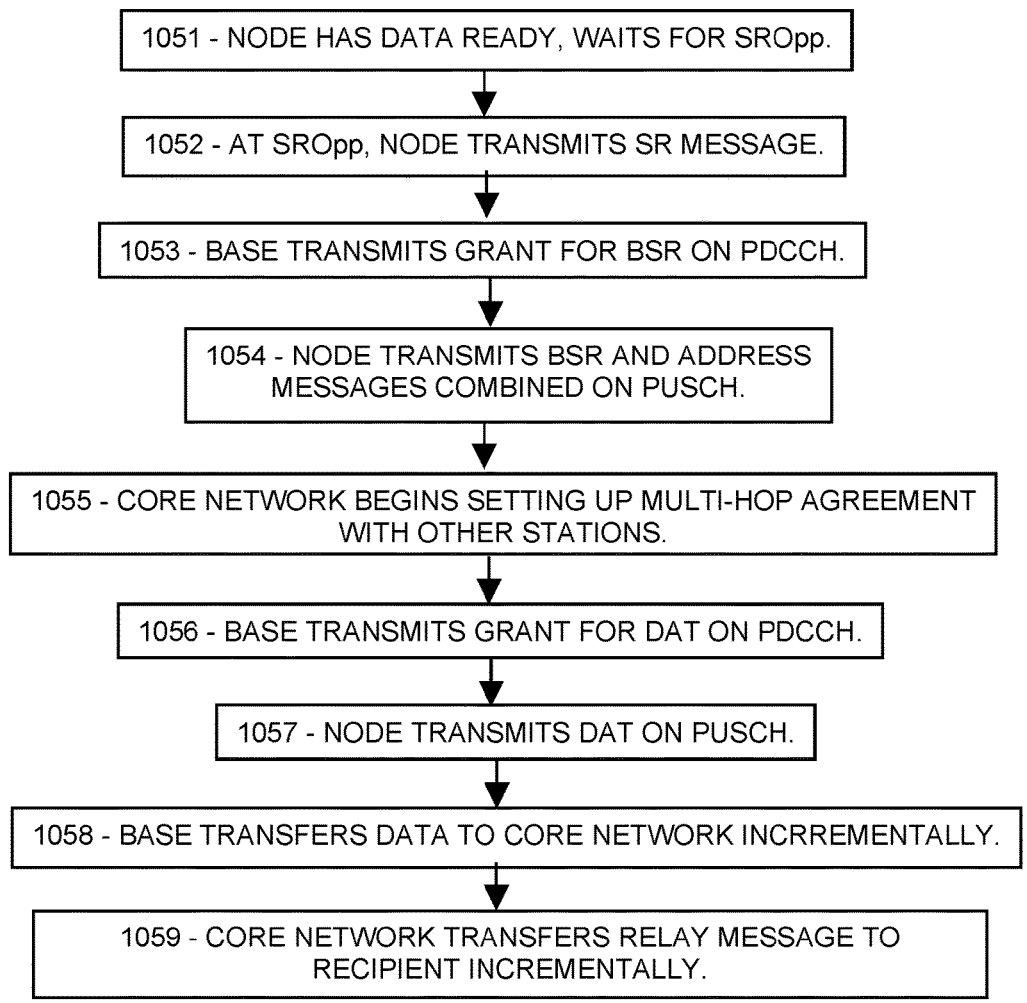
FIG. 10B is a flowchart showing an exemplary embodiment of a method for including a destination address with a BSR message, according to some embodiments.

FIG. 10B is a flowchart showing an exemplary embodiment of a method for including a destination address with a BSR message, according to some embodiments. At 1051, the node has data ready to send, and at 1052 upon the next SR opportunity, the user node transmits an unmodified SR message on the PUCCH. At 1053 the base station provides an uplink grant for a BSR message. Then at 1054, the user node transmits a combined BSR and address message indicating both the size and destination address of the data message. The BSR and address messages may be concatenated or multiplexed or otherwise combined in such a way that the base station can determine that they are related and can learn both the size of the data message and its destination. Preferably a gap between the messages is zero, or no larger than a predetermined value, such as a sensing slot which other nodes are required to wait before transmitting, or a fixed value such as 9 microseconds, the default 5G sensing slot interval before transmitting on a shared channel.

At 1055, the base station informs the core network of the size and destination of the data message, so that the core network can begin arranging for a multi-hop transfer of the message in the larger network. At 1056, the base station transmits a second grant, sized for the data message, and at 1057 the user node begins uploading the data message. At 1058, during the upload, the base station transfers each received portion of the data message to the core network, that is, it transfers the message contents incrementally. At 1059, assuming the relay agreement is in place with other stations, the core network then begins incrementally transferring the data as one or more relay messages, while the data message continues to be uploaded. Alternatively, if the agreement is not yet finalized, or if incremental transfer is not feasible, then the core network may transfer the relay message as a unit after the data message has been fully uploaded, instead of incrementally.

As a further option, the user node and the base station may exchange messages at an earlier time, so that the base station will provide a larger Gr-BSR grant than usual to this particular user node. The larger grant may then accommodate the address information as well as the size information.

An advantage of providing the destination address in association with the size information may be that the early disclosure of the size and address may enable the core network to begin setting up a relay agreement in advance. An advantage of providing the address message in association with the BSR message, instead of merging the address with the SR request as in the previous example, may be that the SR opportunities are generally tightly constrained to avoid wasting resources, whereas the grant for the BSR message may be readily expanded to include the destination address message, or a pointer to it. The user node and the base station may agree on this strategy, of uploading the destination address in association with the size information, and may select a format for the same, at an earlier time, such as when joining the network for example. An advantage of transferring the relay message to the recipient incrementally, rather than as a unit after the data message has been uploaded, may be that the recipient may receive the message sooner.

The procedure of FIG. 10B may be implemented as a system or apparatus, a method, or instructions in non-transient computer-readable media for causing a computing environment, such as a user node, a base station, or other signally coupled component of a wireless network, to implement the procedure.

Figure 11A:
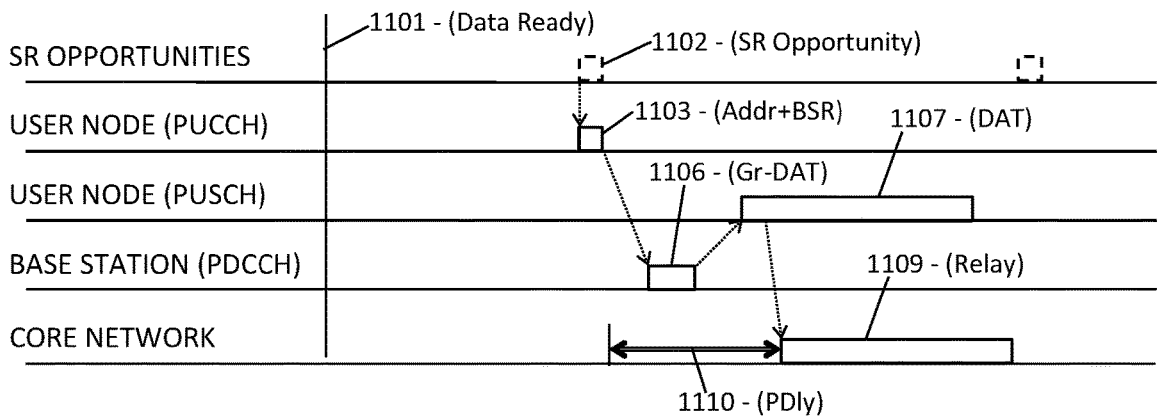
FIG. 11A is a sequence chart showing an exemplary embodiment of a procedure for including a destination address and a BSR message with a scheduling request, according to some embodiments.

FIG. 11A is a sequence chart showing an exemplary embodiment of a procedure according to the systems and methods, in which a user node discloses both the destination address and size of a data message before transmitting the data message, according to some embodiments. In this example, the user node appends or multiplexes or otherwise combines the size information and the addressing information, and provides the combined information upon an SR opportunity in place of a standard SR message. Depicted are SR opportunities, user node messages on the PUCCH and PUSCH channels, base station messages on the PDCCH, and actions of the core network. The data to be transmitted becomes ready at the Data Ready time 1101. The user node waits for the next SR opportunity 1102 and then transmits a scheduling request message 1103 on the PUCCH at that time, labeled "Addr+BSR", wherein the SR message 1103 includes both the destination address and the size of the planned data message. The address may be the recipient's MAC address or a code or pointer representing same. The size information may be encoded as a BSR message or other format indicating the size of the data message. In this example, it is assumed that sufficient time is allotted for transmitting the modified scheduling request including the destination address and the size information. (Other versions are disclosed below.)

Responsive to the scheduling request 1103, modulated as the destination address plus the size information, the base station issues grant Gr-DAT 1106 on the PUSCH, calling for the data message 1107 to be uploaded. Since the base station has obtained the BSR size information from the initial SR message 1103, a grant-BSR handshake is not needed. The base station receives the data message 1107 and transfers it to the core network, which transfers the data as a relay message 1109 to other networks toward the recipient's cell. Specifically, the data message is separate from the address message and is received after the address message. The time between reception of the full address message and reception of the full data message is thus extra time that the base station and core network can use to prepare for a cooperative transfer of the message to the recipient through the wider network, and optionally to begin that transfer incrementally.

An advantage of including the destination address and the size information in the initial SR request may be that numerous delays may be avoided, including delays associated with the BSR and its grant, and delays associated with decoding the data message, and therefore the recipient may receive the message sooner than otherwise. That is, if the destination address were not disclosed prior to the data message, the base station would have to extract the destination address from a field of the data message after the data message has been fully received and demodulated. Early disclosure of the destination address thus provides additional time for the base station and the core network to arrange a multi-hop agreement with other stations to transfer the data message (or an extract thereof) to the recipient. Another advantage may be that the core network can begin transferring the relay message 1109 symbol-by-symbol or subframe-by-subframe or other increment while the data message 1107 is being uploaded to the base station. The procedure delay 1110 is also indicated. Due to the avoidance of a full handshaking cycle, the procedure delay 1110 is shorter than for the example of FIG. 10A.

The procedure of FIG. 11A may be implemented as a system or apparatus, a method, or instructions in non-transient computer-readable media for causing a computing environment, such as a user node, a base station, or other signally coupled component of a wireless network, to implement the procedure.

Figure 11B:
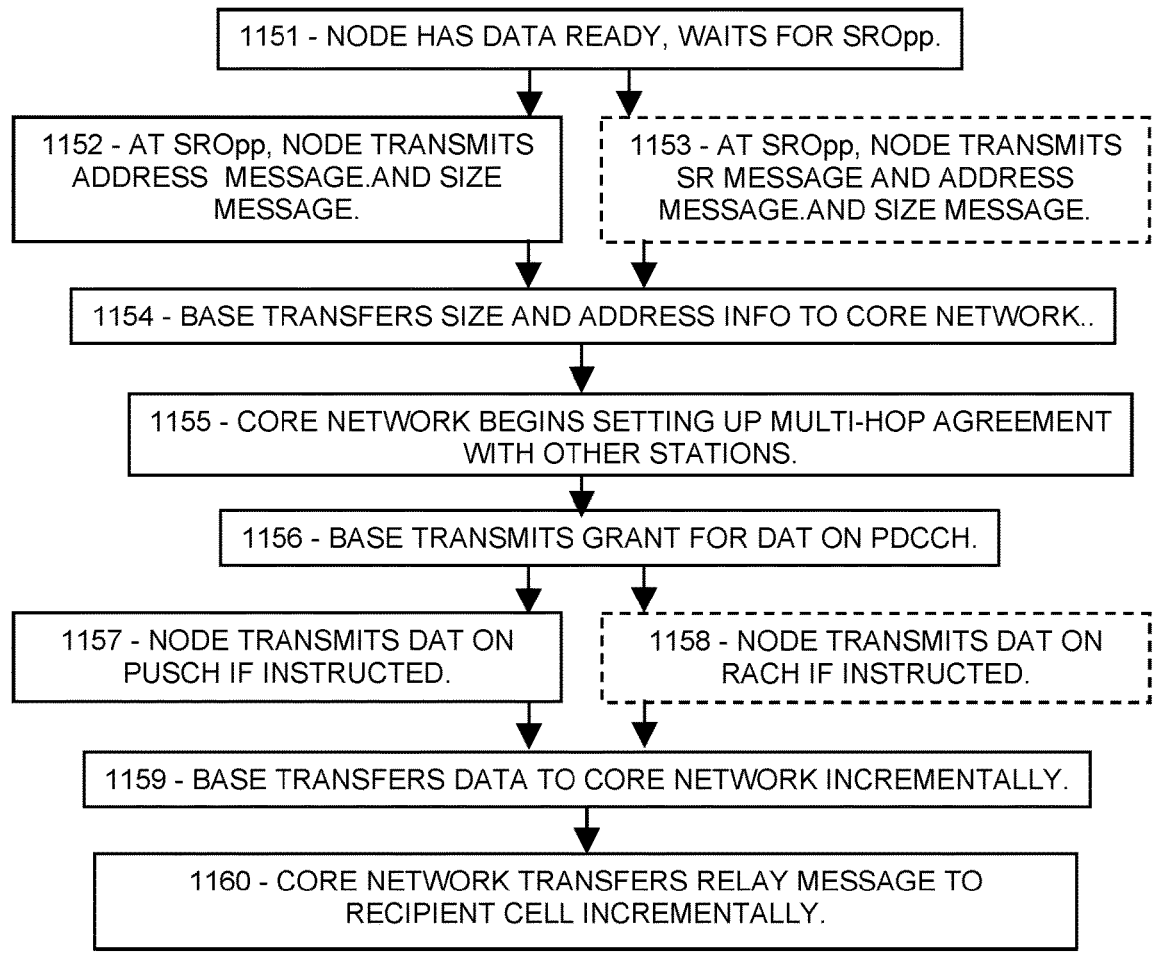
FIG. 11B is a flowchart showing an exemplary embodiment of a method for including a destination address and a BSR message with a scheduling request, according to some embodiments.

FIG. 11B is a flowchart showing an exemplary embodiment of a method for including a destination address and a BSR message with a scheduling request, according to some embodiments. In this example, the destination address and the size information are both provided at the SR opportunity, either with an SR request or substituting for it. The base station can thereby avoid delays associated with the BSR solicitation and also accelerate the message relay transfer, according to some embodiments.

At 1151, the user node has data ready, and waits for the next SR opportunity. At 1152, the user node transmits a size message (such as a BSR) indicating the size of the data message, and an address message indicating the destination address. Alternatively (in dash), if the network requires a standard SR message as well, then at 1153 the user node transmits an SR message followed by the size and address messages. The messages may be concatenated or multiplexed or otherwise combined so that the base station can determine that they are all related, and so that they all fit within the allocated SR opportunity. Optionally a calibration message such as a DMRS may be prepended as well. At 1154, the base station transfers the size and address information to the core network, so that the core network can begin (1155) setting up the transfer agreement with other stations leading to the cell in which the recipient is registered.

At 1156, the base station provides an uplink grant for the data message, which the user node then transmits on the PUSCH channel at 1157 or on the RACH channel at 1158 depending on what the grant specifies. In either case, the base station then 1159 begins transferring the data to the core network incrementally, while the upload is in progress. The incremental transfer may be parsed slotwise, or a symbol-at-a-time (if still modulated), or a byte-at-a-time (if demodulated by the base station), or by numbered fragments, or other increment as suitable. Concurrently, at 1160, the core network activates the arranged relay agreement by transferring the data as one or more relay messages in increments, assuming the transfer agreement has been finalized at that time, and if not, the core network may wait until it is finalized and then send the relay message all at once. The recipient's base station may accumulate the portions as they arrive and reconstruct the full data message before downloading it to the recipient, thereby making the processing aspects transparent to the recipient. Alternatively, the recipient's base station may pass the relay message portions to the recipient and allow the recipient's device to reassemble the data message. In either case, the recipient would receive the full message sooner than if the data message had been transferred as a unit, according to some embodiments.

An advantage of providing the size and address information upon an SR opportunity may be that this early disclosure, of the information needed for the relay transfer in the wider network, may allow the core network to set up the relay agreement before the data message has been uploaded, thereby saving time, according to some embodiments. Another advantage may be that a separate grant for the BSR message may be avoided, a further time savings. Another advantage may be that the early disclosure may provide additional time for the base station or core network to substitute the destination address, such as its MAC address, for a code or pointer that is provided in the address message. If the code or pointer is smaller than the 6-byte MAC address, then the address message may be uploaded more quickly than the full address, a further time savings. Another advantage may be that the method may be implemented by modifying the base station or core network software, a relatively low-cost low-risk investment compared to hardware development, according to some embodiments.

The procedure of FIG. 11B may be implemented as a system or apparatus, a method, or instructions in non-transient computer-readable media for causing a computing environment, such as a user node, a base station, or other signally coupled component of a wireless network, to implement the procedure.

Figure 12A:
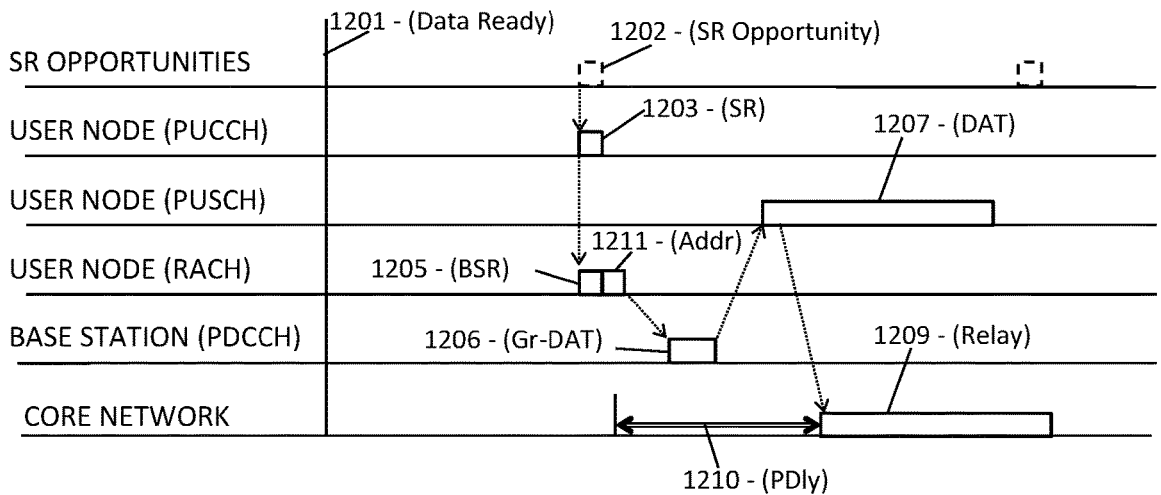
FIG. 12A is a sequence chart showing an exemplary embodiment of a procedure for transmitting a BSR message and a destination address on a random access channel, according to some embodiments.

FIG. 12A is a sequence chart showing an exemplary embodiment of a procedure according to the systems and methods, in which a user node discloses the destination address of a data message and the size of the data message on a random access channel, or the like, according to some embodiments. The horizontal lines represent SR opportunities, user node messages on the PUCCH and PUSCH and RACH channels, base station messages on the PDCCH, and actions of the core network. The data to be transmitted becomes ready at the Data Ready time 1201. The user node waits for the next SR opportunity 1202 and at that time transmits a standard SR message 1203 on the PUCCH channel. The user node also transmits, on the RACH channel, a BSR message 1205 and an address message 1211 indicating the destination address of the recipient. The user node transmits the size and address messages 1205-1211 at the same time as the SR message 1203, or in a time-synchronized manner so that the base station can determine that they are related to the SR message 1203. Optionally, and preferably, the user node also sends one or more calibration messages such as a DMRS before or after the other messages 1205-1211 on the RACH.

The base station detects the SR message 1203 and thereby determines which user node is ready to transmit, and also detects the BSR 1205 and address message 1211 on the random access channel. Due to the synchronization in time of the SR message 1203 and the BSR message 1205 and the address message 1211, the base station determines that the three messages are related to the impending data message, and also that a Gr-BSR handshake cycle is not needed since the size of the data message is already known from the concurrent BSR message 1205. Therefore, the base station transmits a Gr-DAT uplink grant 1206, enabling the user node to upload the data message 1207 on the PUSCH, or alternatively on the RACH, or other channel preferred by the base station. The base station then receives the data message 1207 and transfers it, or a deliverable portion thereof, to the core network, which then transfers the data as a relay message 1209 to the larger network for delivery to the recipient. Optionally, the base station may send an acknowledgement (not shown) back to the user node after the data message is uploaded. Since the destination address is already known, from the address message 1211, the base station can transfer the data message 1207 to the core network incrementally, while the data message 1207 is still being uploaded, and the core network can transfer a relay message 1209 based on the data message 1207 incrementally to the recipient's cell, thereby saving time. Alternatively, if incremental transfer is not supported, the core network can wait until the data message 1207 is fully uploaded and then transfer the relay message 1209 as a unit. The procedure delay PDly 1210 is also shown, extending from the end of the SR message 1203 to the beginning of the relay message 1209, assuming incremental transfer.

An advantage of providing the size and address information on the random access channel synchronized with the SR message 1203 may be that a separate grant for a BSR message is avoided, and that the multi-hop relay arrangement may be completed sooner, and that the data may be delivered to the recipient sooner, than if the size and address information had been retrieved from the full data message 1207. Another advantage may be that the method may be implemented by modifying software, a relatively low-cost low-risk investment compared to hardware development, according to some embodiments.

The procedure of FIG. 12A may be implemented as a system or apparatus, a method, or instructions in non-transient computer-readable media for causing a computing environment, such as a user node, a base station, or other signally coupled component of a wireless network, to implement the procedure.

Figure 12B:
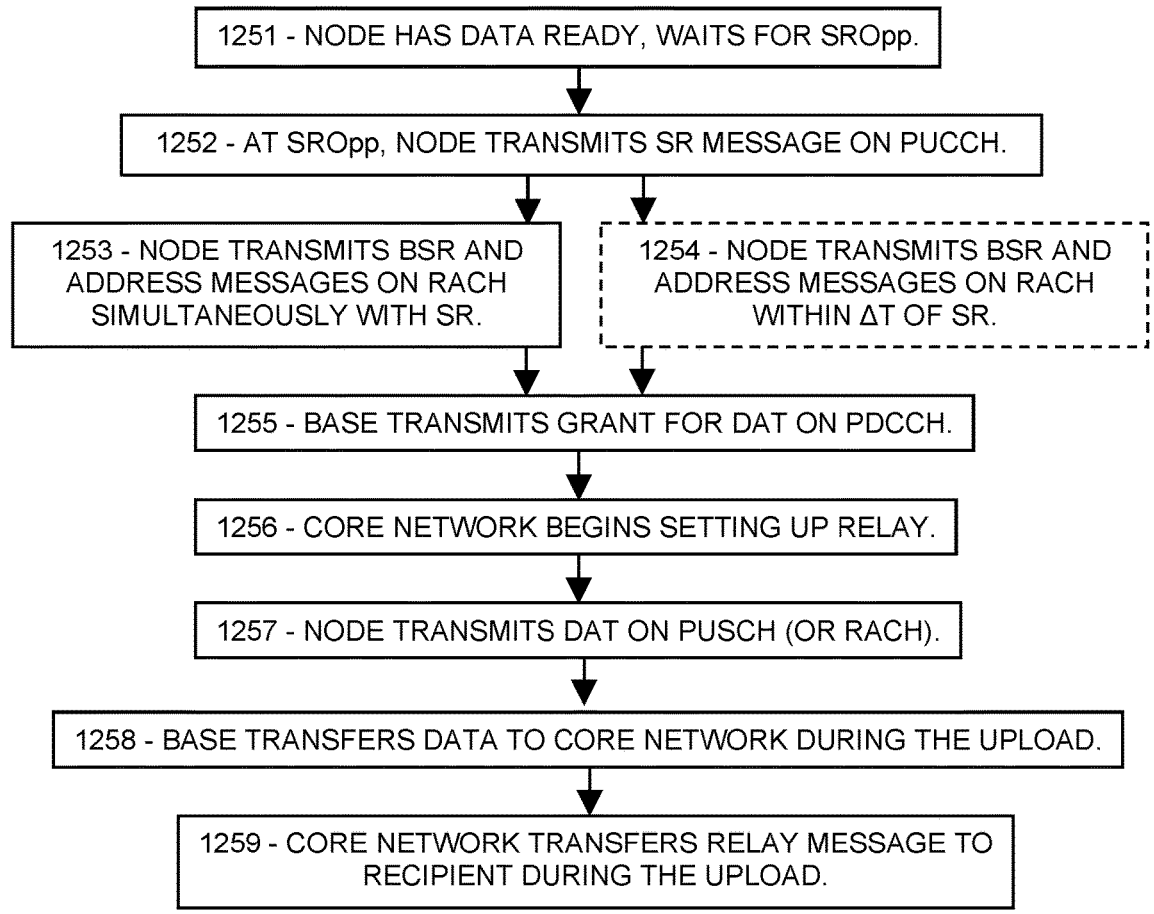
FIG. 12B is a flowchart showing an exemplary embodiment of a method for transmitting a BSR message and a destination address on a random access channel, according to some embodiments.

FIG. 12B is a flowchart showing an exemplary embodiment of a method for transmitting a BSR message and a destination address on a random access channel, according to some embodiments. In this example, the user node transmits a regular (unmodified single-bit formatted) SR message on the PUCCH, and synchronously transmits a size and address message on the RACH.

At 1251, a user node has data ready and waits for the next SR opportunity, and at 1252 transmits an SR request on the PUCCH at the pre-assigned time. The user node also transmits a BSR message and an address message disclosing the size and destination address (or a code or pointer indicating same) of the data message, on the RACH channel or other channel allocated by the base station for this purpose, simultaneously with the SR message (1253). Alternatively, the address and size messages may be transmitted 1254 within a predetermined interval AT before or after the SR message (in dash), so that the base station can determine that the three messages are related. The time position of the size and address messages may be agreed upon with the base station prior to usage, such as when the user node joins the network, or other time.

At 1255, having received the size information, the base station transmits a grant for the full data message upload. At 1256, the base station transfers the size and address information to the core network, which then begins setting up the multi-hop relay agreement for transferring the data message to the recipient. Then at 1257, the user node begins uploading the data message on the PUSCH or, if directed in the grant, on the RACH or other channel. At 1258, during the upload, the base station transfers the data message incrementally to the core network, and at 1259 the core network transfers the data as a relay message, also incrementally during the upload if feasible, to the recipient. However, if the multi-hop agreement is not finalized at that time, then the core network may wait until the agreement is finalized.

An advantage of providing the size and address messages on the RACH, instead of on the PUCCH with the SR message, may be that resources are saved thereby. The SR message may be required to be a short one-symbol message which would not accommodate the other information. An advantage of disclosing the size of the data message during the SR request time may be that a grant cycle to solicit the BSR message may be avoided, saving time. An advantage of disclosing the destination address early, such as during the SR request time, may be that the core network may begin setting up the relay agreement without delay. Another advantage may be that the base station may avoid the delay involved in extracting the destination address from the data message, and may begin transferring the data message incrementally to the core network during the upload, a further time savings. Another advantage may be that if the address message is a code or pointer indicating the recipient's address instead of the full MAC address, then the early disclosure gives the base station additional time to substitute the full address using, for example, a lookup table or the like.

The procedure of FIG. 12B may be implemented as a system or apparatus, a method, or instructions in non-transient computer-readable media for causing a computing environment, such as a user node, a base station, or other signally coupled component of a wireless network, to implement the procedure.

Figure 13A:
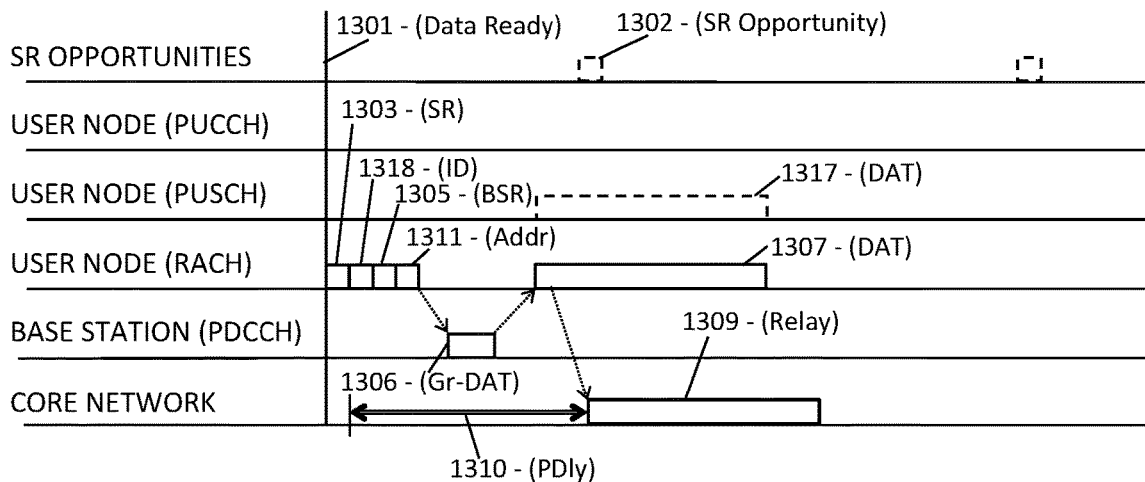
FIG. 13A is a sequence chart showing an exemplary embodiment of a procedure for transmitting a scheduling request and a destination address on a random access channel, according to some embodiments.

FIG. 13A is a sequence chart showing an exemplary embodiment of a procedure according to the systems and methods, in which a user node requests a grant and discloses the destination address of a data message and the size of the data message, all on a random access channel, according to some embodiments. The lines represent SR opportunities, user node messages on the PUCCH and PUSCH and RACH channels, base station messages on the PDCCH, and actions of the core network. The data to be transmitted becomes ready at the Data Ready time 1301. The user node does not wait for an SR opportunity 1302 in this case, but begins transmitting messages on the RACH channel (or other unscheduled channel allocated for the purpose) as soon as the data is ready. At the Data Ready time 1301, the user node transmits an SR message 1303 (or equivalent) requesting a grant, along with an identification message 1318, a BSR message 1305, and an address message 1311 indicating the destination address, all on the RACH. Optionally, and preferably, calibration symbols such as a DMRS (not shown) may be prepended to the SR message 1303. The base station, which monitors the RACH channel, receives the four messages 1303, 1318, 1305, and 1311, determines that a Gr-BSR grant is not needed, and sends the user node an uplink grant Gr-DAT message 1306 for the data message 1307, on the PDCCH. The user node then transmits the DAT message 1307 on the RACH channel, or on the PUSCH channel 1317 (dash), depending on what the Gr-DAT message 1306 specifies. Optionally, the base station may transmit an acknowledgement message (not shown) to the user node on either the PDCCH or RACH channel, or other channel. The base station transfers the data message 1307 to the core network incrementally as it arrives. The core network receives the data message 1307 and transfers it in real-time as a relay message 1309 to other stations and ultimately to the recipient.

An advantage of transmitting the pre-grant messages 1303, 1318,1305, 1311 on the RACH at the Data Ready 1301 time may be that the recipient may receive the data sooner than otherwise, by avoiding waiting for an SR opportunity, by avoiding the unnecessary BSR handshake, and by enabling incremental transfer of the data message 1307. The procedure delay PDly 1310 is indicated, and is shorter than that of FIG. 10 due to the avoidance of a grant cycle and the foreknowledge of the destination address. Another advantage may be that the method may be implemented by modifying the base station or core network software, and user node software, a relatively low-cost low-risk investment compared to hardware development, according to some embodiments.

The procedure of FIG. 13A may be implemented as a system or apparatus, a method, or instructions in non-transient computer-readable media for causing a computing environment, such as a user node, a base station, or other signally coupled component of a wireless network, to implement the procedure.

Figure 13B:
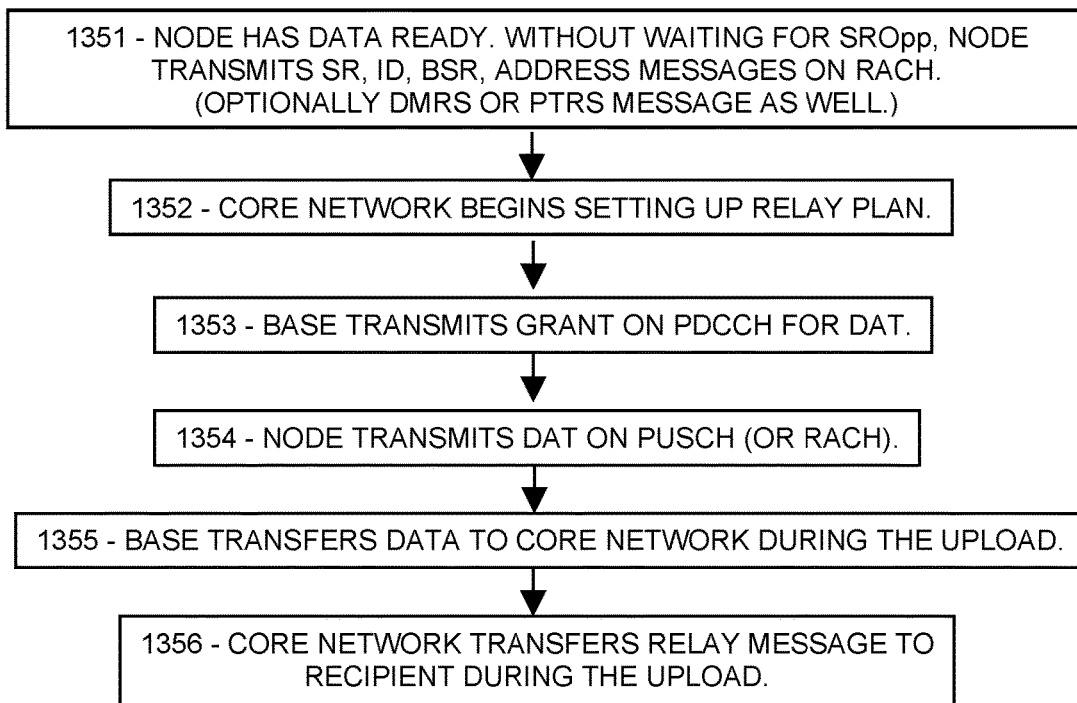
FIG. 13B is a flowchart showing an exemplary embodiment of a method for transmitting a scheduling request and a destination address on a random access channel, according to some embodiments.

FIG. 13B is a flowchart showing an exemplary embodiment of a method for transmitting a scheduling request and a destination address on a random access channel, according to some embodiments. In this example, the user node transmits a grant request, an ID message, a BSR, and an address message, and optionally a DMRS or PTRS or CRC message, as soon as the data is ready, rather than waiting for an SR opportunity. Low latency may thereby be provided, according to some embodiments.

At 1351, the user node has a data message ready to send, and at that time, without waiting for an SR opportunity, the user node transmits, on the RACH or other unscheduled channel allocated for the purpose, a series of messages including a scheduling request SR message (or the like) requesting an uplink grant for the data message, an identification ID message indicating the identity of the user node, a size message such as a BSR indicating the size of the data message, and an address message indicating the destination address, or a code representing the address. These messages are transmitted contiguously, or at least without gaps greater than a sensing slot, thereby preempting other nodes that may wish to transmit on the same channel. Optionally, the user node may transmit one or more calibration messages such as DMRS or PTRS messages to assist the base station in demodulating the messages. Also, the SR message may be configured to specify the types of messages being transmitted as well as to request an uplink grant, according to some embodiments.

At 1352, the base station has alerted the core network of the impending data message including its size and destination address, and the core network begins setting up the multi-hop relay agreement with other stations. At 1353, responsive to the SR request, the base station transmits a grant on the PDCCH for the full data upload. (The grant-BSR cycle is avoided since the size information was already disclosed pre-grant.) At 1354, the node then transmits the data message on whichever channel, PUSCH or RACH or other, the base station has specified in the grant.

At 1355, the base station begins transferring the data message to the core network incrementally, during the upload, so that the core network can begin transferring a relay message, based on the data message, at 1356, to the recipient as the upload proceeds, if feasible.

An advantage of requesting an uplink grant asynchronously on a random access channel as soon as the data message is ready may be that lower latency may be achieved due to the avoidance of waiting for the next SR opportunity. An advantage of providing the size message at that time may be that the grant-BSR handshake may be avoided, saving further time. An advantage of disclosing the recipient address (or code or pointer) pre-grant may be that the core network may begin setting up the relay transfer in advance, saving further time and computing cycles, allowing the computing environments operating these functions to operate more efficiently, according to some embodiments.

The procedure of FIG. 13B may be implemented as a system or apparatus, a method, or instructions in non-transient computer-readable media for causing a computing environment, such as a user node, a base station, or other signally coupled component of a wireless network, to implement the procedure.

Figures 14A, 14B:
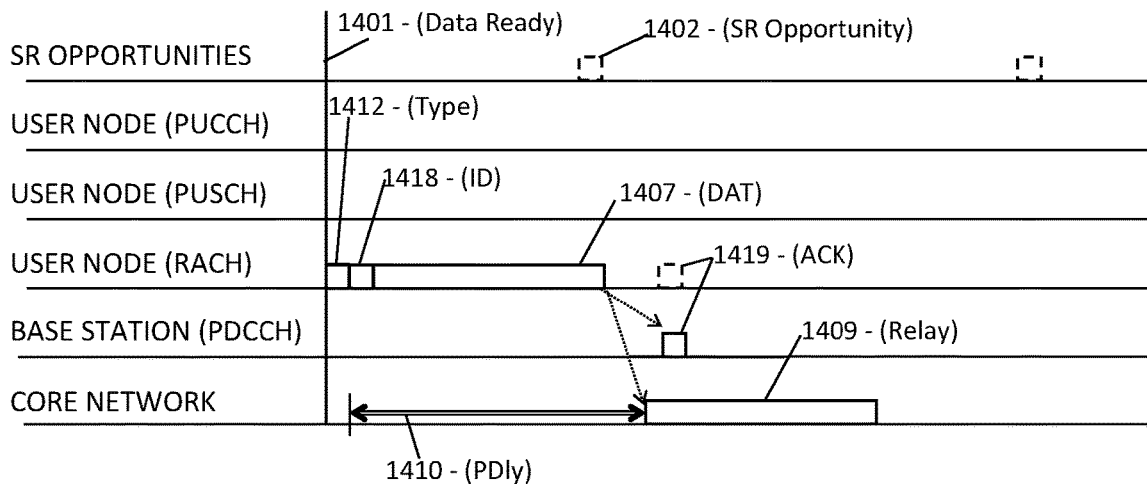
FIG. 14A is a sequence chart showing an exemplary embodiment of a procedure for transmitting a complete message sequence on a random access channel, according to some embodiments.
FIG. 14B is a flowchart showing an exemplary embodiment of a method for transmitting a complete message sequence on a random access channel, according to some embodiments.

FIG. 14A is a sequence chart showing an exemplary embodiment of a procedure for transmitting a data message on an unscheduled channel, according to some embodiments. In this example, the user node sends the data message on the RACH without a grant. Horizontal lines indicate SR opportunities 1402, signals of a user node on the PUCCH, PUSCH, and RACH channels, signals of the base station on the PDCCH, and of the core network, relative to a Data Ready time 1401 when a data message becomes ready to transmit. Immediately upon Data Ready 1401, the user node transmits, on an unscheduled channel such as one of the RACH channels, a series of messages. The messages include a type message 1412 indicating that a data message is to follow, an ID identification message 1418 indicating the identity of the user node, such as its C-RNTI or RA-RNTI, and the data message DAT 1407. The destination address is embedded in the data message 1407 in this case. The base station, upon receiving the messages 1412, 1418, 1407, then decodes the data message 1407, determines the destination address therefrom, and transfers the data message 1407 to the core network, which converts it to a relay message 1409 and sends it to a wider network for delivery to the recipient. The base station also transmits an acknowledgement message 1419 back to the user node on the PDCCH or (in dash) on the RACH. The procedure delay PDly 1410, from the initial type message 1412 to the relay message 1409, is indicated. In addition, a brief LBT (listen-before-talk interval, not shown) may precede the 1412 type message, to avoid collisions.

The message sequence, type 1412, ID 1418, and DAT 1407, may be termed "actionable" in that it includes all of the information needed to prepare and deliver the relay message 1409 to the recipient without further messaging to the user node, other than a final acknowledgement 1419, if desired.

An advantage of transmitting the data message 1407, along with necessary type and identification messages 1418-1412, on an unscheduled channel without waiting for an SR opportunity 1402, may be that the data message 1407 can be uploaded sooner than if the user node had waited for an SR opportunity 1402 and performed the prior-art access procedure of FIG. 1A. Another advantage may be that the depicted procedure is simple enough for many low-cost low-performance user nodes, such as sensors controlled by microcontrollers, to access the 5G network. Another advantage may be that the method may be implemented in a base station with a software update, rather than hardware changes, thereby saving costs, according to some embodiments.

The procedure of FIG. 14A may be implemented as a system or apparatus, a method, or instructions in non-transient computer-readable media for causing a computing environment, such as a user node, a base station, or other signally coupled component of a wireless network, to implement the procedure.

FIG. 14B is a flowchart showing an exemplary embodiment of a method for transmitting a complete or "actionable" message sequence on a random access channel, according to some embodiments. In this example, the user node transmits the data message on the RACH channel (or other unscheduled channel) without a grant. At 1451, the user node has data ready, and without waiting for an SR opportunity, transmits a type message, an ID message, and the data message on an unscheduled channel such as the RACH channel. The type message indicates that a data message follows. There is no SR message because no grant is requested in this case. The ID message identifies the transmitting node. As an option, the user node may also transmit calibration messages (not shown) such as DMRS and PTRS messages, before or after the other messages, to assist the base station in demodulating the signals There is no address message because in this case the data message includes the destination address, which the base station retrieves by decoding the data message upon receipt. There is no BSR message because a grant is not requested and incremental transfer to the core network is not involved. Therefore, the base station can readily determine the size of the data message after receipt, or alternatively the size may be indicated in the data message itself. The data message may also include an embedded error-check code such as a CRC code. As an option, the type and identification information may be included in the data message, for example in separate fields of the data message, in which case the composite data message may be transmitted without the separate type and ID messages shown.

At 1452, the base station receives the type, ID, and data messages and (optionally) transmits an acknowledgement back to the user node. At 1453, the base station transfers the data to the core network, which then 1454 transfers a relay message based on the data message to the recipient via other stations.

As a further option, the various messages 1412-1418-1407 may be combined into a single message that includes the same data in, for example, fields of the combined message.

An advantage of transmitting all the messages on the random access channel without a grant may be speed, since very low latency may be obtained, according to some embodiments. The latency corresponds to the width of the two small header messages, after which the data message begins. Another advantage may be simplicity since complex handshaking and frequency changes are not required in this case. Another advantage may be minimal occupation of the scheduled channels, since all the messages may be transmitted on a non-scheduled channel in the depicted case. Another advantage may be collision mitigation, since the user node may automatically re-transmit the messages (after a required LBT delay such as a sensing slot, and after a random backoff delay if required) if the node fails to get an acknowledgement after the data message.

The procedure of FIG. 14B may be implemented as a system or apparatus, a method, or instructions in non-transient computer-readable media for causing a computing environment, such as a user node, a base station, or other signally coupled component of a wireless network, to implement the procedure.

Figure 15A:
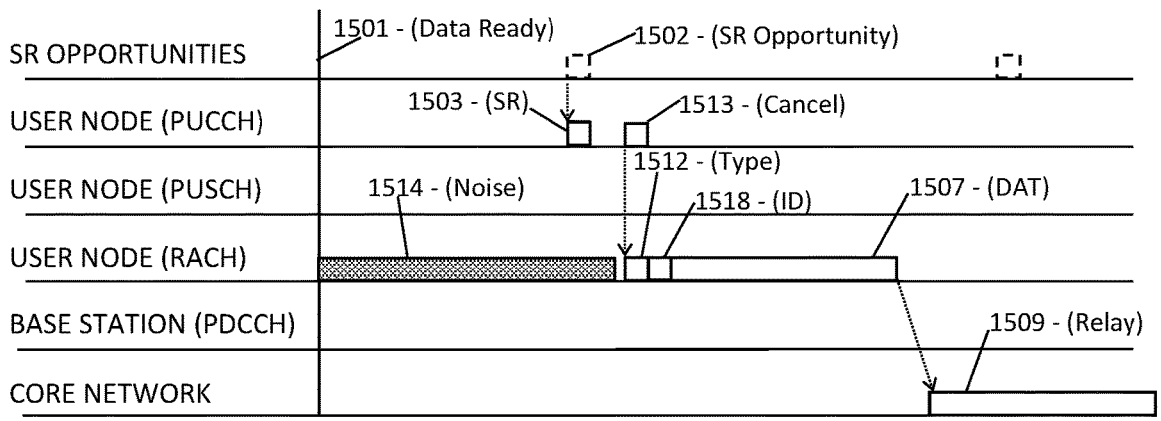
FIG. 15A is a sequence chart showing an exemplary embodiment of a procedure for transmitting a complete message sequence on a random access channel while avoiding noise, according to some embodiments.

FIG. 15A is a sequence chart showing an exemplary embodiment of a procedure for transmitting a data message on an unscheduled channel, while cancelling a grant cycle, according to some embodiments. Horizontal lines indicate SR opportunities 1502, signals of a user node on the PUCCH, PUSCH, and RACH channels, signals of the base station on the PDCCH, and of the core network, relative to a Data Ready time 1501 when a data message becomes ready to transmit. The user node intends to transmit on an unscheduled channel such as the RACH channel immediately upon the Data Ready time 1501. However, traffic or noise 1514 is detected on the intended channel or channels, preventing the user node from transmitting. While the user node is waiting for the unscheduled channel to clear, the next SR opportunity 1502 occurs, and so the user node changes tactics and submits an SR message 1503 on the PUCCH, requesting an uplink grant. However, the noise 1514 subsides while the user node is waiting for a grant. At that time, rather than waiting for an upload schedule, the user node changes tactics again, and elects to return to the initial plan of transmitting messages on the unscheduled channel. Therefore, the user node transmits a type message 1512, an identification message ID 1518, and the data message DAT 1507 on the unscheduled channel. Optionally, the user node may also cancel the pending SR request by transmitting a cancellation message 1513 on the PUCCH (or other channel as appropriate), thereby cancelling the scheduling request 1503. The base station receives the data message 1507 and transfers it to the core network. The core network then forwards the data message 1507 as a relay message 1509 to the recipient via other networks. Optionally (not shown) the user node may transmit one or more calibration signals such as DMRS preferably before the type message 1512, and the base station may transmit an acknowledgement message on the RACH or other channel following the data message 1507.

An advantage of aborting the multi-step grant access procedure of FIG. 1, and instead transmitting the type 1503 and identification 1518 and data 1507 messages on the unscheduled channel may be low latency, since the data message 1507 may be uploaded sooner than waiting for grants. Another advantage may be that usage of the scheduled channels may thereby be minimized, freeing them for other messages that do not require low latency. Another advantage may be that the disclosed improvements may be implemented in software, rather than hardware changes, generally at low to negligible cost, according to some embodiments.

The procedure of FIG. 15A may be implemented as a system or apparatus, a method, or instructions in non-transient computer-readable media for causing a computing environment, such as a user node, a base station, or other signally coupled component of a wireless network, to implement the procedure.

Figure 15B:
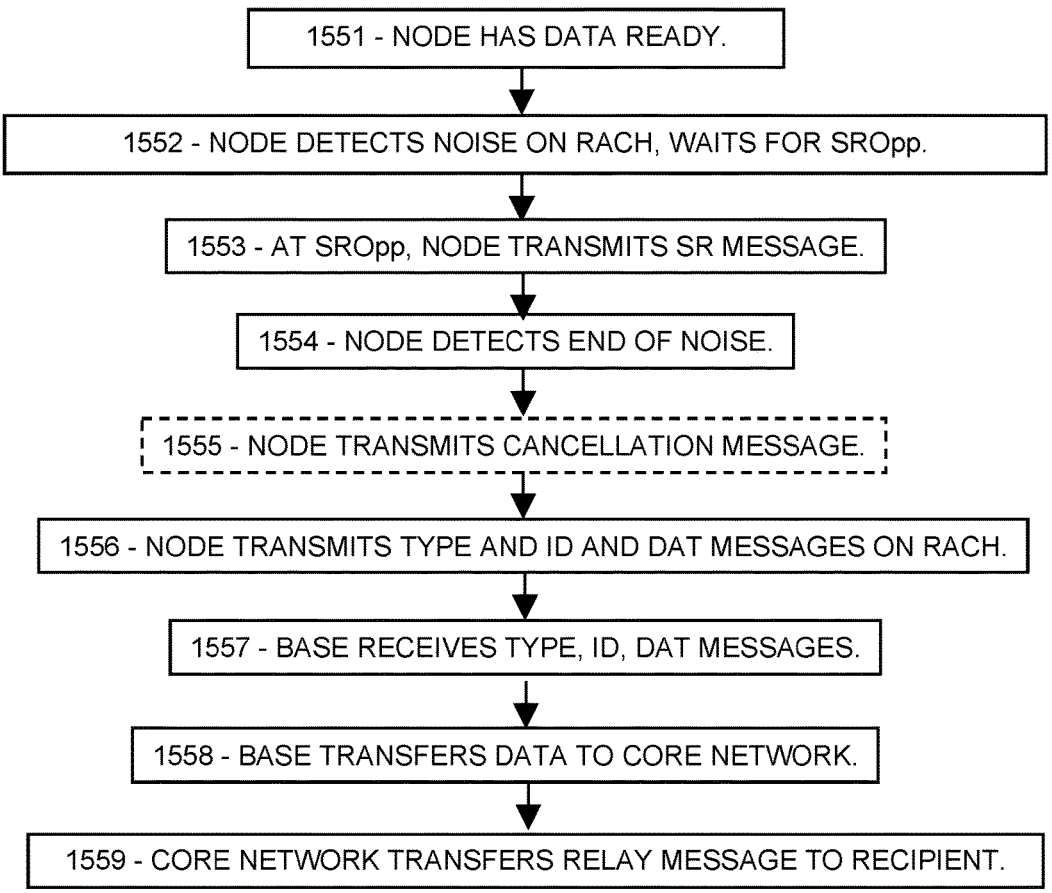
FIG. 15B is a flowchart showing an exemplary embodiment of a method for transmitting a complete message sequence on a random access channel while avoiding noise, according to some embodiments.

FIG. 15B is a flowchart showing an exemplary embodiment of a method for transmitting a data message on a random access channel while avoiding noise, according to some embodiments. In this example, a user node attempts to transmit on the RACH but is blocked by noise, so it sends an SR message instead. But then the noise subsides, so the node cancels the SR request and instead transmits the message on the RACH without further delay.

At 1551, a user node has a data message ready to send on the random access channel, but at 1552 detects noise or interference or cross traffic on the channel, and therefore waits. In the mean time, an SR opportunity arrives at 1553, so the user node transmits a scheduling request on the PUCCH instead. However, at 1554 the user node detects that the noise has subsided, and therefore at 1555 optionally (in dash) transmits an SR cancellation message to the base station. Simultaneously, or shortly thereafter, at 1556, the user node transmits, on the RACH, a type message, an ID message, and the data message, without gaps or at least with gaps no larger than a sensing slot, so that the base station may determine from their contiguity that the messages are related. Alternatively, a single composite message that includes the content of those messages may be transmitted. After receiving the messages 1557, which provide sufficient information to enable the base station to process the data message without soliciting further transmission from the user node, the base station then transfers the data to the core network at 1558, which prepares a relay message and transfers it toward the recipient at 1559.

An advantage of transmitting the data message 1507 on the RACH when it becomes available may be to obtain low latency, since the message sequence, as finally implemented, involved no grants with their attendant delays. Another advantage may be simplicity, since a low-performance user node, that does not require high message reliability, may transmit the messages on the random access channel directly and at will, while avoiding noise, and without having to comply with complex formatting and protocol requirements of scheduled messages in 5G.

The procedure of FIG. 15B may be implemented as a system or apparatus, a method, or instructions in non-transient computer-readable media for causing a computing environment, such as a user node, a base station, or other signally coupled component of a wireless network, to implement the procedure.

Figure 16A:
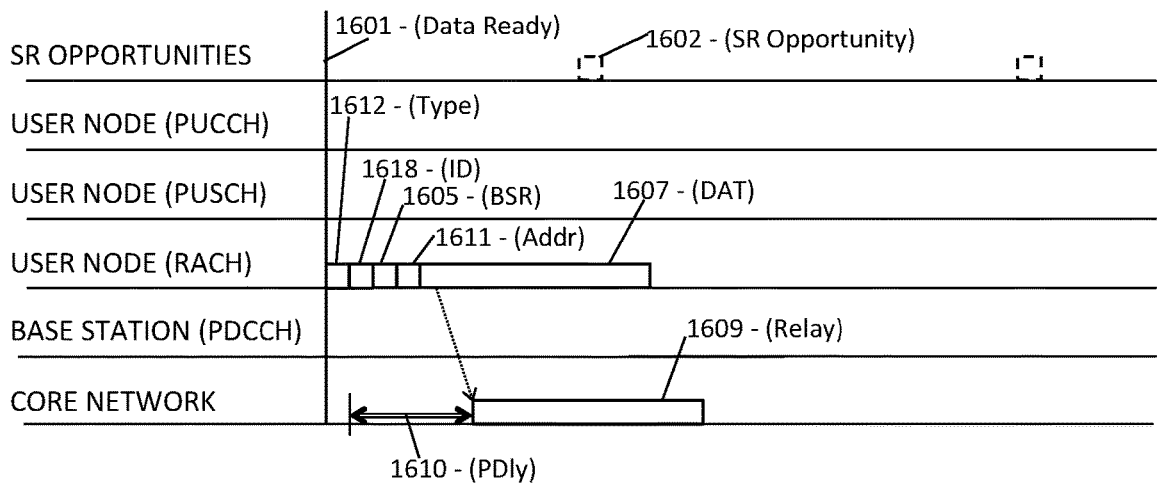
FIG. 16A is a sequence chart showing an exemplary embodiment of a procedure for transmitting a complete message sequence including a destination address on a random access channel, according to some embodiments.

FIG. 16A is a sequence chart showing an exemplary embodiment of a procedure for transmitting a data message on an unscheduled channel with early disclosure of the destination address, according to some embodiments. Horizontal lines indicate SR opportunities 1602, signals of a user node on the PUCCH, PUSCH, and RACH channels, signals of the base station on the PDCCH, and of the core network, relative to a Data Ready time 1601 when a data message is ready to transmit. In this case, the user node transmits a series of messages on an unscheduled channel such as a RACH channel, starting as soon as the data is ready at 1601. The messages include a type message 1618 that specifies the remaining messages, then an identification message ID 1618, a size message 1605 such as a BSR, and an address message 1611 indicating the destination address, followed by the data message DAT 1607. The base station, detecting the address message 1611, can then begin transferring the data message 1607 to the core network in real-time, while the data message 1607 is being received, and the core network can prepare and transmit a relay message 1609 toward the destination in real-time. The resulting procedure delay PDly 1610 is short because the address message 1611 provided the necessary address information before the data message 1607, and otherwise the base station would have had to retrieve the destination address from the data message 1507 after it was uploaded. A type message 1612 is used here, rather than an SR request as in FIG. 13A, because in this case no grant is requested.

Not shown, but recommended, are standard support messages such as a DMRS message, a PTRS message, and a CRC message, appended or prepended to the messages shown, for ease of demodulation and for error-checking, and an acknowledgement message after the data message 1607 is received.

An advantage of transmitting the messages 1612, 1618, 1605, 1611, 1607 on an unscheduled channel may be low latency, since the data message 1607 may be uploaded sooner than with the multi-step multi-grant access process of FIG. 1, according to some embodiments. An advantage of providing the destination address 1611 before the data message 1607 may be that the relay message 1609 may be delivered sooner than if the base station or core network had to decipher the address from the data message 1607. A further advantage may be simplicity, since a low-cost user node may more easily transmit the messages on a single frequency without complex protocol requirements. Another advantage may be ease of implementation, requiring only software upgrades, according to some embodiments.

The procedure of FIG. 16A may be implemented as a system or apparatus, a method, or instructions in non-transient computer-readable media for causing a computing environment, such as a user node, a base station, or other signally coupled component of a wireless network, to implement the procedure.

Figure 16B:
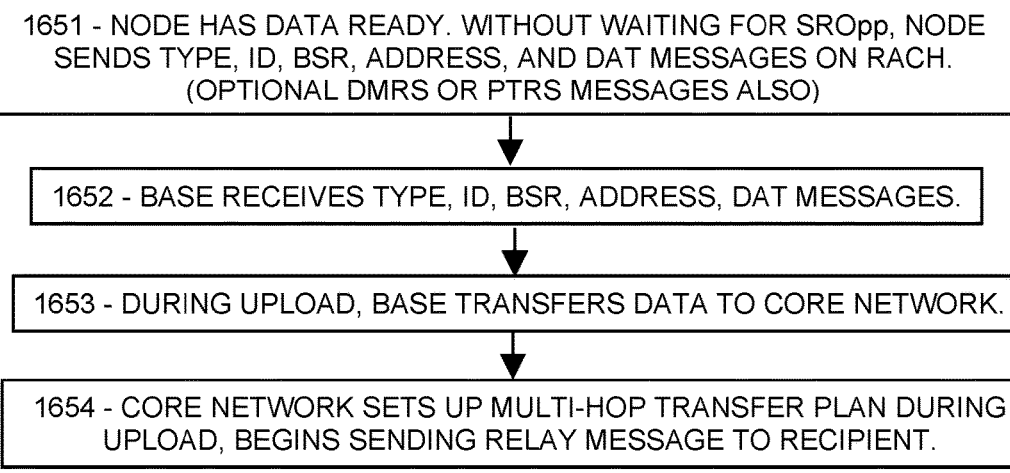
FIG. 16B is a flowchart showing an exemplary embodiment of a method for transmitting a complete message sequence including a destination address on a random access channel, according to some embodiments.

FIG. 16B is a flowchart showing an exemplary embodiment of a method for transmitting a data message including a destination address on a random access channel, according to some embodiments. In this example, the user node transmits a series of messages on the random access channel as soon as the data is ready, and thereby obtains a short transmission delay and a short procedure delay due to the avoidance of multiple steps in the 5G grant scheduling routine.

At 1651, the user node has prepared a data message and, without waiting for an SR opportunity, the user node transmits, on the RACH (or other monitored, unscheduled channel), a type message, an ID message, a BSR message, an address message, and the data message. The messages may be transmitted contiguously or without gaps larger than a sensing slot (or other predetermined time interval) between the messages. Alternatively, the messages may be combined into a header message including the type, ID, BSR, and address message, followed by the data message. As a further alternative, all five messages may be combined into a single composite message configured to carry the information represented by the individual messages listed. Specifically, the type message indicates the type of communication and in particular that a data message follows, the ID message identifies the user node, the BSR message specifies the size of the data message, and the address message includes the MAC address of the destination, or a pointer or code representing the address.

At 1652, the base station receives the header messages and begins to receive the data message, while the upload continues. At 1653, the base station transfers the data message, or an extract of it, to the core network. In this example, the transfer is done incrementally or in portions, while the data message is still being uploaded. At 1654, the core network receives the size and address information, which enables the core network to begin setting up a relay transfer of the data to the recipient (or, more preferably, the base station may inform the core network of the size and destination of the impending data message as soon as those items are received, so that the core network can begin preparing the relay transfer). Then, when the relay transfer is arranged, the core network begins to transfer the data message incrementally to the recipient's cell. The recipient's base station or core network may accumulate those portions as they arrive and reconstruct the data message before downloading it to the recipient. Alternatively, the recipient's base station may pass the portions to the recipient and allow the recipient's processors to reconstruct the message. However, in some cases the relay preparation may take longer than the data message upload, and in those cases the core network would begin the transfer only when ready, and therefore may opt to transfer the complete relay message as a unit rather than multiple portions of it.

An advantage of providing the messages on the random access channel may be that low latency may be obtained since the delays regarding SR opportunities and grant protocols are avoided. An advantage of providing the address and BSR messages before the data message may be that the core network is thereby enabled to set up the relay agreement before uploading the data message, since the relay agreement generally depends on the size and destination of the data message. Another advantage of disclosing the destination address before the data message may be that the data message may be transferred incrementally, thereby reducing the overall latency, according to some embodiments.

The procedure of FIG. 16B may be implemented as a system or apparatus, a method, or instructions in non-transient computer-readable media for causing a computing environment, such as a user node, a base station, or other signally coupled component of a wireless network, to implement the procedure.

Figure 17A:
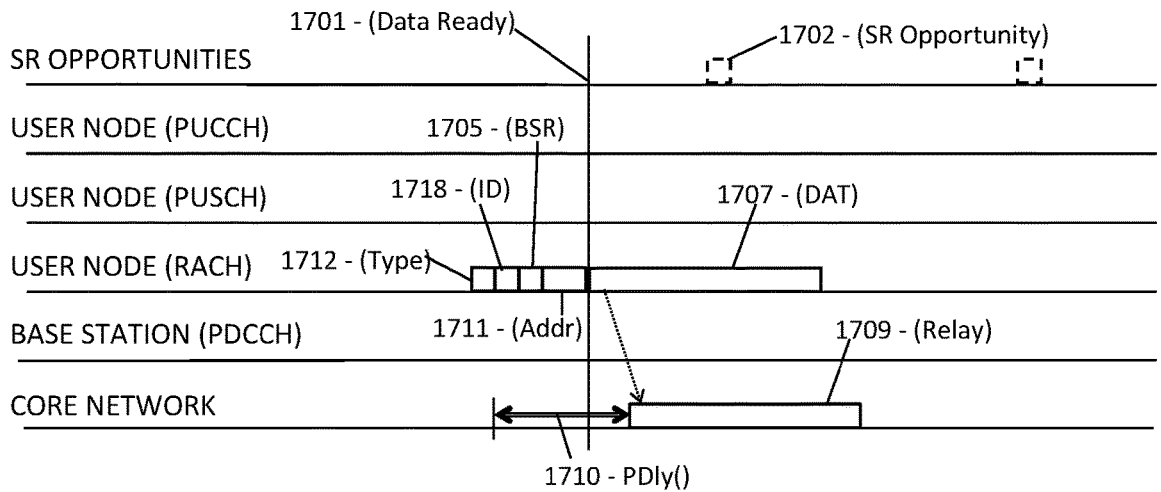
FIG. 17A is a sequence chart showing an exemplary embodiment of a procedure for transmitting header information including a destination address before a data message is ready, according to some embodiments.

FIG. 17A is a sequence chart showing an exemplary embodiment of a procedure for transmitting a data message on an unscheduled channel, with early disclosure of the destination address before the data is ready, according to some embodiments. Horizontal lines indicate SR opportunities 1702, signals of a user node on the PUCCH, PUSCH, and RACH channels, signals of the base station on the PDCCH, and of the core network, relative to a Data Ready time 1701 when a data message is ready to transmit. In this case, the user node calculates when the data message will be ready to send, how long it will take to transmit certain header messages, and also how large the data message will be, before the data message is actually ready to transmit. Therefore, the user node can transmit a header containing the size information before the Data Ready time 1701, which is then followed by the data message, on an unscheduled channel such as a RACH channel. The header in this case includes a type message 1712 indicating that a data message is to follow, an identification message ID 1718 such as the C-RNTI of the user node, a size message 1705 such as a BSR, and the destination address 1711 such as the MAC address of the recipient. The header messages 1712, 1718, 1705, 1711 are transmitted before the Data Ready time 1701, preferably configured to end upon the Data Ready time 1701 or slightly later, and the data message DAT 1707 is transmitted after the Data Ready time 1701 when the header messages are finished. "Slightly later" in this context means a predetermined time such as one or a small number of symbol times, or one or a small number of slots, after the Data Ready time 1701, for example. Preferably the messages are transmitted contiguously, with little or no gap between the messages, so that the base station will know that they are all related. "Little or no gap" in this context means contiguously, or with gaps smaller than a sensing slot, or with gaps smaller than a time that nodes are required to wait before transmitting, or gaps smaller than a predetermined time specified by the network such as 9 microseconds. Since the destination address 1711 is disclosed before the data message 1707 is transmitted, the base station can use that information to transfer the data to the core network while the data message 1707 is being received, and the core network can prepare and send the relay message 1709 toward the recipient via a larger network while the rest of the data message 1707 is being uploaded, assuming incremental transfer is supported and the relay arrangement has been finalized at that time. The procedure delay PDly 1710 between the type message 1712 (or whichever message is transmitted first) and the start of the relay message 1710 is also indicated.

Optionally, not shown, the user node may transmit certain support messages such as DMRS, PTRS, and CRC messages, preferably contiguously with the other messages, to assist the base station. Optionally, not shown, the base station may transmit an acknowledgement or non-acknowledgement, on the random access channel or the PDCCH channel, after receiving the data message.

Sidelink or peer-to-peer messages, directly between user nodes in the same cell or network, may be transmitted more rapidly and processed by the recipient user node more readily when the recipient's address is included ahead of a data message, so that the recipient can determine that the message is intended for it instead of some other user node. There is generally no need for each user node to decode messages addressed to some other node. For even lower latency and greater efficiency, a brief code may be used instead of the full address of the recipient node.

An advantage of transmitting the header messages 1712-1711 before the Data Ready time 1701 may be that the relay message 1709 may be delivered sooner than if the user node had waited until the data message was ready before starting. In many applications, the user node can calculate the size of a data message and can determine when the data message will be ready to transmit, and therefore can transmit the header messages on an unscheduled channel before the data is ready, followed by the data message, and thereby save time and provide low latency, according to some embodiments.

The procedure of FIG. 17A may be implemented as a system or apparatus, a method, or instructions in non-transient computer-readable media for causing a computing environment, such as a user node, a base station, or other signally coupled component of a wireless network, to implement the procedure.

Figure 17B:
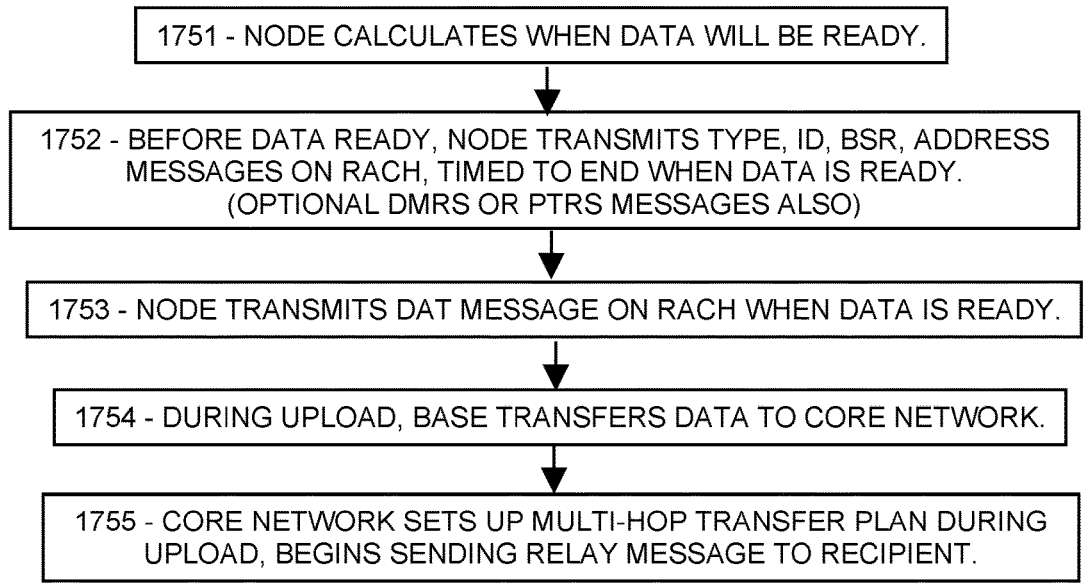
FIG. 17B is a flowchart showing an exemplary embodiment of a method for transmitting header information including a destination address before a data message is ready, according to some embodiments.

FIG. 17B is a flowchart showing an exemplary embodiment of a method for transmitting header information including a destination address before a data message is ready, according to some embodiments. In this example, the user node calculates when the data message will be ready, how long it will take to transmit the header messages, and then transmits the header messages on the random access channel, followed by the data message. Very low latency may be achieved.

At 1751, the user node determines when the data message will be ready, and its size, and the destination address, plus any other information needed for transmitting the data message. Then, before the data message is ready, but timed so that the header messages will finish when the data message becomes ready, or within a predetermined interval of when the data message is expected to become ready, the user node transmits a series of header messages including 1752 a type message indicating that a data message is to follow (and optionally specifying which header messages and formats etc. are included), an identification ID message identifying the user node (such as its C-RNTI or RA-RNTI or MAC address or other identifying code of the user node), a BSR message (or other size message indicating the size of the data message), and an address message (specifying the MAC address or other address of the destination, or a code or pointer indicating the recipient's address).

At 1753, the header messages are finished and the data message becomes ready, so the user node transmits it on the random access channel. The various messages are preferably separated by no gaps, or at least gaps less than a sensing slot, or other interval that nodes are required to wait before transmitting to avoid collisions on the random access channel.

At 1754, during the data message upload, the base station transfers the data incrementally to the core network, along with the size and address data, so that at 1755 the core network can set up the multi-hop transfer and begin sending the relay message, or portions thereof, toward the destination. Alternatively, the base station may convey the size and address information to the core network as soon as those messages are received, instead of waiting until the data message upload is in progress, so that the core network can get started sooner at setting up the relay arrangement to the recipient's cell. If incremental transfer is not supported, the core network may accumulate the data message portions and then transfer a relay message 1709 as a unit.

In some cases, the user node may not be able to precisely calculate when the data message will be ready. In those cases, the user node may calculate an expected latest possible time for the data message to be ready, and may begin transmitting the header messages so that they will be finished at that latest expected time. The intent is to avoid gaps between the header and data messages as large as a sensing slot, to prevent other nodes from barging in on the random access channel. If, however, the data message is not ready at the calculated time, then the user node may transmit a buffer message (not shown) after the header messages to keep control of the random access channel until the data message is ready. The buffer message may be a series of symbols with unmodulated carrier signal, or a series of calibration signals such as DMRS and PTRS, for example.

An advantage of transmitting the header messages before the data message is ready, may be to obtain very short or substantially zero transmission delay and hence low latency. An advantage of transmitting on the random access channel, or other channel allocated for the purpose, may be to keep the scheduled channels clear for other traffic. Another advantage may be to provide a simple, readily accessible method for low-cost low-performance nodes to access the 5G network and obtain low latency with minimal consumption of resources. An advantage of providing the BSR and address messages before the data message may be to assist the core network in preparing the incremental transfer to other stations before the data message has been fully uploaded. Another advantage may be that the method may be implemented with a software update rather than hardware development, at low cost, according to some embodiments.

The procedure of FIG. 17B may be implemented as a system or apparatus, a method, or instructions in non-transient computer-readable media for causing a computing environment, such as a user node, a base station, or other signally coupled component of a wireless network, to implement the procedure.

Figure 18A:
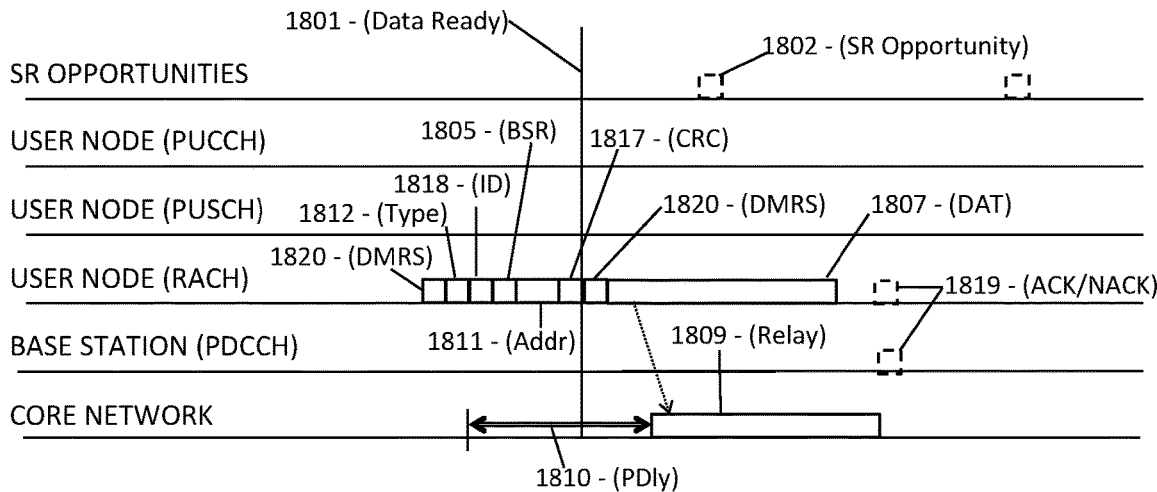
FIG. 18A is a sequence chart showing an exemplary embodiment of a procedure for transmitting a header including a CRC before a data message is ready, according to some embodiments.

FIG. 18A is a sequence chart showing an exemplary embodiment of a procedure for transmitting a data message on an unscheduled channel with early disclosure of the destination address before the data is ready, according to some embodiments. Horizontal lines indicate SR opportunities 1802, signals of a user node on the PUCCH, PUSCH, and RACH channels, signals of the base station on the PDCCH, and of the core network, relative to an expected Data Ready time 1801 when a data message is expected to be ready to transmit. In this case, the user node attempts to calculate when the data message will become available in advance, and therefore transmits header messages before the Data Ready time 1801, to be followed by the data message DAT 1807. The header messages include a DMRS message 1820 calibrating the modulation, a type message 1812 indicating that a data message is to follow, an identification message ID 1818 identifying the user node such as its C-RNTI or the like, a size message 1805 such as a BSR message, an address message 1811 indicating the destination address, and an error-check message 1817 such as a CRC message or other code to reveal errors in the header messages 1811-12. The expected Data Ready time 1801 then arrives when the CRC message 1817 is finished. However, in this example, the data message 1807 is still not ready, due to some unexpected delay. The user node does not want to release the random access channel because the data message is almost ready, and does not want to leave a gap between the CRC message 1817 and the data message 1807 because other user nodes may jump in and transmit during that time, and because a gap may cause the base station to misinterpret the sequence of messages. Therefore, the user node continues to transmit, in this case, one or more additional DMRS messages 1820 (or alternatively another message or unmodulated carrier, for example) until the data message 1807 is finally ready, and the user node transmits it.

The base station can receive the header messages and check them for errors before proceeding with the DAT message 1807. If an error is found by comparing the error-check message 1817 to the as-received header messages, then the base station can ignore the header messages and the DAT message 1807, and may also send an acknowledgement or non-acknowledgement message 1819 (dash) to the user node, on the PDCCH or RACH channels for example, accepting the messages or warning the user node that there was a problem. If the header files 1811-12 are consistent with the error-check code 1817, then the base station can pass the DAT message 1807 to the core network, which can then transfer the corresponding relay message 1809 to the wider network and toward the recipient, in real-time as the data message 1807 is being uploaded. The procedure delay 1810 is shown, extending from the end of the type message 1812 to the beginning of the relay message 1809. The data message 1807 may include another error-check code for the data portion, embedded within the data message 1807 or appended (not shown) or prepended or otherwise included with the data message.

An advantage of providing an error-check message appended to the header messages before uploading the data message may be that the base station may ignore the other messages, including the data message, if any errors are revealed in the header messages. In addition, the base station may be able to signal the user node to abort the data message upload, thereby saving time and energy. Upon discovering that the attempt has failed, the user node may try again to upload the header messages, assuming the unscheduled channel remains clear of interference.

An advantage of transmitting calibration signals before and optionally after the header messages may be to assist the base station demodulator in accurately interpreting the signals. Also, the use of frequent calibration messages may enable higher modulation than would otherwise be feasible. An advantage of inserting additional buffer messages, such as DMRS messages, after the header messages may be to avoid leaving a gap before the data message. An advantage of providing the various messages on the random access channel, or other monitored but unscheduled channel, may be to avoid causing congestion on the scheduled channels. An advantage of transmitting the header messages before the data message is ready, may be to obtain very low latency while avoiding the delays normally involved in grant request protocols. An advantage of providing the size and address information early may be that the core network may begin setting up the relay arrangement sooner than if those items were extracted from the data message. The header messages may also enable the core network to transfer the relay message incrementally to the recipient rather than waiting until the entire data message has been uploaded, thereby causing the data to reach the recipient sooner than otherwise. An advantage of transmitting extra calibration or buffer messages while waiting for the data message to be ready may be that this keeps control of the random access channel by excluding other nodes from transmitting. Moreover, an advantage of the disclosed method may be that it may be implemented as a software update rather than in hardware at relatively low cost, according to some embodiments.

The procedure of FIG. 18A may be implemented as a system or apparatus, a method, or instructions in non-transient computer-readable media for causing a computing environment, such as a user node, a base station, or other signally coupled component of a wireless network, to implement the procedure.

Figure 18B:
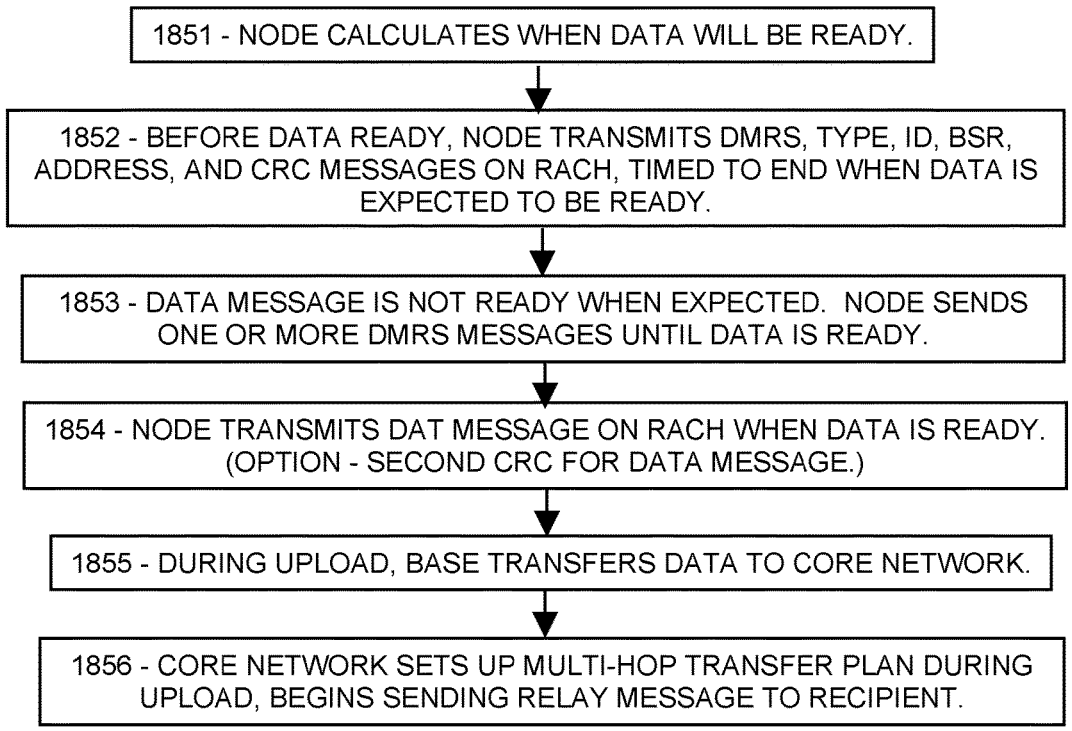
FIG. 18B is a flowchart showing an exemplary embodiment of a method for transmitting a header including a CRC before a data message is ready, according to some embodiments.

FIG. 18B is a flowchart showing an exemplary embodiment of a method for transmitting a header including a CRC before a data message is ready, according to some embodiments. In this example, the user node transmits a series of messages before the data is expected to be ready, but the data is not ready on time. Therefore, the user node sends one or more additional DMRS or other buffer messages, and then the data message.

At 1851, the user node calculates when the data message will likely be ready, and then at 1852 begins transmitting at a time calculated to finish the header messages just as the data message becomes ready. Thus, the user node transmits a DMRS message to assist in demodulating the other messages, a type message indicating the series of messages to follow, an identification message, a size or BSR message, a destination address (or a code representing same), and a CRC or other error-check code configured to detect faults in the header messages listed. Preferably, the base station informs the core network of the impending data message including its size and address as soon as those items are known to the base station.

The header messages are finished at the calculated time 1853, but in this example the data message is not yet ready. If the user node leaves a gap between the header messages and the data message, another node may begin transmitting during the gap, thereby preempting the data message indefinitely. Alternatively, the base station may misinterpret such a gap as indicating that the header messages are not related to the subsequent data message. Therefore, to maintain control of the random access channel and ensure that the base station recognizes that the header messages and the data message are related to each other, the user node transmits one or more buffer messages such as DMRS or PTRS messages until the data message is ready, and then 1854 transmits the data message.

More specifically, if the data message is expected to become ready at time T, and the length of the header messages is H, the header messages may be transmitted starting at a time T−H, so that the header messages will finish when the data message is expected to become ready. Alternatively, the header messages may be transmitted at a later time, such as T−H+h, where h is a preferably short interval configured to cause the header messages to finish slightly (the time h) after the data message becomes ready, thereby providing that the data message may be transmitted contiguously (with zero gap between the header messages and the data message) in case the data message is delayed. Alternatively, the header messages may be transmitted at the T−H time, and if the data message is delayed, the user node may transmit "buffer" messages such as repeated DMRS messages or unmodulated carrier until the data message becomes ready.

At 1855, the base station transfers the data message, or an extract thereof, to the core network. In this case, the base station transfers the data message incrementally, while the data message continues being uploaded. At 1856, the core network sends a relay message containing the data toward the recipient. The transfer to the recipient may also be done incrementally if feasible. However, if incremental transfer is not feasible, the entire relay message may be transferred non-incrementally after the data message has been fully uploaded.

As an option, a second CRC message may be provided within or appended to the data message, providing an error-check code for the data message. Alternatively, a single CRC (or the like) may be provided spanning the header messages and the data message together, preferably accounting for the extra DMRS message as well.

An advantage of providing the error-check code(s) may be to detect faulted messages by comparing the as-received message with the CRC code. Optionally, an acknowledgement/non-acknowledgement may be provided by the base station after the data message is received, indicating whether the message or messages include faults, whereupon the user node may re-transmit either the header portion, or the data portion, or both, depending on the fault location and the position of the CRC. An advantage of transmitting the header messages before the data message is ready, may be that very low transmission delay and hence low latency may be obtained thereby. An advantage of providing the BSR and address messages before the data message may be to enable the core network to prepare the multi-hop relay agreement, and to implement it incrementally, while the data message is still being uploaded. An advantage of transmitting buffer messages until the data message is ready may be to prevent other nodes from barging in and interfering with the data message. An advantage of transmitting without a grant on the RACH channel may be to provide a simplified, low-latency method for nodes to access the network, particularly nodes that do not demand high reliability since collisions on the random access channel are generally more common than on scheduled channels. An advantage of the disclosed method may be that it may be implemented in software at relatively low cost, in some embodiments.

The procedure of FIG. 18B may be implemented as a system or apparatus, a method, or instructions in non-transient computer-readable media for causing a computing environment, such as a user node, a base station, or other signally coupled component of a wireless network, to implement the procedure.

The systems and methods disclosed herein further include a temporary QoS (quality of service) adjustment request message, transmitted by a user node and configured to cause a base station and core network to process a subsequent data message with a different priority than the user node's default QoS. The temporary QoS request applies only to a particular one data message following the temporary QoS request and its associated grants and transfers, and does not alter the default QoS. Alternatively, the temporary QoS message may apply to a different data message such as the one after next, or to some other specified data message, or to a set of specified data messages, while not altering the default QoS of the user node. Although 5G generally includes a procedure for changing the default QoS of a user node, it is multi-step and time-consuming. If the user node wishes to obtain the adjusted QoS service for one data message only, then the user node would have to repeat the procedure for changing its default QoS back to the original value after sending the data message. This places demands on the base station as well as the user node, and is incompatible with a low-latency requirement, due to the time required to change the default before transmitting the data message. The temporary QoS message avoids all of that.

FIG. 19 is a chart showing an exemplary embodiment of a method for encoding a temporary QoS request message, according to some embodiments. In this non-limiting example, the temporary QoS request message includes eight bits; however, other versions may have 4, 6, 12, or 16 bits or more. The bits may indicate which QoS-related feature is to be adjusted for a subsequent data message, and whether each feature is to be increased or decreased, and by how much. For example, in the depicted chart, the first two bits indicate whether the user node requests an increase or decrease in the speed of transmission (that is, low-latency or avoidance of delays). As shown, the first two bits represent four encoded states, which in this example are to lower, leave unchanged, raise by one step, or raise by a larger amount such as two steps, the speed of handling or processing of the data message. The "step" in this example is a proxy for a more quantitative measure of priority or status or other QoS-related measure of performance. Bits 3 and 4 may indicate the change in reliability desired. For example, high reliability may entail parallel transmissions at different frequencies, or other actions to increase the likelihood that the data message will reach the intended recipient. Bits 5 and 6, in this example, are flexible and may be adapted by the installation or may be adjusted or otherwise assigned meanings by the user node, among other possibilities. For example, bits 5 and 6 may indicate whether the temporary QoS is being requested is the next data message (code 10), or the one after that (code 01). In addition, the same bits 5 and 6 could indicate that the temporary QoS is requested for all subsequent messages (code 11) until being reset with another temporary QoS request (code 00). The final two bits, 7 and 8, are reserved for future uses in the depicted chart. In another embodiment, rather than requesting a change relative to the default QoS level, the temporary QoS message may be configured to state specifically what QoS level or requirements are desired, and one of the reserved bits may be used to indicate that. As mentioned, the example is non-limiting; artisans may develop other formats and uses for a temporary QoS request after reviewing the examples disclosed herein, without departing from the appended claims.

In an alternative embodiment, the temporary QoS message may specify a particular QoS level, including latency and reliability requirements as well as other priority or quality related requirements, without immediately implementing the change. For example, bit 7 of the depicted format may be used to indicate that the temporary QoS is to be held in reserve until invoked. Then, at some later time, the pre-arranged temporary QoS may be invoked by the user node using a special code of the QoS format described above, or alternatively using a single bit multiplexed with another message such as an SR message, a BSR message, an ACK or NACK message, a DMRS or PTRS or SRS (sounding reference signal) or other calibration message, another data message, or some other message, for example. An advantage of pre-arranging a temporary QoS and then invoking it later may be to save resources and to save time when a high-priority message suddenly becomes ready to transmit.

In yet another alternative embodiment, the user node may specify that an anticipated downlink message be processed with a special QoS. For example, if the user node knows or expects that an important incoming message is imminent, then the user node may request that the base station should forward the incoming message with lower delays and/or higher reliability than normal downlink communications. The base station may then implement the adjusted QoS as soon as the expected message arrives at the base station, for example by downloading the message to the user node ahead of other downlink activity or on two parallel channels according to the requested QoS. As an option, bit 8 of the depicted format may be used to indicate that the requested QoS adjustment is to be applied to the next incoming message addressed to the user node rather than uplink.

An advantage of a temporary QoS request format such as that depicted may be that a user node may readily change the priority and handling of one or more subsequent data messages without modifying the default QoS of the user node. Another advantage may be that the depicted format allows the user node to distinguish between special handling for speed or reliability or both, and to raise or lower each, and to adjust the degree of change. However, other envisioned formats such as simpler formats may not provide such nuanced control, while other formats may provide finer control, or different controls over the temporary QoS adjustment. Another advantage may be that bits are allocated to system-dependent and/or user-dependent usage, thereby providing flexibility in implementation. Another advantage may be that some bits may be used to indicate whether the QoS adjustment is to be applied to the next data message, or the one after that, or to toggle the adjusted QoS on and off, for example. Another advantage may be that some bits may be used to indicate whether the specified QoS change is to be held in abeyance until invoked later. Another advantage may be that some bits may be used to indicate whether the QoS adjustment is to be applied to uplink or downlink communications. Another advantage may be that the entire request may fit in a single byte or a single symbol modulated according to an 8-bit table such as 256QAM.

The procedure of FIG. 19 may be implemented as a system or apparatus, a method, or instructions in non-transient computer-readable media for causing a computing environment, such as a user node, a base station, or other signally coupled component of a wireless network, to implement the procedure.

Figure 20A:
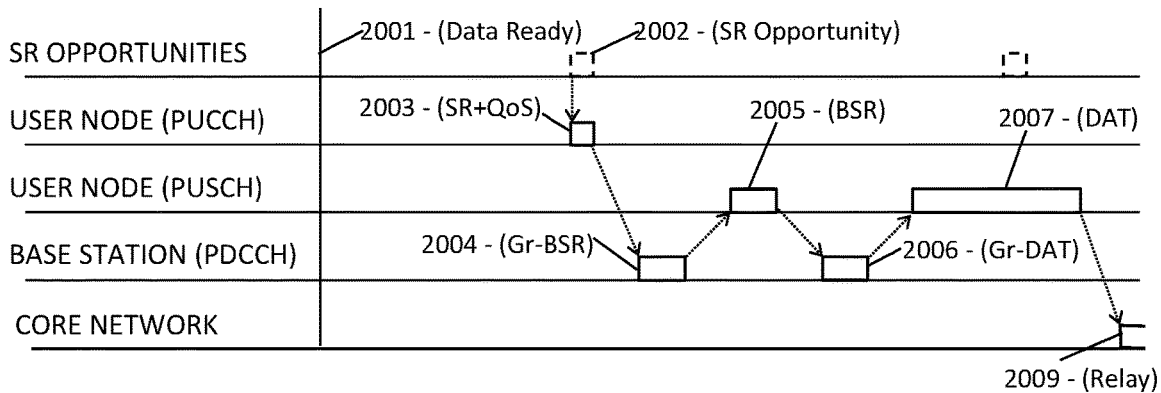
FIG. 20A is a sequence chart showing an exemplary embodiment of a procedure for including a QoS request in an SR message, according to some embodiments.

FIG. 20A is a sequence chart showing an exemplary embodiment of a procedure to transmit a temporary QoS request, according to some embodiments. This example includes a temporary QoS adjustment request, intended to cause the priority of a subsequent data message to be increased or decreased, according to some embodiments. The horizontal lines show the SR opportunities 2002, the user node signals on the PUCCH and PUSCH, base station signals on the PDCCH, and actions of the core network, relative to a Data Ready time 2001, at which time the data becomes ready to transmit. The user node waits for the next SR opportunity 2002, and then transmits an SR+QoS message 2003, that is, an SR request that includes a request for a temporary change in QoS for the following data message, without changing the default QoS of the user node. For example, the SR+QoS message may be modulated in a certain way, using modulations reserved for such QoS messages. Alternatively, a QoS request message may be transmitted in place of an SR message, and the base station may be configured to recognize the QoS message as both a grant request and a QoS adjustment request. Alternatively, the SR opportunity 2002 may accommodate two-symbol SR messages in which the first symbol is an unmodified SR message and the second symbol is configured as a temporary QoS adjustment request. Requests modulated in such a manner may be transmitted by users when they desire higher or lower QoS for a particular data message.

The base station, detecting the SR+QoS message 2003, may elevate or reduce the QoS (or other type of urgency or priority level, or other processing parameter related to a level of service) regarding the impending data message. The adjustment may include accelerating the permission process, including faster transmission of a first grant 2004, reception of a BSR message 2005, transmission of a second grant 2006, and reception of the data message 2007 with reduced attendant delays. Alternatively, or in addition, the adjustment may include enhancing the reliability of the data message transmission, such as allocating two parallel frequencies for dual transmission of each message, among other possible enhancements. The base station may also enhance or accelerate the transfer of the data message 2007 to the core network, and the core network may facilitate sending a relay message 2009 to other networks toward the recipient. In addition, the core network can request accelerated handling from the various other stations involved in conveying the relay message 2009 through each other station on the way to the recipient. In addition, the enhanced QoS may include giving the user node's messages higher priority than other messages, including interrupting any ongoing uplink or downlink transfer by other nodes. In case traffic is heavy, some lower-priority messages may be delayed or discarded to accommodate the temporarily elevated QoS message.

In some cases, a user node with a high default priority may request a reduced QoS for a particular data message. Such a reduced QoS may make sense, for example, if the data message is not critical or if the user node wishes to reduce costs, or other reason. The base station and core network can then respond to the SR+QoS message 2003 by lowering the level of service and urgency in providing access and handling the data message 2007.

In another embodiment, the user node may transmit a standard SR message, but simultaneously or synchronously transmits a temporary QoS change request on an unscheduled channel such as the RACH channel. The base station can receive the SR message and the temporary QoS change request and provide the service requested.

As a further alternative, the user node may append a temporary QoS request to the BSR message 2005, or to another message such as a CSI (channel state information) report, with the same effect.

As another alternative, the user node may send a temporary QoS request message to the base station in advance of the SR message, stating that a later following data message is higher or lower priority than the default QoS of the user node. That request may be transmitted on an unscheduled channel such as the RACH channel, or on the PUCCH at times allocated for such messages, or multiplexed with a different message such as an acknowledgement message for example.

As a further alternative, the base station may allocate multiple symbols to the SR opportunities, such as two symbols, wherein the first symbol is the SR request message and the second symbol is available for the user node to signal other information, such as a temporary QoS adjustment request message. The user node and the base station may reach agreement as to the meaning of the second symbol at an earlier time, such as when the user node joins the network.

As another alternative, the base station may allocate some SR opportunities for regular SR requests and other SR opportunities (at different times or on different subchannels) for special SR requests, such as requests for high-QoS handling of the associated pending data message. Thus, the user node may request a grant using the user node's default QoS level by sending an SR message upon one of the first category of SR opportunities (regular), or it can request temporary QoS elevation by sending an SR message on one of the second category SR opportunities (special). The SR request on the special category of SR opportunities would constitute the QoS request message, since the presence of an SR message on one of the SR opportunities reserved for high-priority messages automatically indicates to the base station that the user node requires the higher QoS for the subsequent data message.

Alternatively, the temporary QoS message may indicate that a different data message is to be processed with the adjusted QoS, such as the next subsequent data message for example. Alternatively, the user node may indicate that the temporary QoS is to be applied to a subsequent downlink communication, such as an important message that the user node expects will arrive from elsewhere imminently.

An advantage of such a temporary QoS modification may be that a user node may obtain special handling, such as accelerated service or higher reliability, than normal for a particular important message, without changing the default QoS.

Protocols exist in 5G for changing the default QoS of a user node, but they are complex and time consuming. In addition, they modify the default QoS for all future messages from the particular user node, as opposed to changing the QoS of a single message only. Therefore, the user node would have to go through the protocols again, after sending the special message, in order to restore the original default QoS. The one-time temporary QoS mechanism disclosed here may be quicker, simpler, and may occupy less overhead in the network, according to some embodiments. The temporary QoS may thereby provide "message-based" special handling for a particular data message, and optionally other associated messages such as a BSR message and grants associated with the data message.

The procedure of FIG. 20A may be implemented as a system or apparatus, a method, or instructions in non-transient computer-readable media for causing a computing environment, such as a user node, a base station, or other signally coupled component of a wireless network, to implement the procedure.

Figure 20B:
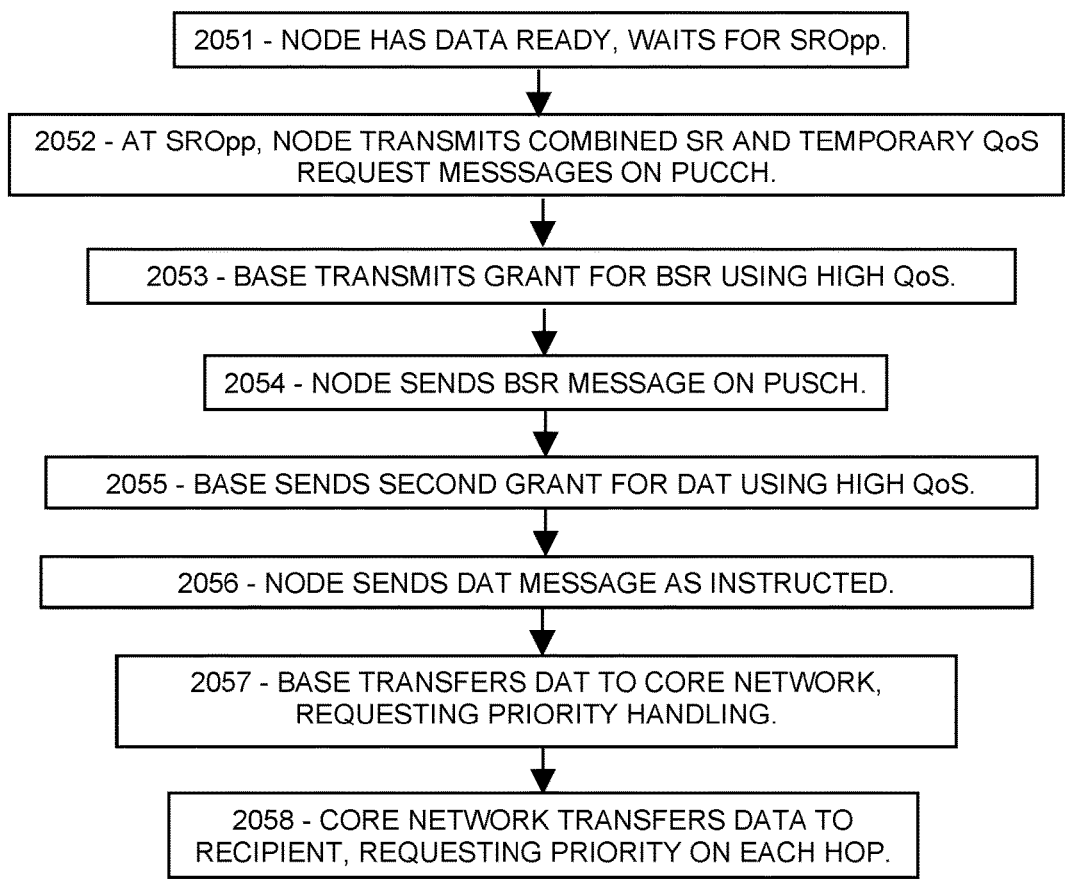
FIG. 20B is a flowchart showing an exemplary embodiment of a method for including a QoS request in an SR message, according to some embodiments.

FIG. 20B is a flowchart showing an exemplary embodiment of a method for including a temporary QoS request in an SR message, according to some embodiments. In this example, a user node requests a temporary change in the QoS of a following data message by modulating an SR request message.

At 2051, the user node has data ready, but waits for an SR opportunity before transmitting. Then at 2052, at an SR opportunity, the user node transmits an SR message that includes the temporary QoS request. The two messages may be provided sequentially or multiplexed or otherwise combined. Alternatively, the user node may arrange with the base station that its SR messages will be modulated as temporary QoS request messages, that is, the node transmits a temporary QoS request message at the time and frequency of the SR opportunity, but modulated according to a temporary QoS request, and the base station interprets the message as both a grant request and a temporary QoS change request. The temporary QoS change in this case applies to the impending data message and its grant sequence only, not a permanent change in the default QoS of the user node. Optionally, a calibration message such as a DMRS may be added to the combined SR and temporary QoS message.

At 2053, the base station transmits a grant for a BSR message. The base station may employ the adjusted QoS that the user node requested for the grant. For example, the base station may provide the grant on an accelerated schedule. At 2054, the user node transmits the BSR message. At 2055, the base station sends a grant for the data message, which again is according to the requested QoS level, such as transmitting the grant message ahead of other lower-priority users, or providing resources in the grant for the data message upload ahead of other users, for example. If high reliability is requested, the base station may transmit the grant on two parallel channels, and may provide, in the grant, two parallel sets of resource elements so that the user node can transmit the data message on two channels in parallel, thereby gaining higher probability that at least one of the transmissions will be received without fault.

At 2056, the user node transmits the data message as instructed. At 2057, the base station transfers the data message, or an extract, to the core network, while also requesting priority handling (if not already communicated to the core network). At 2058, the core network transfers a relay message, derived from the data message, to the recipient via, usually, multiple station hops. The core network specifies that the message is special priority and requests that each station in the chain should pass that request, including the notation or flag of special priority, along to the next station, so that the entire transfer receives the requested level of QoS.

Alternatively, the user node may request a temporary reduction in its QoS level, for example to transmit a routine low-priority message and avoid wasting network resources. Also, lower QoS transmissions may result in a cost savings if the network charges according to QoS requested.

An advantage of placing the temporary QoS request upon the SR opportunity, may be that the requested change may then apply to each of the various steps listed, including grant transmissions and data message processing. An advantage of requesting a temporary QoS adjustment with a single QoS request message may be simplicity, since the depicted method avoids a complex procedure involved in changing the user node's default QoS level before, and again after, sending the data message. Another advantage may be that the temporary QoS message response may be implemented as a base station software update, which is generally much lower in cost than hardware modifications.

The procedure of FIG. 20B may be implemented as a system or apparatus, a method, or instructions in non-transient computer-readable media for causing a computing environment, such as a user node, a base station, or other signally coupled component of a wireless network, to implement the procedure.

Figure 21A:
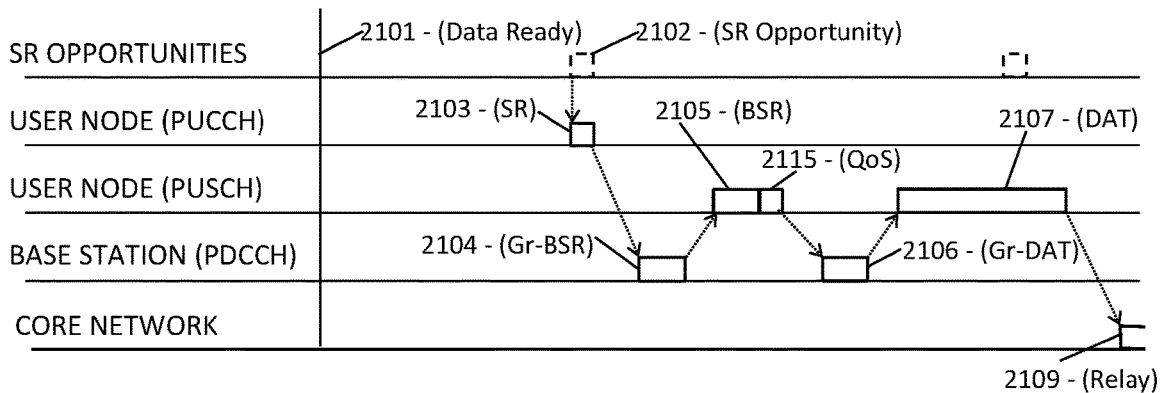
FIG. 21A is a sequence chart showing an exemplary embodiment of a procedure for providing a QoS request with a BSR message, according to some embodiments.

FIG. 21A is a sequence chart showing an exemplary embodiment of a procedure for providing a temporary QoS request with a BSR message, according to some embodiments. The horizontal lines show SR opportunities 2102 and signals by a user node on the PUCCH and PUSCH, base station signals on the PDCCH, and core network signals, relative to a Data Ready time 2101. In this example, a temporary QoS adjustment request message 2115 is combined with a BSR message 2105.

The user node transmits a scheduling request SR message 2103 on the PUCCH at an allocated SR opportunity 2102, and the base station replies with an uplink grant 2104 on the PDCCH. This enables the user node to transmit a BSR message 2105 and a temporary QoS message 2115 on the PUSCH. The BSR 2105 and the temporary QoS message 2115 are shown concatenated with little or no gap between them, but other combinations may be possible, such as multiplexing the two messages 2105, 2115. Multiplexing may be accommodated using an 8-bit modulation table such as 256QAM, in which 4 bits represent the data message size according to a 16-level size table, combined with a 4-bit QoS request format, thereby making an 8-bit multiplexed symbol. Other possibilities are envisioned. As a further alternative, the temporary QoS message 2115 may be placed first and the BSR message 2105 after, assuming that the grant Gr-BSR 2104 provides sufficient resources to accommodate both the QoS and BSR messages 2115-2105. In one embodiment, the user node warns the base station at some earlier time, such as when joining the network, that the user node may combine a temporary QoS request with a BSR message, so that the network can provide sufficient resources in the grant for both BSR and QoS messages, and so that the base station can recognize the temporary QoS request when it occurs.

Responsive to the BSR message 2105, the base station then transmits a second grant Gr-DAT 2106, for the user node to transmit the data message DAT 2107. Since the base station now knows that the user node requests a temporary QoS adjustment, the base station may provide the second grant 2105 on an accelerated basis, or whatever service the user requested. The user node then uploads the data message 2107, and the base station transfers the data to the core network along with a request that the information be accorded the adjusted QoS. The core network then prepares a relay message 2109 based on the data message 2107 and transfers it to other stations with a request that the adjusted QoS be honored at each hop.

An advantage of transmitting the temporary QoS request message 2115 in association with a BSR message 2105 may be that the BSR message 2105 may be the earliest opportunity that the user node has for requesting a QoS increase. For example, the SR message 2103 may be unable to accommodate the temporary QoS request 2115, particularly if the SR message 2103 is restricted to a single bit. The BSR message 2105, on the other hand, is more flexible since it has received an uplink grant, and the grant may be provided for a two-symbol message, or other grant capable of carrying both the BSR and temporary QoS messages 2105-2115. The user node may then obtain higher QoS service for the rest of the message steps, without having to change the default QoS level of the user node.

The procedure of FIG. 2A may be implemented as a system or apparatus, a method, or instructions in non-transient computer-readable media for causing a computing environment, such as a user node, a base station, or other signally coupled component of a wireless network, to implement the procedure.

Figure 21B:
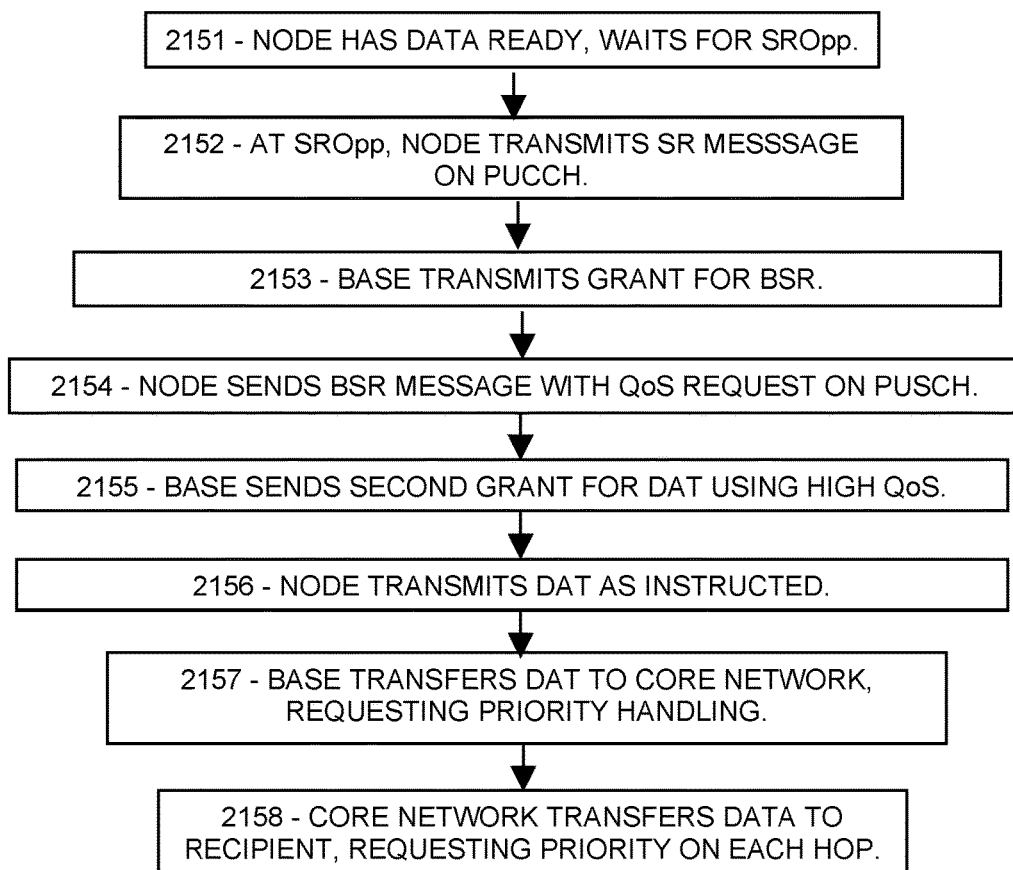
FIG. 21B is a flowchart showing an exemplary embodiment of a method for providing a QoS request with a BSR message, according to some embodiments.

FIG. 21B is a flowchart showing an exemplary embodiment of a method for providing a temporary QoS request with a BSR message, according to some embodiments. In this example, the user node requests a temporary adjustment in its QoS for a data message, wherein the temporary QoS request is combined with a BSR message.

At 2151, the user node has data ready to transmit and waits for the next SR opportunity to submit, at 2152, an SR message on the PUCCH. In this example, the SR message format is assumed to be unable to accommodate modifications such as combining with a QoS request. At 2153, the base station transmits an uplink grant for a BSR message, still continuing to apply the default QoS of the user node for this step, since no QoS adjustment has yet been requested.

At 2154, the user node transmits a BSR message at the granted time, and also a temporary QoS adjustment request. The temporary QoS message may be appended or prepended to the BSR message, assuming the grant provides sufficient resources to accommodate both messages. Alternatively, the temporary QoS request may be multiplexed or otherwise combined with the BSR message according to a format that the user node and the base station may have agreed upon at an earlier time, such as when the user node joined the network, or other time.

At 2155, the base station transmits a second grant, using the adjusted QoS level to accelerate the scheduled upload, for example. At 2156, the user node transmits the data message to the base station on the PUSCH or other channel as instructed. At 2157, the base station transfers the data message to the core network, along with a request (if not specified earlier) that it be processed according to the adjusted QoS level. Then at 2158, the core network prepares a relay message from the data message and transfers it to the recipient with a request that each station along the way treat the message with the adjusted QoS value.

An advantage of combining the temporary QoS request with the BSR message may be that the BSR message may be the first opportunity for the user node to register its temporary QoS request, especially if the SR message format does not accommodate the extra bits of information required for the temporary QoS message. Another advantage may be that the remaining steps, such as the uplink grant for the data message and processing the data message, can be accelerated according to the adjusted QoS level. Another advantage may be that the method may be implemented as software at relatively low cost, according to some embodiments.

The procedure of FIG. 21B may be implemented as a system or apparatus, a method, or instructions in non-transient computer-readable media for causing a computing environment, such as a user node, a base station, or other signally coupled component of a wireless network, to implement the procedure.

Figure 22A:
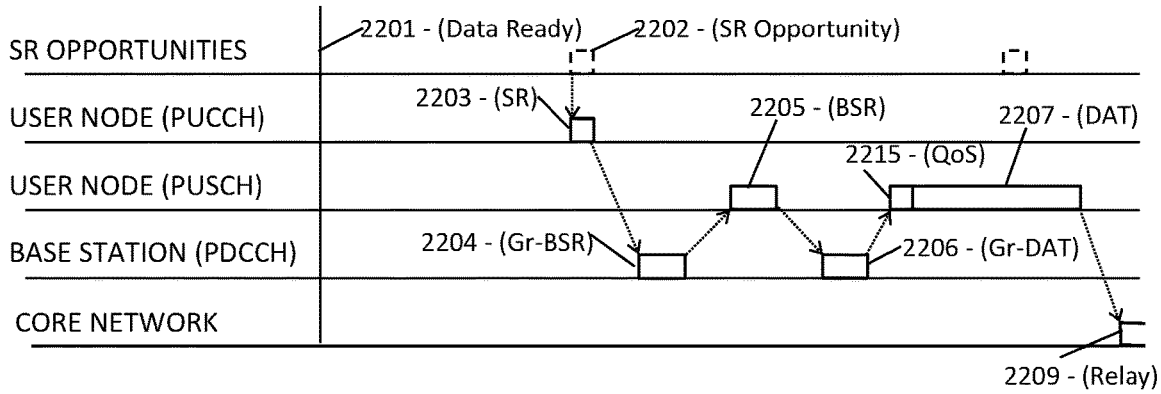
FIG. 22A is a sequence chart showing an exemplary embodiment of a procedure for providing a QoS request with a data message, according to some embodiments.

FIG. 22A is a sequence chart showing an exemplary embodiment of a procedure for providing a temporary QoS request with a data message, according to some embodiments. The horizontal lines show SR opportunities 2202 and signals by a user node on the PUCCH and PUSCH, base station signals on the PDCCH, and core network signals, relative to a Data Ready time 2201. In this example, a temporary QoS adjustment request message 2215 is combined with a data message 2207.

The user node transmits a scheduling request SR message 2203 on the PUCCH at an allocated SR opportunity 2202, and the base station replies with an uplink grant 2204 on the PDCCH. This enables the user node to transmit a BSR message 2205 on the PUSCH. Responsive to the BSR message 2205, the base station then transmits a second grant Gr-DAT 2206, for the user node to transmit the data message DAT 2207. The user does so, but also includes a temporary QoS request message 2215 with the DAT message 2207. Upon completion of that transmission, the base station transfers the data to the core network to be forwarded to the recipient as a relay message 2209.

The temporary QoS request message 2215 is shown preceding the data message 2207. However, the temporary QoS message 2215 may be placed after the data message 2207, or multiplexed in the data message 2207, or otherwise provided in association with the data message 2207. Uplink grants for data messages commonly provide a small amount of extra resources to avoid truncating any portion, and the small temporary QoS message 2215 may occupy those extra resources without exceeding the grant. Alternatively, the user node may specify, in the BSR message 2205, a size that includes both the data message and the QoS message sizes, thereby ensuring that there is room in the grant for the QoS request.

An advantage of transmitting the temporary QoS request message 2215 in association with a DAT message 2207 may be that the user node may thereby obtain special service for the remainder of the message transfer including the multi-hop relay transfer to the recipient, although it is too late to obtain such advantage during the grant steps. In this case, the SR message 2203 and the BSR message 2205 were unable to accommodate the temporary QoS request 2215, and so the DAT message 2207 was the earliest opportunity to do so.

The procedure of FIG. 22A may be implemented as a system or apparatus, a method, or instructions in non-transient computer-readable media for causing a computing environment, such as a user node, a base station, or other signally coupled component of a wireless network, to implement the procedure.

Figure 22B:
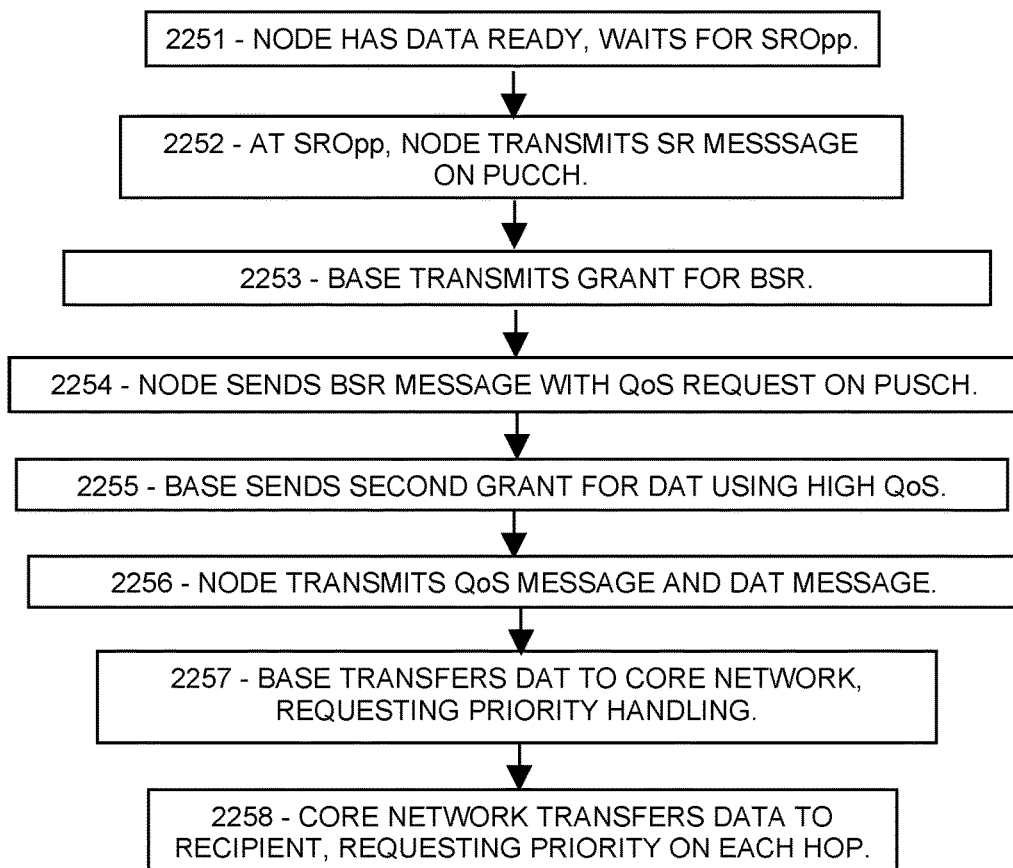
FIG. 22B is a flowchart showing an exemplary embodiment of a method for providing a QoS request with a data message, according to some embodiments.

FIG. 22B is a flowchart showing an exemplary embodiment of a method for providing a temporary QoS request with a data message, according to some embodiments. In this example, a temporary QoS request message is prepended to the data message.

At 2251, the user node has data ready and waits for the next SR opportunity. At 2252, the user node transmits, upon the SR opportunity, an SR message requesting a grant. At 2253, the base station provides an uplink grant configured for a BSR message. At 2254, the user node transmits its BSR message indicating the size of the data message. At 2255, the base station sends a second grant for the data message, which in this case includes a temporary QoS request message as well. At 2256, the user node transmits a temporary QoS adjustment request followed by the data message. Alternatively, the temporary QoS message may be embedded in the data message, or multiplexed, or otherwise combined in such a way that the base station can detect the temporary QoS request as well as the data portion. At 2257, the base station transfers the data message to the core network, while requesting special handling according to the adjusted QoS. At 2258, the core network transfers a relay message based on the data message to other stations, along with a specification that the QoS of that message is according to the adjusted QoS request.

An advantage of providing the temporary QoS request with the data message may be that the SR request and the BSR message may be unable to accommodate the QoS information, and thus the data message may be the first opportunity to make the request. Another advantage may be that the processing and transfer of the data message may be performed according to the requested QoS level, resulting in faster delivery for example, notwithstanding that the grant sequence was done according to the user node's default QoS. Another advantage may be that the user node can ensure that the second uplink grant is sufficiently capacious for the temporary QoS request plus the data message, by specifying, in the BSR message, a size representing the data message plus the temporary QoS message. Another advantage may be that the method may be implemented by updating software, which is generally much less costly than hardware changes.

The procedure of FIG. 22B may be implemented as a system or apparatus, a method, or instructions in non-transient computer-readable media for causing a computing environment, such as a user node, a base station, or other signally coupled component of a wireless network, to implement the procedure.

Figure 23A:
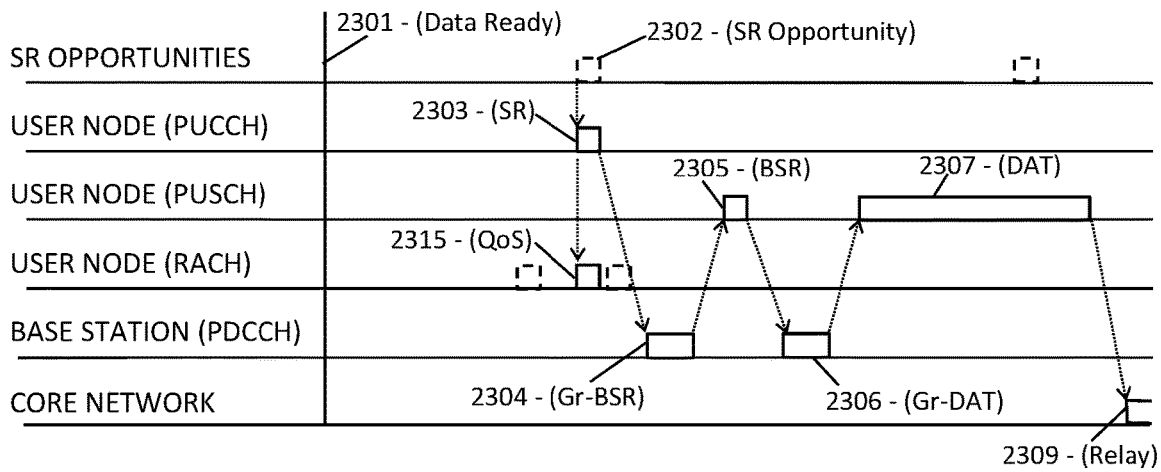
FIG. 23A is a sequence chart showing an exemplary embodiment of a procedure for providing a QoS request synchronously on a random access channel, according to some embodiments.

FIG. 23A is a sequence chart showing an exemplary embodiment of a procedure for providing a temporary QoS request synchronously on a random access channel, according to some embodiments. The horizontal lines show SR opportunities 2302 and signals by a user node on the PUCCH and PUSCH and RACH, base station signals on the PDCCH, and core network signals, relative to a Data Ready time 2301. In this example, a temporary QoS adjustment request message 2315 is transmitted on a random access channel at the same time, or within a predetermined interval, or in other time synchrony, with an SR message 2303. For example, the temporary QoS request message 2315 may be transmitted before or after the SR message 2303 (shown in dash) as long as the temporal relationship between the SR message 2303 and the QoS message 2315 allows the base station to determine that the two messages 2303-2315 are related.

Responsive to the SR message 2303, the base station transmits a first grant 2304, using the adjusted QoS level (rather than the user node's default QoS level) to determine priority and delays regarding the grant 2304. The user node replies with a BSR message 2305, and the base station provides a second grant 2306, again following the requested QoS level regarding the second grant 2306, such as providing an earlier response or earlier uplink resources than would be provided under the default QoS of the user node. The user node then uploads the data message 2307, which the base station transfers to the core network with a request for special handling, and the core network then transfers a relay message 2309 based on the data message 2307 to the recipient, again requesting the adjusted QoS from each participating station.

An advantage of transmitting the temporary QoS message 2315 on the random access channel, or other unscheduled but monitored channel, may be that the QoS message 2315 can be delivered to the base station early enough to obtain special service for the grant handshaking steps as well as the multi-hop relay process. Another advantage may be that the standard SR and BSR messages are unaffected in this case, which may be a simplification in implementation. Another advantage may be that the temporary QoS message 2315, being very short (such as one symbol in some embodiments) is unlikely to be collided on the RACH channel. Another advantage may be that if the temporary QoS message 2315 is collided on the RACH channel, the data message 2307 would still be processed and would go through to the recipient, although without the special services. In other words, the procedure "fails gracefully" in event of a collision on the RACH channel.

The procedure of FIG. 23A may be implemented as a system or apparatus, a method, or instructions in non-transient computer-readable media for causing a computing environment, such as a user node, a base station, or other signally coupled component of a wireless network, to implement the procedure.

Figure 23B:
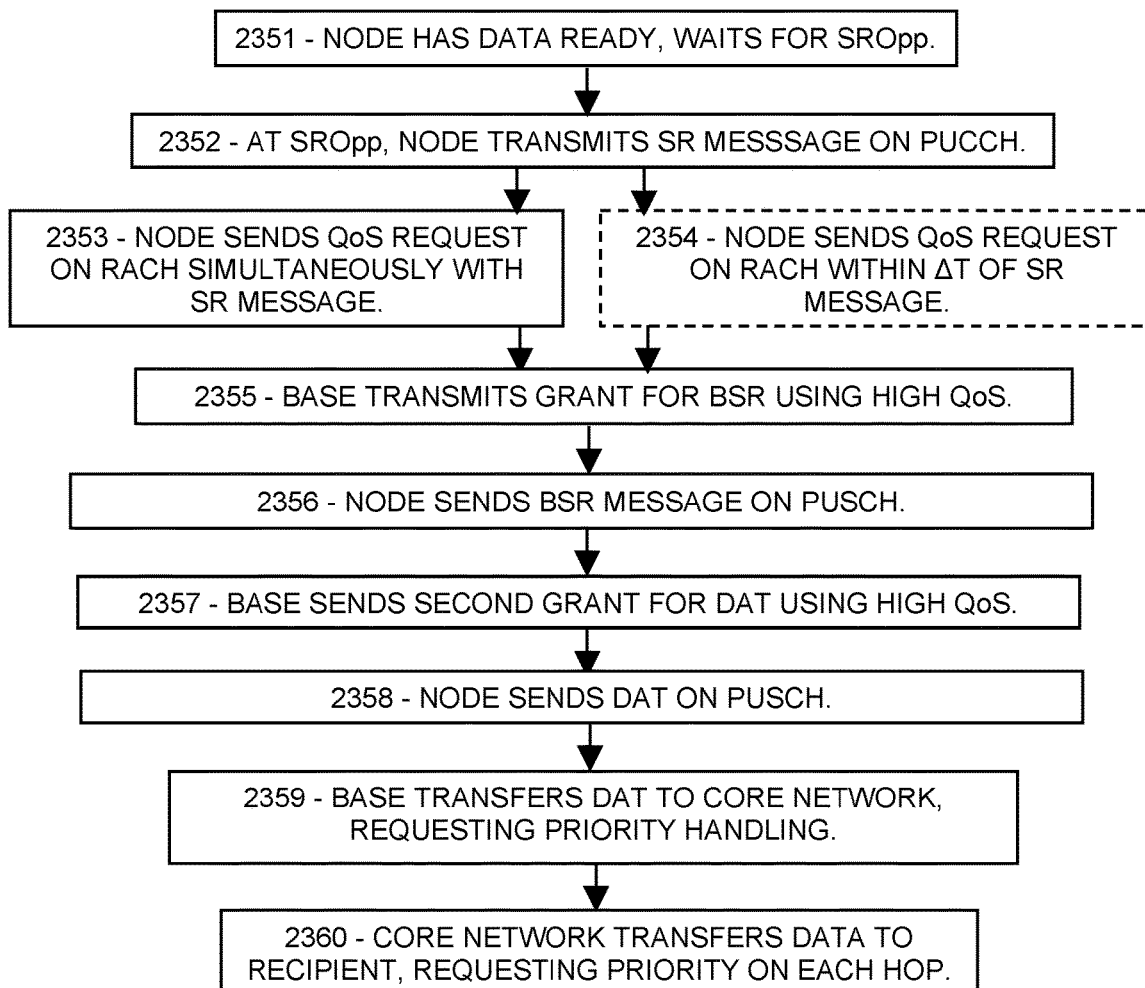
FIG. 23B is a flowchart showing an exemplary embodiment of a method for providing a QoS request synchronously on a random access channel, according to some embodiments.

FIG. 23B is a flowchart showing an exemplary embodiment of a method for providing a QoS request synchronously on a random access channel, according to some embodiments. In this example, the user node sends a temporary QoS request message on the RACH synchronously with an SR message on the PUCCH.

At 2351, the user node has data ready and waits for an SR opportunity. At 2352, the user node transmits an SR message on the PUCCH at the assigned time, and also transmits a temporary QoS message on an unscheduled channel such as a random access channel, or other monitored channel allocated for such use. At 2353, the node sends the temporary QoS request simultaneously with the SR message, thus transmitting on two different frequencies at the same time. Alternatively, if the user node is unable to transmit on two frequencies at the same time, or if the random access windows occupy the same frequency as the PUCCH but at different times, then at 2354 (in dash) the node sends the QoS request on the random access channel slightly before or after the SR message, such as within a predetermined interval AT of the SR message, or on the closest random access window to the SR message, for example. The user node and the base station may agree as to the relative timing of the SR message and any associated messages on the random access channel, so that the base station will know how to interpret the temporary QoS message.

At 2355, the base station transmits a grant for a BSR upload, using the adjusted QoS level. At 2356, the user node transmits a BSR message on the PUSCH as directed. At 2357, the base station transmits a second grant for the data message, again using the adjusted QoS for prioritization and timing, for example providing an earlier upload time than if the default QoS were still in force. At 2358, the user node then transmits the data message on the PUSCH or the RACH or wherever the grant directs. At 2359, the base station transfers the data message to the core network, along with a request (if not made earlier) for special handling according to the temporary QoS level. At 2360, the core network prepares the relay message from the data message and transfers it to other stations along with a request that the message be processed with the temporary QoS priority.

An advantage of providing the temporary QoS request message on the random access channel may be that the base station may learn of the request early enough to apply the adjusted QoS to the subsequent steps, such as the grant messages. Another advantage may be that the SR message and the BSR message and the data message do not need to be altered in this case, which may be a simplification. Another advantage may be that the method may be implemented by updating software, which is generally much less costly than hardware changes.

The procedure of FIG. 23B may be implemented as a system or apparatus, a method, or instructions in non-transient computer-readable media for causing a computing environment, such as a user node, a base station, or other signally coupled component of a wireless network, to implement the procedure.

Figure 24A:
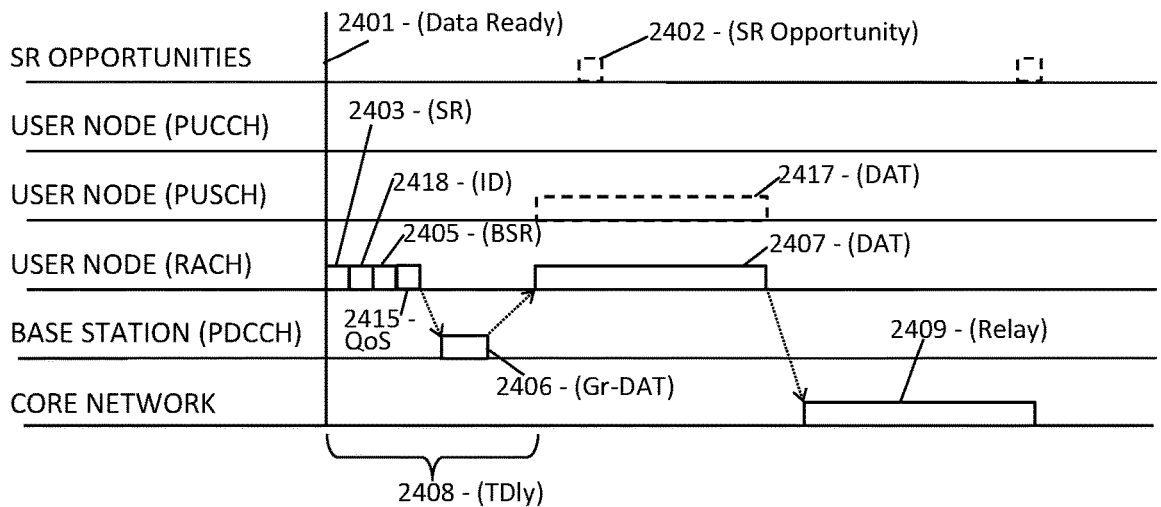
FIG. 24A is a sequence chart showing an exemplary embodiment of a procedure for providing a QoS request asynchronously on a random access channel, according to some embodiments.

FIG. 24A is a sequence chart showing an exemplary embodiment of a procedure for providing a temporary QoS request asynchronously on a random access channel, according to some embodiments. The horizontal lines show SR opportunities 2402 and signals by a user node on the PUCCH and PUSCH and RACH, base station signals on the PDCCH, and core network signals, relative to a Data Ready time 2401. In this example, a temporary QoS adjustment request message 2415 is combined with an SR request 2403 on the random access channel.

At a time of the user node's choosing, such as when a data message is ready to send, the user node transmits an SR request 2403 (or equivalent message requesting an uplink grant) on an unscheduled, monitored channel such as a random access channel, followed by an identification message 2418 such as the RA-RNTI or C-RNTI of the user node, a BSR message 2405, and a temporary QoS request message 2415. In the example, those messages are shown concatenated with little or no gaps between them, so that the base station can determine that they are related. The base station responds by transmitting an uplink grant Gr-DAT 2406 for the full data message, using the adjusted QoS level for determining when to allocate resources. Also, the base station skips the usual BSR-grant handshake because the size of the data message is already indicated in the BSR message 2405. The user node then transmits the data message DAT 2407 on the RACH channel or, if instructed in the grant 2406, it transmits the data message 2417 (shown in dash) on the PUSCH or other channel. The base station then passes the data message 2407, or a portion thereof, to the core network on a priority basis, to be transferred as a relay message 2409 to the recipient with requests that the adjusted QoS be honored by each station in that process. The transmission delay TDly 2408 is shown, which is here relatively short due to avoiding waiting for an SR opportunity 2402, and avoiding a grant for the BSR message.

An advantage of transmitting the SR 2403 and the other messages on the random access channel may be that the user node need not wait for an SR opportunity 2402 to transmit, and so can begin transmitting as soon as the data message is ready, a substantial time savings in many cases. An advantage of transmitting the ID message 2418 in association with the SR message 2403 may be that the base station can determine the identity of the user node before issuing a grant. An advantage of transmitting the BSR message 2405 before receiving the grant 2406 may be that a message handshaking cycle may be avoided. An advantage of providing the temporary QoS message 2415 on the random access channel may be that the SR message format need not be modified. Also, it may be advantageous to transmit the QoS message 2415 early in the message chain so that the base station can provide special services on each step, such as accelerating the grant 2406 and the transmission time of the data message 2407.

The procedure of FIG. 24A may be implemented as a system or apparatus, a method, or instructions in non-transient computer-readable media for causing a computing environment, such as a user node, a base station, or other signally coupled component of a wireless network, to implement the procedure.

Figure 24B:
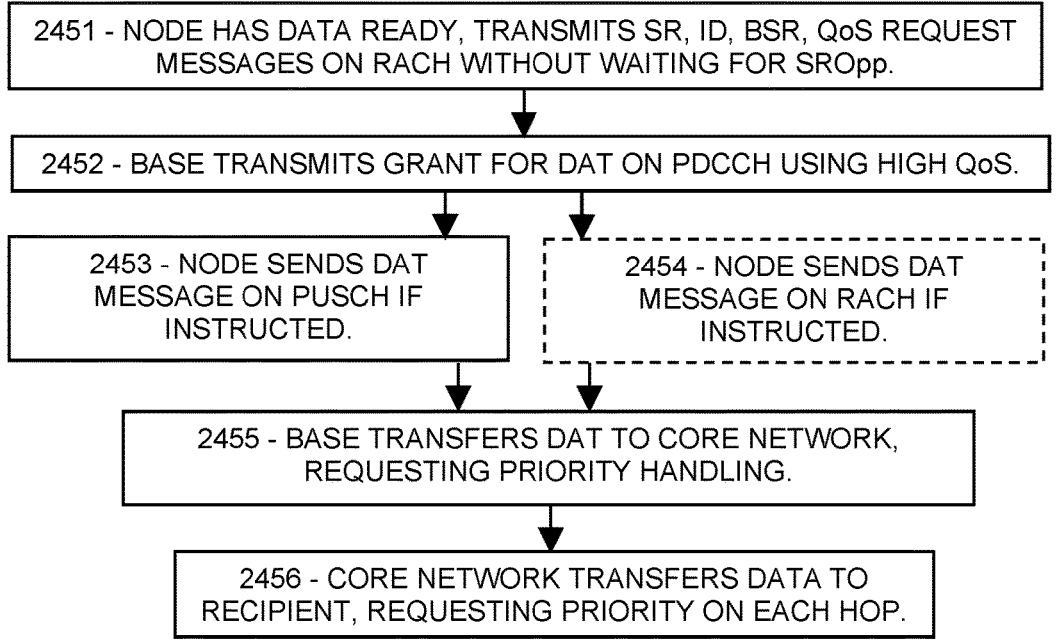
FIG. 24B is a flowchart showing an exemplary embodiment of a method for providing a QoS request asynchronously on a random access channel, according to some embodiments.

FIG. 24B is a flowchart showing an exemplary embodiment of a method for providing a QoS request asynchronously on a random access channel, according to some embodiments. In this example, the user node transmits a series of messages including a temporary QoS request without waiting for an SR opportunity.

At 2451, the user node has data ready, and without waiting for an SR opportunity, transmits, on the random access channel or other channel allocated for the purpose, a SR scheduling request message (or the like), an ID identification message, a BSR size message, and a temporary QoS message. At 2452, the base station receives the four messages and then transmits a grant for the data message upload, with timing and priority according to the requested QoS level. There is no need for a grant for a BSR message because the node has already sent it pre-grant.

The user node then transmits the data message on the PUSCH (2453) or on the RACH (2454, dash) if so directed. In either case, at 2455 the base station receives the data message and, continuing to follow the adjusted QoS, transfers the data message to the core network along with a request for special handling. Then at 2456, the core network transfers a relay message based on the data message to other stations, including a request for processing according to the adjusted QoS level.

An advantage of transmitting the header messages on the random access channel when the data becomes ready may be that a shorter transmission delay may be obtained, due to avoidance of the delay waiting for an SR opportunity, and also avoidance of the grant-BSR handshake, thereby providing lower latency than otherwise. Another advantage may be that the random access channel is less limiting than the scheduled channels, so that the user node may format the various messages at will, as long as the base station can interpret them as intended. Another advantage may be that the method may be implemented by updating software, which is generally much less costly than hardware changes.

The procedure of FIG. 24B may be implemented as a system or apparatus, a method, or instructions in non-transient computer-readable media for causing a computing environment, such as a user node, a base station, or other signally coupled component of a wireless network, to implement the procedure.

Figure 25A:
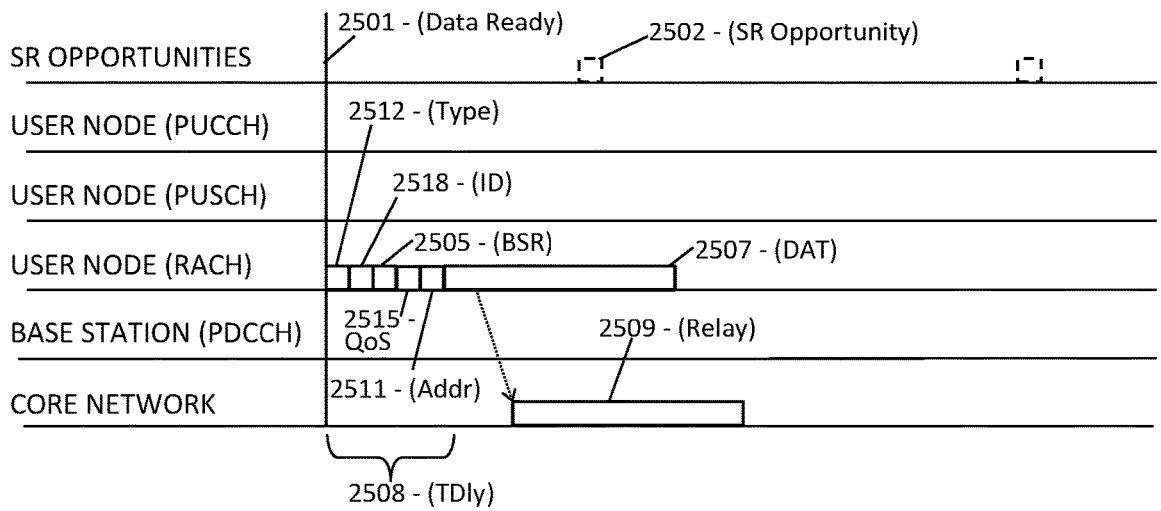
FIG. 25A is a sequence chart showing an exemplary embodiment of a procedure for providing a QoS request with a destination message and a data message, according to some embodiments.

FIG. 25A is a sequence chart showing an exemplary embodiment of a procedure for providing a temporary QoS request with a destination message and a data message, according to some embodiments. The horizontal lines show SR opportunities 2502 and signals by a user node on the PUCCH and PUSCH and RACH, base station signals on the PDCCH, and core network signals, relative to a Data Ready time 2501. In this example, a data message is transmitted without a grant on the random access channel.

As depicted, the user node transmits, as soon as a data message is ready, a type message 2512 specifying that a data message is forthcoming, an identification message 2518, a BSR message 2505, a temporary QoS request 2515, an address message 2511 indicating the destination address, and the data message 2507. A type message is used here instead of an SR message because no grant is being requested and no uplink scheduling is needed. These messages are concatenated or otherwise configured so that the base station can determine that they are all related. They may be combined into a single message containing the same information, if convenient. Alternatively, the messages other than the data message 2507 may be combined as a header message, followed by the data message 2507.

The base station, seeing that a QoS elevation is requested for this data message 2507, provides timely service by transferring the data message 2507, or portions thereof, to the core network as soon as feasible, which in this case is while the data message 2507 is still being uploaded. The core network then transfers the data as a relay message 2509 to the recipient, also requesting special handling. The transmission delay 2508 is shown, which is short because it encompasses only the type, ID, BSR, QoS, and address messages 2512, 2518, 2505, 2515, and 2511.

In addition, not shown, the user node may transmit certain support messages, such as one or more DMRS and CTRS messages and one or more CRC codes, for example. Also, the base station may transmit an ACK or NACK on the RACH or PDCCH, for example, after the data message 2607.

As an alternative, the base station may allocate a special random access channel for high-priority messages. The user node (having permission to access the special channel) may then transmit the type, ID, BSR, address, and data messages on the special random access channel at will, instead of transmitting on the regular random access channel. The user node would not need to transmit the temporary QoS request message in this case because the presence of the messages on the special channel indicates a high priority request. However, if the user node desires a more nuanced QoS option, such as high reliability but not necessarily low latency, or lower QoS, then the user node may include the temporary QoS request message, explicitly stating so.

An advantage of transmitting the messages on the random access channel may be that the delay of waiting for an SR opportunity 2502 may be avoided. An advantage of providing the temporary QoS request 2515 may be that the base station can then provide special services, such as accelerated message processing. An advantage of providing the address message 2508 and BSR message 2505 before the data message 2507 may be that the base station or core network may begin setting up the cooperative transfer with other networks before the data message 2507 is fully uploaded, and if that arrangement is finished soon enough, the relay message 2509 may also be transferred incrementally to the recipient's base station.

The procedure of FIG. 25A may be implemented as a system or apparatus, a method, or instructions in non-transient computer-readable media for causing a computing environment, such as a user node, a base station, or other signally coupled component of a wireless network, to implement the procedure.

Figure 25B:
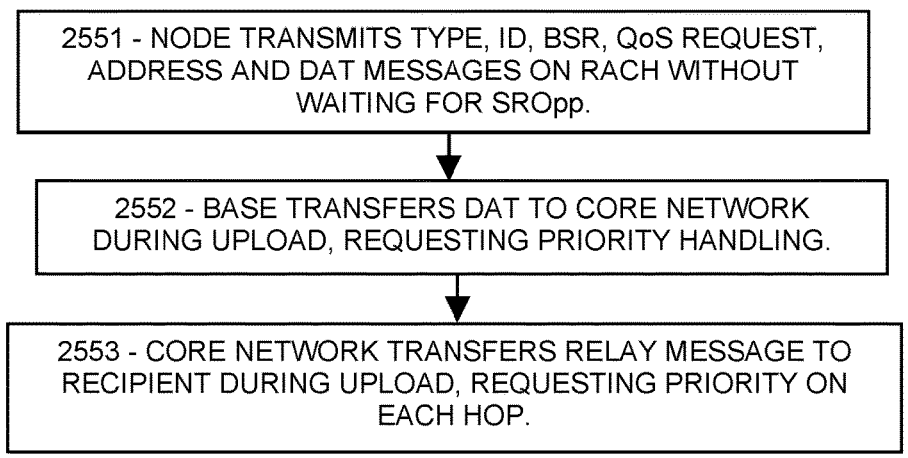
FIG. 25B is a flowchart showing an exemplary embodiment of a method for providing a QoS request with a destination message and a data message, according to some embodiments.

FIG. 25B is a flowchart showing an exemplary embodiment of a method for providing a QoS request with a destination message and a data message, according to some embodiments. In this example, the user node transmits a series of header messages on the random access channel, including a temporary QoS request and an address message, followed by the data message, for low latency.

At 2551, the user node has data ready, and without waiting for an SR opportunity, transmits a type message describing the messages to follow, an ID message identifying the user node, a BSR message or the like indicating the size of the data message, a temporary QoS message, and an address message indicating the destination address (or a code related thereto), followed by the data message. Preferably there are no gaps, or at least no gaps larger than a sensing slot, between the various messages, so that the base station will know that they are all related, and so that other nodes will not be able to interrupt the message sequence on the RACH. At 2552, the base station has received the messages and, applying the requested QoS level, transfers the data message to the core network, along with a request that the adjusted QoS level be applied. Since the destination address is already known, the data message may be transferred incrementally. At 2553, the core network transfers a relay message based on the data message to other stations along with a request that the adjusted QoS level be applied. Since the destination address and the size of the data message are both known, the delivery may be performed incrementally while the data message is being uploaded, thereby delivering the data message to the recipient sooner than otherwise, in this example.

An advantage of transmitting the header and data messages on an unscheduled channel as soon as the data is ready may be that a short transmission delay may be obtained, equal to the time required to transmit the header messages, in this case the type, ID, BSR, QoS, and address messages. An advantage of specifying the temporary QoS level may be that the subsequent processing of the data message, in the core network and the other stations on the way to the recipient, may be accelerated. An advantage of including the destination address in the header may be that the data message may then be processed and delivered incrementally while the data message is being uploaded, and hence may be delivered to the recipient sooner than if the entire data message were uploaded before the relay transfer was started. Another advantage may be that the method may be implemented by updating software, which is generally much less costly than hardware changes.

The procedure of FIG. 25B may be implemented as a system or apparatus, a method, or instructions in non-transient computer-readable media for causing a computing environment, such as a user node, a base station, or other signally coupled component of a wireless network, to implement the procedure.

Figure 26A:
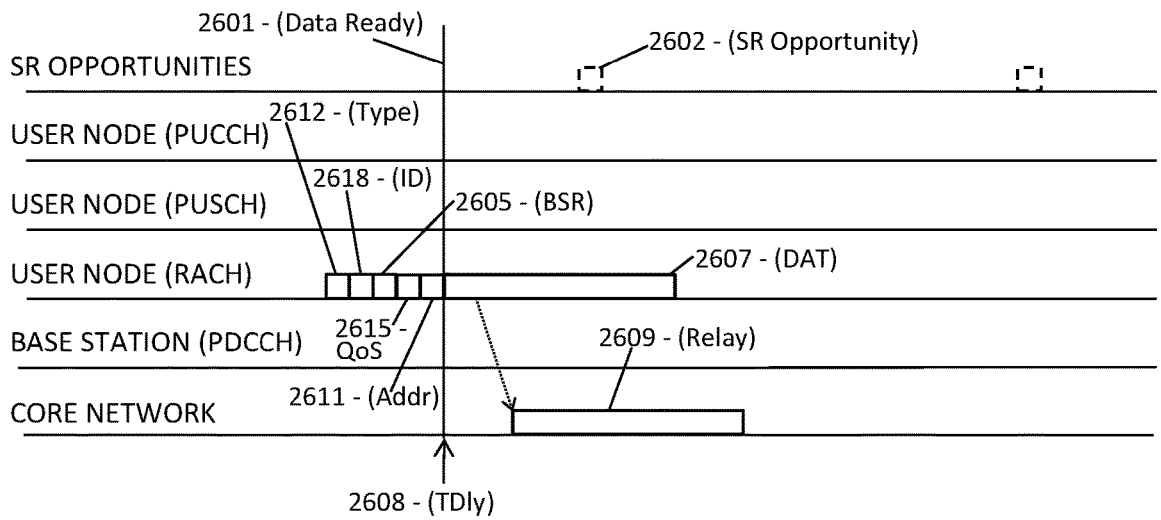
FIG. 26A is a sequence chart showing an exemplary embodiment of a procedure for providing a QoS request with a destination message before a data message is ready to send, according to some embodiments.

FIG. 26A is a sequence chart showing an exemplary embodiment of a procedure for providing a temporary QoS request with a destination message and a data message, according to some embodiments. The horizontal lines show SR opportunities 2602 and signals by a user node on the PUCCH and PUSCH and RACH, base station signals on the PDCCH, and core network signals, relative to a Data Ready time 2601. In this example, header messages are transmitted on the random access channel before a data message is ready, and the data message is then transmitted.

As depicted, a user node transmits a series of messages on an unscheduled but monitored channel, such as a random access channel or another channel allocated for the purpose. The user node calculates when a data message will be ready to send, and begins the other "header" messages (that is, the messages other than the data message) at a particular time, calculated so that the header messages will finish when the data message is ready, or slightly later, thereby saving valuable time. The header messages include a type message 2612, an ID message 2618, a BSR message 2605, a temporary QoS message 2615, and an address message 2611. The user node has planned that those messages will finish at about the Data Ready time 2601, and then transmits the data message 2607 so that there is little or no gap between the header messages and the data message 2607. Avoidance of gaps larger than a sensing slot, or other fixed interval, between the messages may enable the base station to determine that the header messages and the data message are related, and may also prevent other nodes on the network from interrupting before the data message 2607 has been transmitted. The base station transfers the data message 2607 piece-wise or incrementally to the core network so that the core network can begin preparing the relay message 2609 for transfer to the destination. Since the time between the Data Ready 2601 and the start of the data message upload 2607 is essentially zero, the transmission delay 2608 is shown as an arrow.

In addition, a temporary QoS request may enable improved sidelink or peer-to-peer messaging. In some sidelink procedures (often termed "Mode-1" sidelink in 5G), a user node first requests a sidelink reservation (equivalent to a grant, but for a sidelink channel) from the base station. In an emergency, such as an imminent collision between vehicles, for example, the user node may request elevated priority for a sidelink message to another vehicle. Since the emergency message is generally much higher in priority than routine messaging, a temporary QoS enhancement may be crucial to avoiding a collision, or warning a following vehicle that there is a hazard ahead, or other roadway situations in which low latency may be lifesaving. The user node may then request a temporary QoS increase for the collision-avoidance message according to the systems and methods disclosed herein.

An advantage of transmitting the header messages 2612, 2618, 2605, 2615, and 2611 before the data message 2607 is ready, may be that low latency may be provided and the transmission delay 2608 may be made very small or zero. Another advantage may be that the base station and core network may begin setting up a relay process for transferring the data message 2607, or a relay message 2609 derived from it, to the recipient, sooner than if the size and address information had been obtained from the data message 2607 itself. Another advantage may be that the requested QoS adjustment may be applied to the processing and transfer of the relay message 2609. Another advantage may be that the uplink grants, with their delays, have been avoided. An advantage of determining the size and address of the data message 2607 before it is ready to send, may be that the header messages may be timed with sufficient accuracy that the data message 2607 can be started with little or no gap, thereby preventing other nodes from transmitting on the random access channel before the data message 2607 has started, since each user node is required to listen for a predetermined listening time, to detect any ongoing signals on the random access channel, before transmitting.

The procedure of FIG. 26A may be implemented as a system or apparatus, a method, or instructions in non-transitory computer-readable media for causing a computing environment, such as a user node, a base station, or other signally coupled component of a wireless network, to implement the procedure.

Figure 26B:
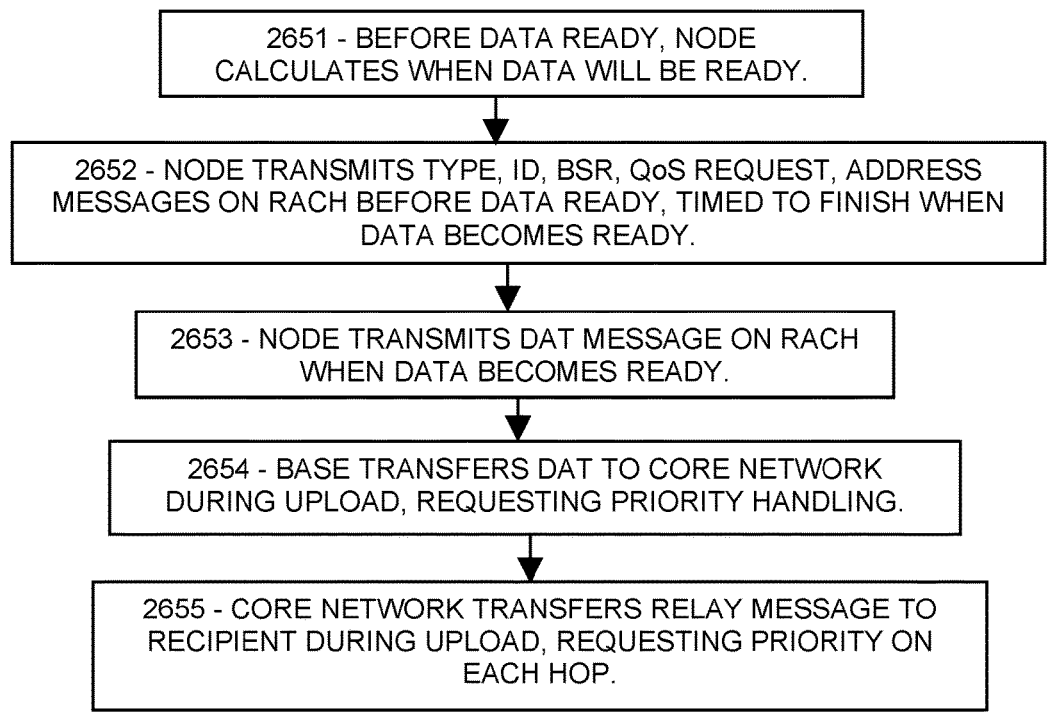
FIG. 26B is a flowchart showing an exemplary embodiment of a method for providing a QoS request with a destination message before a data message is ready to send, according to some embodiments.

FIG. 26B is a flowchart showing an exemplary embodiment of a method for providing a QoS request with a destination message and a data message, according to some embodiments. In this example, the user node transmits the header messages before the data message is ready, including the destination address and a temporary QoS message, and then transmits the data message when ready, thereby obtaining nearly zero transmission delay.

At 2651, the user node calculates when the data message will be ready, and also determines how long the data message will be, and how long it will take to transmit the various header messages. Then at 2652, at a moment selected according to the calculated ready time and the number of header messages planned, the user node begins transmitting a series of header messages on an unscheduled channel, such as the RACH channel, or other channel allocated for the purpose. The header messages in this case include a type message indicating which other messages are forthcoming, an ID message identifying the user node, a size message, such as a BSR message indicating the size of the data message, a temporary QoS request message requesting special handling for the pending data message, and an address message specifying the destination address of the data message. Optionally, one or more calibration messages, such as DMRS or PTRS or CRC messages, may be provided as well. If the data message is not ready at the calculated time, when the address message is finished, then one or more buffer messages may be transmitted to prevent other nodes from transmitting on the channel, such as additional calibration messages or unmodulated carrier, for example.

At 2653, the data message is ready, and the user node transmits it on the same channel. At 2654, while the data message is being uploaded, the base station transfers the data message, or an extract, incrementally to the core network, requesting then (if not sooner) that the data message be handled with the requested QoS level. At 2655, the core network sets up the multi-hop relay transfer to the recipient, while requesting that the adjusted QoS be applied by each station involved, and then begins transferring the relay message incrementally while the data message is still being uploaded. However, if it takes longer to set up the relay agreement than to upload the data message, then the core network may wait until the agreement is in place before starting the relay message transfer.

While the various messages are depicted and described as separate but closely-spaced transmissions, in practice the entire sequence of messages may be configured as a continuous transmission, such as a single message that includes the various header messages or their information content, and may optionally include the data message as well. It is immaterial how the various messages are ordered and parsed or merged, as long as their content information is made available to the base station.

Not shown are additional actions, such as the required LBT (listen before transmit) time, which may be one sensing slot or more, thereby to assure that the channel is clear before starting the header message transmissions. In addition, one or more calibration messages, such as DMRS and PTRS messages are preferably transmitted on the random access channel before the header messages, and optionally at various times between those messages, and optionally before or during or after the data message as well. In addition, one or more error-check messages such as CRC codes are preferably appended to the header messages and/or the data message to reveal any transmission faults.

An advantage of transmitting the header messages before the data message is ready, may be that a very short or substantially zero transmission delay may thereby be obtained, the data message being transmitted as soon as it is ready instead of being transmitted after various delays. An advantage of providing the size and address messages before the data message may be that the core network may thereby begin setting up the relay agreements sooner than if those parameters were determined by reading the data message. An advantage of providing a temporary QoS request message may be that the data message may thereby be processed with the requested priority. Another advantage may be that the method may be implemented by updating software, which is generally much less costly than hardware changes.

The procedure of FIG. 26B may be implemented as a system or apparatus, a method, or instructions in non-transitory computer-readable media for causing a computing environment, such as a user node, a base station, or other signally coupled component of a wireless network, to implement the procedure.

Decisions regarding the temporary QoS service may be made, at least in part, with assistance from an algorithm or other computer-based decision-making system. The base station or core network may use the algorithm to determine whether to grant the temporary QoS requests, and to whom, and for what in return. For example, the algorithm may take, as input, various factors such as the administrative status of the user node (such as a police station or a large corporation or a private individual, for example), a fee offer or subscription basis of the user node (such as a fee per message per QoS level enhancement, or a monthly subscription for a flat rate for N instances of temporary QoS enhancement, among many other possible financial arrangements), as well as situational factors such as the traffic density in the network, the rate of message collisions or of dropped messages, interference from outside the network, for example. The algorithm may then provide, as output, guidance regarding whether to grant individual requests for temporary QoS enhancement, and for which user nodes, and for which messages. For example, a node wishing to send a short message with elevated reliability may be accommodated relatively easily, whereas another node with a large number of large files to send may be more difficult to serve at high QoS without unduly depriving the other user nodes.

Artificial intelligence may be configured to assist in such decision-making, for example by preparing an algorithm based on prior network performance data, preferably accumulated with various levels of temporary QoS enhancement permitted or denied. An AI model may be prepared that takes as input certain factors, such as the number of nodes in a network, the average message size, the current rate of successful and unsuccessful messaging, on both uplink and downlink, and other network factors. The AI model may also take as input, the level of QoS adjustment currently permitted and under what circumstances. The AI model may then be operated to predict the subsequent network performance metric, such as the throughput or average delay per message, and to compare the predicted network performance metric to the actual measured performance metric in various networks, preferably under a wide range of operating conditions. After an iterative solution process to adjust variables in the AI model, the AI model or an extract may be able to provide guidance regarding QoS adjustments, and may result in improved network performance. The AI model, or an algorithm derived from it, may then be distributed to the participating networks for their use in allocating QoS advantages to the various nodes and under what circumstances.

Figure 27:
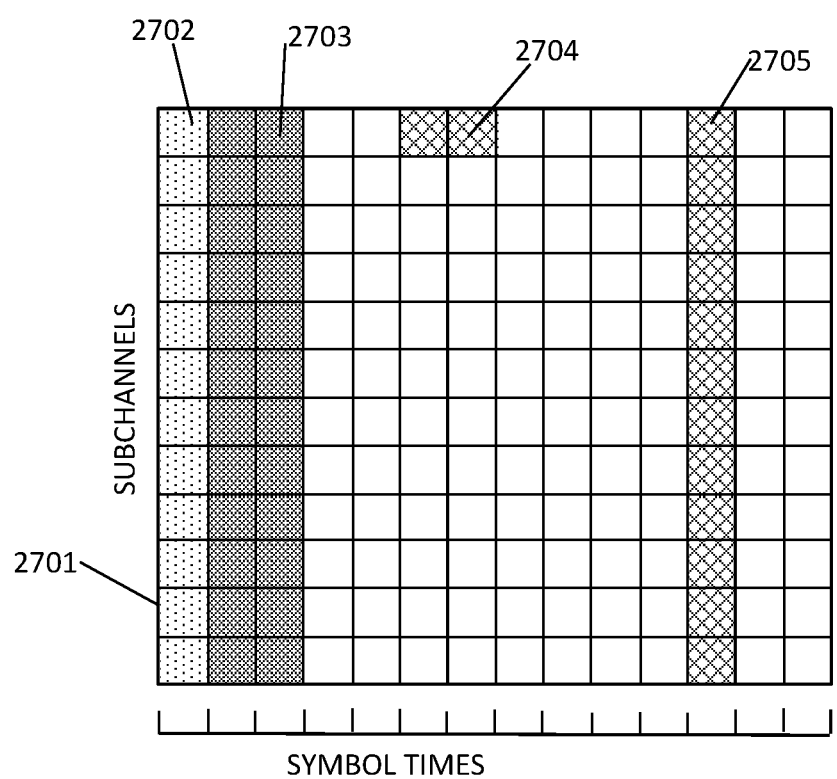
FIG. 27 is a chart showing an exemplary embodiment of a code for requesting a QoS adjustment, according to some embodiments.

FIG. 27 is a schematic representation of an exemplary embodiment of a resource block containing messages, according to some embodiments. The resource block 2701 includes twelve subchannels arranged vertically, corresponding to one standard "channel", and fourteen symbol times arranged horizontally, corresponding to one standard "slot". Messages, such as those of FIG. 26A, may be transmitted by modulating the resource elements of a resource block and transmitting at particular symbol times and subchannels. A modulation table such as 256QAM may be used for modulation in which each symbol represents eight bits of data, as one non-limiting example. The symbols of the messages may be transmitted on a single subchannel stretching across multiple slots. Alternatively, and more compactly, the message or messages may occupy all twelve subchannels at the same time, which makes the message proportionally shorter in time. In the depicted example, a first message (2702, light stipple) occupies all twelve subchannels for the first symbol time, and a second message (2703, dark stipple) occupies the next two symbol times. Also shown are a narrow-band interference signal 2704 and a broad-band noise pulse 2705, both in cross-hatch. Advantageously, the two messages occupy just three symbol times, as opposed to a prolonged interval (36 symbol times) if the messages were transmitted sequentially on a single subchannel, and may thereby avoid noise and interference.

To consider a non-limiting example, the header messages of FIG. 26A, labeled 2612, 2618, 2605, 2611, 2615 may contain twelve bytes of data in total, which would fit into the twelve subchannels of the first symbol time 2702. The data message 2607 may be a 24-byte data message, which would fit into the next two symbol times as 2703. Thus, the entire sequence transmitted by the user node in FIG. 26 would thus occupy just three symbol times in the resource block 2701.

Most transmitters and receivers configured for 5G can readily handle messages that occupy twelve subchannels, so long as the subchannel frequencies are well controlled and the symbols are orthogonally configured. Destructive interference between subchannels is then canceled to first order, and the receiver can generally sort out the twelve simultaneous signals using either analog or digital electronic filtering means which are well known in the art.

An advantage of occupying all twelve subchannels may be that the resulting composite message has a short duration in time. Noise and interference can occur on any channel at any time, so messages that finish quickly are less likely to be faulted. For example, the narrow-band interference signal 2704 may be due to a wireless message from a node in a nearby cell, transmitting a message that happens to overlap one of the subchannels in the resource block 2701. The broadband noise 2705, which spans all of the subchannels at once, may be due to natural or manmade electromagnetic noise. If the two messages 2702-3 were distributed across multiple slots, they would likely be hit by the noise or interference 2704-5. By configuring the messages 2702-3 to occupy only three symbol times in this example, they avoid the noise and interference 2704-5. The problem of interference is particularly important for messages on the RACH channel and other contention-based unscheduled channels, because other nodes may begin transmitting at any time, resulting in a collision.

Another advantage of configuring the message symbols in multiple subchannels simultaneously may be that lower latency and faster access may thereby be provided, since the resulting messages are finished in much less time than the same messages distributed across multiple slots on a single subchannel. Therefore, for a user node requiring low latency, configuring the various messages on multiple subchannels simultaneously may provide the desired service.

The procedure of FIG. 27 may be implemented as a system or apparatus, a method, or instructions in non-transient computer-readable media for causing a computing environment, such as a user node, a base station, or other signally coupled component of a wireless network, to implement the procedure.

The systems and methods disclosed herein further include a database (or table or list or array) in a memory of a base station or core network for each user node in the network, respectively. Each user node's database may contain addresses related to that user node, with a code or index associated with each address. Each user node can have a corresponding listing, in which each index value is associated with a recipient of interest to the user, so that the index associated with each recipient is the same index associated with the recipient's address in the database. The user node may then send a message to an intended recipient by transmitting a message to the base station citing the associated code or index, and the base station or core network can then find the actual address of the recipient in the database according to that index value. Preferably the index or code is shorter than the full address, so that valuable time and bandwidth may be saved by transmitting the index instead of the full address. For example, the address may be a 48-bit MAC address, whereas the index may be an 8-bit number, so that each message transmission to a recipient using the index may be 40 bits shorter than using the full MAC address. Since the index or code may occupy fewer resources than the full address in the messages, faster communication and reduced energy consumption and lower latency and more efficient network usage may result.

Figure 28:
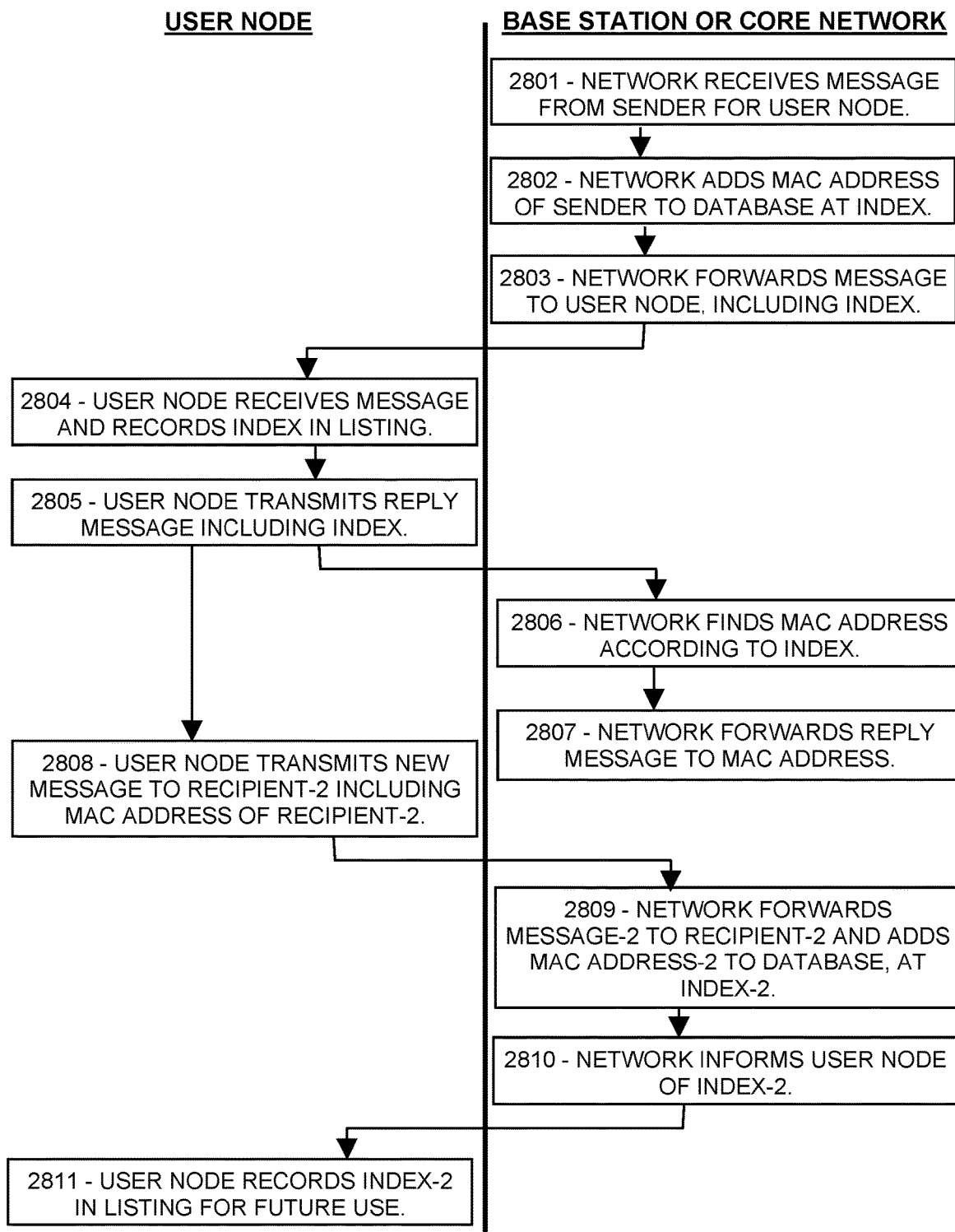
FIG. 28 is a flowchart showing an exemplary embodiment of a method for using a recipient database, according to some embodiments.

FIG. 28 is a flowchart showing an exemplary embodiment of a method for transmitting messages wherein an index or code is used to represent an address, such as the intended recipient's address, according to some embodiments. The base station or core network, referred to collectively as "the network" in the figure, maintains a separate database (or table or file) of information regarding addresses, such as MAC addresses, associated with each user node respectively, and assigns a code or index to each entry in the database. Preferably, the code or index is shorter than the full address. The user node can mention that code or index instead of the full address, thereby saving time and resources on each message. The user node also maintains a listing of code or index values, each index value being associated with one of the recipients that the user node may wish to send a message to, wherein the recipient's address in the database has the same index value as the recipient in the user node's listing. The user node and base station may exchange messages to maintain agreement between the network's database and the user node's listing, whereby each code or index in the user node's listing corresponds to the same code or index in the network's database, and the associated address in the network database corresponds to the associated recipient in the user node's listing. The base station or core network may maintain a number of separate databases, each database being associated with one of the user nodes respectively, so that each user node may have a separate and private database. The network may thus maintain a separate database for each user node, each database being private and accessible only by the associated user node (plus appropriate officials such as law enforcement). The network and the user node may periodically exchange messages to ensure that both have the same index values and that each index value corresponds to the same recipient's address.

Acquisition of addresses to the database may be automatic. For example, whenever an incoming message arrives at the network, the network may automatically add the return address of that message's sender to its database along with an index value (if the address is not already present). The network may then forward the message to the user node along with the index value, so that the user node can add the sender to the user node's listing along with its index value. At a later time, if the user node wishes to send a reply message to the original sender, the user node may upload the reply message to the network along with the associated index value, and the network may then look up the corresponding address in its database, and may then forward the reply message to the recipient at the corresponding address from the database.

In addition, the network may automatically record a new address in the database whenever the user node transmits a message to a "new" recipient (that is, not already in the network's database). In this case, the user node uploads the message along with the full address of the recipient, and the network copies the recipient's address from that message into its database. The network may also assign an index value to it, and may then inform the user node of the index value corresponding to the new recipient, so that the user node can record the index value in its listing. In addition, the network and/or the user node may initiate an exchange of information to reconcile any differences in the corresponding entries of the listing and the database. The user node may include software to maintain the user node's listing in agreement with the network's database, and that software may operate automatically and transparently without human involvement in most cases. The network may also have software to maintain the network's database for each user node and manage updates and the like to keep the user node's listing in agreement with the network's database, and that software may operate automatically and transparently without human involvement in most cases.

In the figure, actions of a user node are shown on the left and actions of the base station or core network on the right. At 2801, the base station or core network ("network" here) receives an incoming message from a sender intended for a user node in the network. At 2802, the network extracts the address, such as a MAC address or the like, from the incoming message and adds it to a database maintained by the network and associated with the user node. The network assigns a code or index value to that sender so that the user node can subsequently refer to the corresponding address more easily or more briefly than with the full address. At 2803, the network forwards the message, along with the index value, to the user node. At 2804 the user node receives the message and records the index in its listing, along with some kind of information about the sender such as the sender's name for example.

At some later time 2805, the user node transmits a reply message back to the original sender by way of the base station, but using the index instead of the address of the original sender in the wireless reply message. At 2806 the network receives the wireless reply message, extracts the index value from it, looks up the address of the original sender in its database associated with the index value, and then 2807 forwards the reply message to the original sender using that address.

At some later time 2808, the user node transmits a new message to a different destination, recipient-2, by transmitting another wireless message (message-2) to the base station. This time the user node includes the full address in the wireless message-2, such as the MAC address, of recipient-2, since recipient-2 is not yet known to the network. At 2809, the network receives message-2, adds the new recipient-2 to its database, and assigns a new index-2 to that recipient-2 address, and forwards the message-2 to recipient-2. At 2810, the network sends a downlink wireless message to the user node indicating that recipient-2 now corresponds to index-2, so that the user node, at 2811, can record index-2 in its listing. The user node may then cite index-2 in future messages to recipient-2.

An advantage of using the index instead of the full address in wireless messages, may be that the index may be shorter than the full address, and therefore may save time and resources in each wireless message, resulting in faster access and improved low-latency communication, according to some embodiments. For example, a MAC address is 48 bits or 6 bytes long, whereas the index may be substantially shorter, in some embodiments. As a non-limiting example, the index may be 8 bits or 1 byte long, corresponding to 256 possible entries in the database and the listing. Alternatively, the index may be another size, such as 4 or 6 or 12 or 16 bits in length, for example, provided that the index is shorter than the full address. A user node can send a message to a recipient whose address is already in the database by referring to the recipient's index, and the base station or core network can look up the corresponding address in the network's database and then send the message to the intended recipient. Since the wireless message is then shorter than it would have been if the full address had been used, the resulting uplink message may be shorter than otherwise, and valuable time and resource elements may be saved.

The database may include certain addresses that the user node has specified (such as the user node's contacts or favorites, for example) as well as addresses drawn from incoming messages to the user node and addresses copied from outgoing messages that the user node has transmitted. The database may further include certain administrative addresses such as an emergency destination, and certain fixed addresses such as an address or code corresponding to the base station itself. The user node may then send a message to the base station by including the index value associated with the base station.

The database may include commands or instructions or requests which are triggered when a certain index is cited in a message. For example, one index value could mean "delete the following entry", followed by an address or index which is to be removed from the database and the listing, or "add the following entry" followed by a new contact information, or "modify the following entry" followed by revised contact information, for example. One index value may indicate a request for the full database to be transmitted to the user node, so that the user node and the base station can reconcile any differences. One or more index values may be used to request an increase or decrease in QoS or other special handling of an outgoing message, or to block incoming messages related to a particular index, for example.

The database may include index values assigned to special recipients. For example, a particular index value may indicate that the message is a reply to the most recently received message, and therefore the base station is to use the return address of the latest received message. Alternatively, an index value may indicate the address of the most recent outgoing message, so that the user node can send again to the same recipient. An index value may correspond to more than one recipient, such as an index value that instructs the base station to send an attached message to all members of a group. An index value may correspond to indirect addressing, in which the specified index is a pointer leading to another entry in the database, such as pointing to whichever address was used on a particular date for example.

The user node or base station may be configured to scan the database or listing to detect and remove duplicates. For example, if the user node sent a message to one of the recipients in the user node's contacts, which are already included in the database and the listing, then the recipient's address and other information need not appear a second time in the section for recent outgoing messages. Instead, the indicated entry could be a pointer that points to an entry in the user's contact list with the same information.

The database may include other information besides the addresses, such as the date and time of last communication and whether it was an incoming or outgoing communication, names and phone numbers and physical addresses if known, among other information. If copies of communications are retained, the database may include those copies or a pointer to wherever the copies are stored, such as in the "cloud".

The procedure of FIG. 28 may be implemented as a system or apparatus, a method, or instructions in non-transient computer-readable media for causing a computing environment, such as a user node, a base station, or other signally coupled component of a wireless network, to implement the procedure.

FIG. 29 is a chart showing an exemplary embodiment of a destination address database, according to some embodiments. The chart is a non-limiting example of one arrangement, of many possible arrangements, of the database that relates index values to addresses of potential interest to a user node. The index may be a number, which may be represented by a message symbol. The message symbol may be modulated by one of the common modulation types, such as 16QAM encoding four bits, 64QAM encoding six bits, or 256QAM encoding eight bits. The four-bit modulation provides index values of zero to 15, the six-bit modulation provides index values of zero to 63, and the eight-bit modulation provides index values of zero to 255. The database may include transmission addresses of the user node's contacts or "favorites", return addresses for one or more previous incoming messages to the user node, destination addresses of one or more of the user node's previous outgoing messages, certain fixed addresses, such as the base station or network address, various commands, system-defined functions, and reserved index values, for example. The database may be arranged or ordered so that a user node that encodes the index in a four-bit modulation symbol may access the most common 16 items in the database, a user node that encodes the index with a six-bit modulation symbol may access those 16 items plus further items up to 64 items, and a user node that encodes the index with eight bits may access all of those items plus additional items up to 256 total items.

In the depicted example, the modulation range is shown in the left column (such as 4, 6, or 8 bit modulation examples), the index value is in the central column, and the functionality of that index value is in the right column. The most commonly used 16 functions are shown first, providing basic functionality. Index 0 means, in this example, to not use the database at all, but rather to draw the destination address from a data message. In this example, index 1 means to send the following message to the return address of the most recent incoming message. Index 2 means to send the following message to the same address as the most recent outgoing message. Index 3 means that the message is an emergency call, and the network is expected to already know how to handle it. Index 4 means that the message is intended for the base station or core network, rather than some external recipient. Index 5 is reserved for future use in this example. Index values 6-15 correspond to ten of the user node's favorites. That completes the range accessible for a 4-bit modulation symbol.

For a six-bit modulation such as 64QAM, the index range includes all those listed above for values 0-15, and in addition the values 16-63 as follows. Index values 16-40 represent, in the depicted case, additional user contacts up to 35 total contacts. As viewed by the six-bit modulation, the list of contacts is a continuous range from index 6 to index 40, representing the user node's 35 favorites. Index values 41-60 represent commands, such as "add the following address to the database", or "delete the following index entry from the contact list", or "modify the following index entry as indicated in the following data message", or "download the database to the user node", or "reconcile the user node's listing to agree with the network's database version", among other possible commands. These commands are thus directly accessible to the six-bit modulation users. They are not directly accessible to the four-bit users, but those users may use the index code 4 to send a message directly to the base station instructing it to perform whatever function the commands represent. Thus, the four-bit users can achieve all of the same functionality as the six-bit users, but without the convenience of having a specific index to represent each command.

A user modulating with an eight-bit table such as 256QAM may use all of the index functions listed above (values 0-63) and in addition the following. Index values 64-112 represent, in the depicted example, the return addresses of the 49 prior incoming messages earlier than that represented by index 1. Thus, the user node can reply to an earlier message including up to 50 earlier messages. Index values 113-161 represent the 49 prior outgoing messages earlier than that of index 2. As mentioned, the four-bit and six-bit modulation users can access the same index values by sending a message to the base station, index 4, with that specification. The base station or core network can update the older incoming message index values whenever another incoming message is received, by incrementing each of the index values in the range of 64-111, discarding the address that was previously in index 112, and placing the newly arrived address in index 1. Likewise, whenever the user sends an outgoing message to a new recipient, that destination address can be placed in the index 2 entry, the information in index 2 can drop to index 113, the remaining older outgoing index values 114-160 may be incremented, and the oldest value previously at index 161 may be discarded. In this way the base station or core network may update the database transparently to the user.

In the example, index values 162-181 represent system-defined operations. Each network equipment manufacturer or network operator may use these index values for their own purposes. For example, the system-defined index values may provide special services to the user nodes. One or more special services may be an option to cluster multiple addresses under a single index value, so that the user node can send an announcement to all of the members of a group, for example. Another special service may be a spam filter, in which all messages from certain addresses are to be discarded. Other special services may involve security, such as scanning all incoming messages from certain addresses, or all addresses, for malware, or encrypting or decrypting messages to/from certain addresses. One of the special services may be to store a copy of incoming or outgoing messages associated with certain addresses. One special service may be to erase the entire database (preferably with a warning and reaffirmation by the user node).

The example also shows 20 user-programmable index entries. Users wishing to do so could craft their own special services using these index entries. Invoking one of the user-programmable index values may cause a computer code to execute, or a stored request to be delivered to the base station, or stored information (such as a salutation or a signature line) to be added to an outgoing message, or other operations that future users may devise. Finally, index values 202-255 are reserved. As mentioned, the entire chart is a non-limiting example of a possible embodiment of the functions provided when user nodes invoke the various index values. Artisans, after reading the explanations disclosed herein, may devise other arrangements with other numbers and other functions, without departing from the appended claims.

The user node can cite the code or index of the recipient in various ways. The code or index may be included in a field of the data message, such as replacing the MAC address field or a different field of the data message. Alternatively, the code or index may be transmitted at a the time and frequency of an SR opportunity, with the base station interpreting the code or index as indicating the recipient's address in the database as well as a request for an uplink grant. Alternatively, the code or index may be transmitted in a separate message on an unscheduled channel, such as a random access channel, synchronized in time with an SR message. Alternatively, the code or index may be added to a BSR or other uplink message by concatenation or multiplexing or other combination. In each case, the base station may recognize the code or index upon receipt, look up the delivery address of the recipient, and then transfer the message or an extract of it to the recipient.

Since the recipient database can provide benefits to the user nodes, but consumes time and resources of the network, the network may determine which user nodes to provide the service to, and which user nodes to withhold the service. That determination may be based on an algorithm or criterion or other decision-making procedure. The algorithm may take parameters as input, and may provide, as output, recommendations regarding which nodes warrant the database service. For example, the input parameters may include factors such as the administrative status of the user node, such as an emergency site that deals with life-and-death situations versus a individual's personal Internet connection for example. The input parameters may include a fee or subscription basis that the user node has purchased, such as a fee per message or per month or other financial arrangement. The input parameters may include a QoS level or other measure of priority that the user node requires. The algorithm may then provide as output, price recommendations for each user node for the service, as well as guidance regarding which user nodes should be accorded free service, or none at all.

The recipient database may be particularly advantageous in sidelink or peer-to-peer messaging. The base station may assign a temporary identification number to each user node currently registered in the cell or network, and may include each user node's temporary identification number in the recipient database. The temporary identification number is generally shorter than the full MAC address. Each user node may then copy the temporary identification numbers of the other user nodes when they update their own listings. A user node may then transmit a sidelink message directly to another user node in the same cell or network, and may use the temporary identification number of the recipient user node in the message instead of the full address. For example, vehicles such as autonomous vehicles or vehicles with an emergency hazard avoidance system may send messages to neighboring vehicles to coordinate a collision-avoidance maneuver, and may use the temporary identification numbers of the neighboring vehicles to reduce latency.

An advantage of using the temporary identification number instead of the full address in sidelink messaging may be that the message may be made shorter, since the temporary identification number may be shorter than the 48-bit MAC address. A shorter message may reduce the probability that the message will be faulted by noise or interference, while also reducing the message density and congestion and energy consumption, among other advantages, according to implementation.

The procedure of FIG. 29 may be implemented as a system or apparatus, a method, or instructions in non-transient computer-readable media for causing a computing environment, such as a user node, a base station, or other signally coupled component of a wireless network, to implement the procedure.

The disclosed systems and methods may further include a machine learning or AI (artificial intelligence) model, and an algorithm derived from it, configured to assist a base station or core network in making decisions regarding network operations. The algorithm (or formula or table or the like) may be derived using AI procedures that perform complex calculations on interrelated input factors and provide predictions or recommendations for computer-based decision-making. An advantage of the AI procedures may be that the outputs may be derived through machine learning, which may be based on past data, usually a large amount of past data, and thereby may be applicable to a wide range of realistic situations in networking. To develop such an AI-based algorithm, a network may accumulate data on performance and resources expended, among other things, versus the number of nodes that are provided with that particular service, and at what price. Multiple networks may accumulate such data, preferably under a wide range of circumstances such as traffic density, message sizes in uplink and downlink, large and small networks, user nodes with capabilities ranging from high to low, and the like. By varying the number of user nodes that are provided with the service, and parameters of the database or the service, while measuring the effect on network performance and, possibly, user satisfaction, sufficient data may be accumulated for a computer to perform a machine learning or AI solution that relates the service decision-making to the input conditions, and thereby optimizes, or at least improves, the network performance in most cases.

For example, some user nodes may want ready access to an unscheduled channel monitored by the base station such as a private exclusive random access channel, a valuable advantage for some users. Such an unscheduled channel may enable many versatile applications requiring low-latency opportunities, as well as relatively simple applications. Such procedures may be involved in many messaging applications, including the examples disclosed herein, which may be desirable for some users. On the other hand, each unscheduled channel has costs associated with it, such as the cost of resources dedicated to the unscheduled channel, the costs for the base station to maintain constant listening of each such channel, and usage costs. Therefore, the network may restrict which users are permitted to access each random access channel, or other unscheduled channels, and under what circumstances. The network (base station or core network for example) may use an algorithm to determine how to allocate such random access resources. The algorithm may take, as input, factors such as the administrative status of the user node, a fee or subscription basis of the user node, network factors such as the traffic density and the number of nodes active at any time, among other factors. For example, a corporation may have many uses for an unscheduled monitored channel, or a plurality of such channels. The algorithm may also determine which fee or subscription cost may be requested for a private unscheduled channel versus and a lower fee for access to a community random access channel, among other arrangements.

In some embodiments, the algorithm, or other decision procedure for allocating random access resources, may be derived by artificial intelligence and machine learning. To do so, a network or, preferably, a large number of networks, may record their performance metrics (based on throughput, average delay, collision rate, and the like) under various network conditions (number of nodes active, presence and type of interference, for example) and for various levels of access to unscheduled channels. Preferably the data record includes cases where the network has provided a large number of random access channels and other unscheduled channels for the nodes to access, on an exclusive basis or in a single random access channel or in a common "pool" of such channels, to determine how these decisions affect the subsequent performance metrics of the networks.

The data may then be provided to a computer running an AI model, such as a neural net or a hidden Markov model or a regression model or a classification model or support vector machine or Bayesian network or decision tree or other type of AI structure. The computer may operate the model to predict the effect of various decisions regarding the random access channel availability and its effect on the subsequent performance. Typically, AI models include a large number of internal or hidden variables that relate various input parameters to the output performance prediction. Those internal variables may be adjusted or "trained" or "tuned" iteratively so as to bring the predictions incrementally closer to the observed performance. This is a form of machine learning, since the model "learns" from the previous examples and thereby successively improves its predictive accuracy, given sufficient data.

When the AI model has achieved sufficient accuracy in predicting network performance under realistic conditions, the model itself (preferably with the internal variables frozen), or an algorithm derived from it, may be provided to the networks to use in making decisions about how many unscheduled channels to provide, to which user nodes, and under what circumstances. The algorithm may be a formula or computer program or table or graphical representation or other means for determining an output from the input values, the input values generally being network parameters and the output generally being a performance metric or a recommended action or the like. In some embodiments, the algorithm is a readily usable decision-making tool which network operators (or their computers) may employ for managing network operations. Preferably the algorithm provides the same, or nearly the same, predictive accuracy as the full AI model but, unlike the full model, can fit in a limited network processor memory and can provide answers in a time scale useful to fast-cadence 5G operations, that is, microseconds (according to some embodiments).

The use of AI for allocating resources or options to the various user nodes has been suggested herein with regard to several "operating choices" or parameters that a network operator may have to decide on. Examples of the disclosed operating choices include: assignment of scrambling codes for determining which user nodes may transmit SR messages on which SR opportunities and using which modulation states; allocation of unscheduled channels such as random access channels; determining whether to provide each user node with recipient database services and at what price; and assigning rights regarding temporary QoS messaging, among many other possible examples of AI usefulness in network operations. Using AI to select an appropriate decision for each operating choice may be based on a predictive AI model. The AI model may take as input various network conditions, and also the particular operating choices that are being explored. The AI model may then perform a complex calculation that, when properly adjusted, may provide a predicted performance of the network. By running the model multiple times with different possible choices for the operating choices, the AI model may reveal which operating choices are likely to provide the best (or at least improved) network performance. The network operator may then select the best operating choice so far revealed. In this way the network operator may use the AI model for decisions such as how often to provide SR opportunities, which nodes may access them, how many random access channels to offer and which user nodes may access them, which user nodes should be provided with a network-based recipient database, and which user nodes may request adjusted temporary QoS levels, among many other possible uses for AI in networking.

The AI model may include a number of internal functions or calculation "modules" (such as subroutines or analytical functions for example) for performing mathematical calculations and/or logical analysis. Each calculation module may include one or more internal variables which are adjustable. The modules may be arranged in layers and may be interconnected by links that convey calculation results between various calculation modules. The first layer may receive the input parameters including the operating choice that is being explored, the second layer may receive the outputs from the first layer and may provide intermediate results to the third layer, and so forth until the last layer provides one or more output, such as the predicted performance metrics. Each module may include a linear function, such as a weighted average of its input links, and a nonlinear function, such as a threshold or an exponential function regulating the output links of that module. The AI model may be "tuned" by adjusting the internal variables so that the predicted performance matches, or comes successively closer to, the actual network performance observed. Preferably a lot of data covering a wide range of different conditions and operating choices are available, so that the variables can be iteratively adjusted for successively more accurate predictions. Eventually, after many such iterations, the AI model may provide predictions with sufficient accuracy to be useful in the intended application. Then the AI model, or a simplified algorithm or code derived from it, may be transmitted to base stations or core networks for use in making operating choices, choices that are expected to improve their network performance.

In a similar fashion, an AI model may be prepared, and an algorithm derived from it, to assist network operators in deciding whether to accept user requests for a temporary QoS adjustment. Such an ability may be a valuable option for some users, especially when they have an unusually important message to send. However, there are costs to the network involved in complying with the temporary QoS modification, and also in detecting and interpreting and implementing each temporary QoS request. There are also costs to the other user nodes, who may be preempted by the singular high-priority message. In times of high traffic density, or if there is an emergency call ongoing, or in many other situations, the network may opt to reject requests for temporary QoS adjustments. Alternatively, the network may place a price on the service for some users and not others. For example, the algorithm may determine, on a case-by-case basis for example, whether to provide the temporary QoS adjustment service to each of the user nodes on the basis of the administrative status of the user node (such as an emergency responder station or a police station, for example), the subscription or fee basis of the user node (such as a monthly flat fee for the service, or a per-message fee for example). The model may also take as input situational parameters such as the traffic density, the message failure rate, the size of the pending data message, and many other factors that the AI model may consider.

In a similar fashion, an AI model may be prepared, and an algorithm derived from it, to assist network operators in deciding whether to provide the recipient database service described above. The service uses network equipment and time and resources and energy, to maintain the database with up-to-date addresses matched to the user node's listing, and to look up the full address corresponding to the index value in each uplink message, among other costs to the network. The service may be valuable to the user by enabling faster access and shorter uplink messages, thereby providing lower latency for users requiring it. Therefore, an AI algorithm may be prepared to assist the network in deciding whether to provide the address database service to each user node, and at what price. The AI model or algorithm may take any number of inputs, each input being a measured parameter. Examples of input parameters may include the administrative status of the user node, the subscription level or fee basis of the user node, the traffic density, presence or absence of an emergency call, and many other factors in determining whether to provide the database service. For example, a transitory user passing through a cell and transmitting a single message in the cell probably would not warrant the cost and effort of constructing the recipient database at all, whereas a long-term resident of the network with many messages per day may be provided the database service for free (reflecting the advantages of greater efficiency of the network) or at some price.

For clarity, certain terms commonly used in AI are avoided herein. The AI model is sometimes called an "algorithm" but the term "algorithm" is used herein for a portable implementation version derived from the AI model. The calculation modules in the AI model are sometimes called a "node", but herein "node" refers to wireless communication entities organized in a network. The AI model itself is often called a "network", but herein the term is reserved for wireless communication networks only. "Artificial intelligence" often refers to general human-like intelligence or robotic implementations of it, but herein the term is used for a more narrow computer-assisted decision-making in a particular application, based on iterative machine learning using prior examples drawn from the application.

There are many other applications for AI-based computer-assisted decision-making in 5G and future 6G networking. Each of these applications may benefit from the systems and methods disclosed herein.

Figure 30:
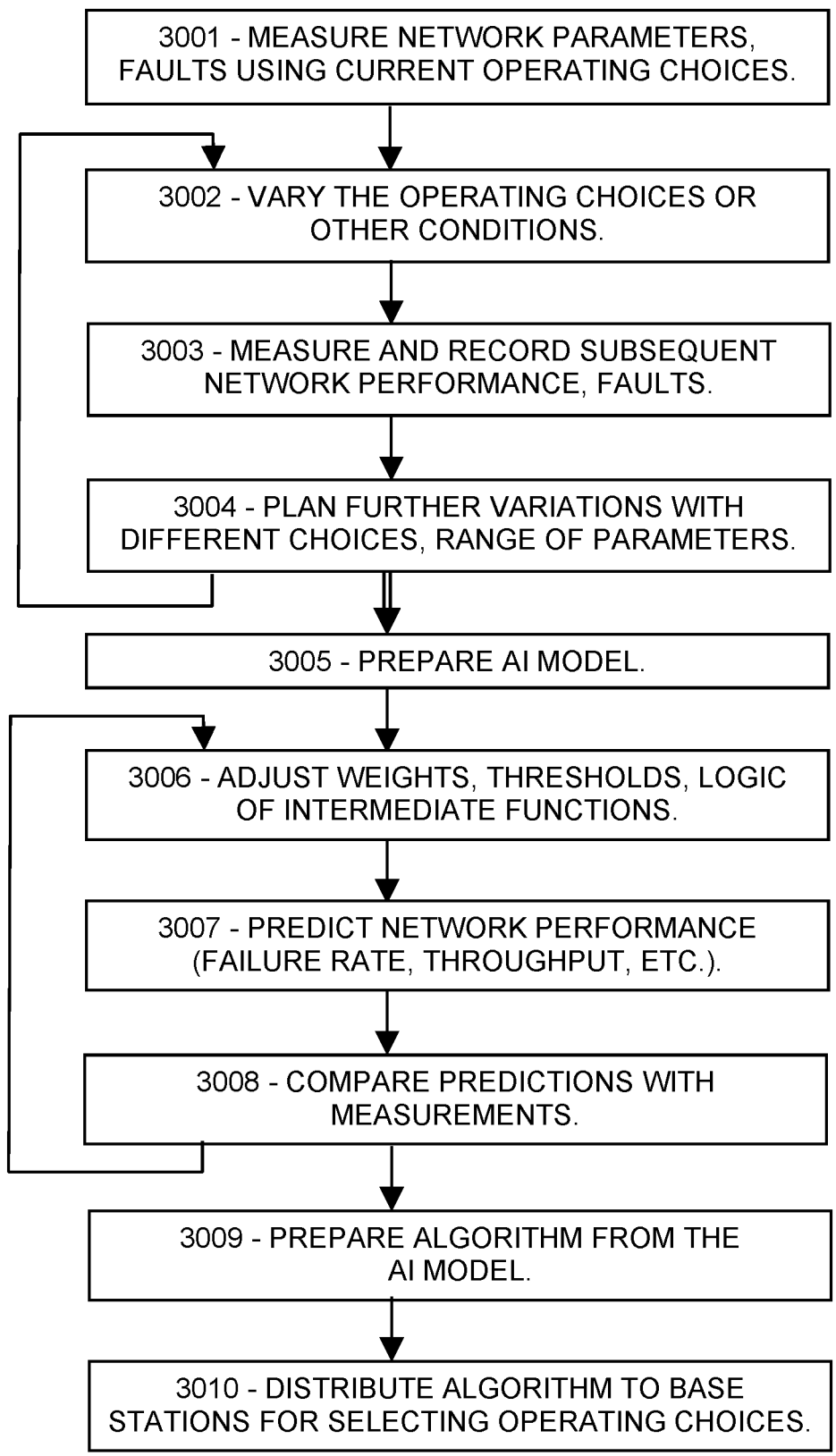
FIG. 30 is a flowchart showing an exemplary embodiment of a method for adjusting and implementing an artificial intelligence procedure, according to some embodiments.

FIG. 30 is a flowchart showing an exemplary embodiment of a method for tuning an AI model, according to some embodiments. In this method, a network first accumulates data on network performance under various conditions with various operating choices, and then provides the data to a predictive AI model. Using the data, internal variables in the AI model may be iteratively adjusted, the intent being to improve the predictive accuracy of the AI model. For example, the AI model may predict a network performance metric. The performance metric may be a measured value or a formula of measured values, such as the message fault rate of the network, or the throughput minus the rate of retransmission, or the energy consumed, or a measure of user satisfaction, among many other choices. After the internal variables in the AI model have been adjusted to obtain sufficiently accurate predictions of the network performance metric, an algorithm may be prepared based on the AI model, and the algorithm may be distributed to the networks for use in selecting which operating choices to use in various situations. Preferably the algorithm is more easily operated, and is much less demanding of supercomputer resources, than the full AI model.

Returning to the figure, at 3001 a base station or core network measures the current network parameters of a cell or LAN. The measurements may include the current message failure rate, the types of faults observed, the traffic density, and preferably numerous other network parameters, along with a record of which operating choices are in use. Other parameters of interest, such as interference from outside the network, may be recorded at 3002. Preferably the data accumulation is continued long enough to record the network conditions and performance under a wide range of conditions. The resulting network performance is then recorded at 3003 including any faults and other measurables of interest. Then, optionally, at 3004 the network may plan experiments, such as changing the operating choices in use, to see what happens to the performance. The flow then returns to 3002 to take further data as the network responds to any changes. Preferably a substantial database of network conditions, operating choices, and resulting performance metrics are accumulated over time, including a wide range of conditions. Other data from other networks may be included, or provided in parallel, so as to expose the AI model to as many different scenarios as are available. Periodically, or continually, the data may be transferred to a central computer as indicated by a doublewide arrow.

At 3005 a central computer receives the data and prepares (or obtains from elsewhere) an artificial intelligence AI model, such as a neural net or hidden Markov model or logistic regression or other artificial intelligence means for processing network data and predicting subsequent performance. In particular, the AI model may be configured to predict how each operating choice would likely affect the subsequent performance of the network. The AI model takes in, as inputs, the network data and, preferably, combines it with data from a large number of other base stations as well, thereby assembling a sufficient number of examples under a wide range of network conditions. The inputs of the AI model may include the conditions of the network, current performance observed, and parameters of the operating choices in use (such as the number and periodicity of SR opportunities, the number and accessibility of random access channels, and the like). The output or outputs may include one or more predicted network performance metrics such as the throughput and message failure rate. The internal modules are functions or routines that perform mathematical and logical operations on the input data and/or on the results of other modules. The output predictions are then derived from certain of the modules, such as the lowest layer of modules. Variables ("values") in the internal modules (and optionally the links between them) are then adjusted, and the quality of the predicted output is again determined. The variables may then be further adjusted, the intent being to improve the accuracy of the predicted network performance metric relative to the subsequent observed metric. This process is called "supervised" learning since it is based on the actual performance achieved by the network in each scenario. It is also "machine learning" because the tuning is usually performed, at high speed and massively parallel, using other processors, with little direct human involvement once the model is set up and the input data arranged. After the AI model has achieved sufficient predictive accuracy to predict the subsequent performance of networks to a predetermined accuracy, the AI model (or a simplified algorithm derived from it) can then be used by the wireless network operators to predict how various operating choices would likely perform under similar conditions, as well as many other useful tasks. The predictions can thereby enable network operators to select the most suitable operating choice under the circumstances.

When the AI model is first prepared, the internal variables are usually set at arbitrary values at first, and therefore the AI model usually generates extremely poor predictions before being tuned. The variables can then be adjusted to bring the predicted outputs into better accord with the observed data, which generally results in improved predictive accuracy when new conditions are presented. At 3006, the computer sets or adjusts the internal variables, and iteratively with feedback re-adjusts the variables in order to optimize the accuracy of the predictions. With those settings, at 3007 the computer uses the AI model to predict the subsequent network performance metric in terms of the current conditions and parameter settings. For example, the model may predict performance metrics such as the message failure rate, the throughput, and so forth. Then at 3008 the computer, or a supervisory processor, compares the predictions with the network observations. A success factor may be prepared according to the features that the AI model predicted correctly. The flow then returns to 3006 for more variations of the internal values or further network performance histories. This process continues iteratively to refine the variables of the intermediate functions in order to optimize the success factor, or otherwise improve the predictions.

Upon each iteration, the variables may be adjusted to follow any improvements in the AI model's predictive accuracy. The depicted process may be repeated many times using data from many base stations covering many different operational scenarios. Each successful prediction may form the starting point for extensions to other scenarios, a form of predictive analytics or regression based on deep learning. In a particular iteration of the method, the values of the intermediate functions may be adjusted in the same direction that they were adjusted in the previous iteration if the predictions were improved thereby, or in the opposite direction if the predictions were less accurate. Alternatively, to avoid getting stuck on local peaks, an arbitrary large change in values may be imposed from time to time, and the fine-tuning process repeated from that point. Decisions about which variables to vary, and which direction and by how much, may be random or pre-planned or based on the computer's previous experience with similar variations. The iterative adjustment process with feedback from the network data is thus a form of guided learning. If the computer decides which values to vary based on its previous experience, the process is an example of recursive self-improvement.

Tuning an AI network model may require computer assistance. Selection of which variables to change, and deciding in what direction and by how much to vary them, is generally a very complex problem, especially if the AI model has a large number of interacting variables in a large number of tightly linked modules. In some embodiments, a "supervisor" AI model may be programmed to use machine learning to decide which variables to adjust in the "network" AI model, which then predicts network performance. For example, the supervisor model may determine how to adjust the variables of the network model to optimize rapid convergence of the network model toward a sufficiently accurate predictive result. The supervisor AI model may include its own variables relating to methods for varying the network model variables, and the supervisor model variables may be adjusted empirically to provide better convergence of the network model, by varying the network AI model parameters and determining how rapidly the network model's predictions improved. The supervisor model may adjust the network model's variables arbitrarily at first, and may develop a more refined and effective strategy for tuning the network model with greater experience. By testing such variations many times, the supervisor model may refine and improve its own variables to improve its ability to vary the network model parameters efficiently for rapid convergence of the network model. Then, when the supervisor model variables are well tuned, the supervisor model may be used to tune the network model variables, based on a history of previous adjustments. In this way, the supervisor model may be able to tune the network model and cause the network model to provide sufficiently accurate predictions, and may do so more rapidly and efficiently than human operators, in some embodiments. The supervisor AI model, using machine learning to assist the network AI model, may be termed "rank-two AI". The network model alone may be termed rank-one AI if the network model variables are adjusted manually or by computers that do not employ machine learning to do so.

The supervisor strategy may be carried further by arranging an even higher order super-supervisor AI model that is tasked with optimizing the variables of the supervisor model, so that the supervisor model can efficiently adjust the variables of the network model. This may be termed rank-three AI. However, tuning the variables of the super-supervisor model is a complex problem, so an even higher rank of AI model may be required to tune it, making it a rank-four AI. The number of ranks of AI tuning models appropriate to a particular problem depends on the complexity of the problem. The systems and methods include a one-rank AI, such as a network AI model in which the variables are tuned manually or with computers not employing machine learning to do so. The systems and methods also include rank-two AI in which a supervisor model uses machine learning to tune the variables of the network model. The systems and methods also include rank-three AI in which a super-supervisor model uses machine learning to tune the variables of the supervisor model. The systems and methods also include higher-rank cascaded AI models, each level being configured to tune the variables of the next lower rank using machine learning. The number of ranks required for a given implementation may be dictated by the needs of the implementation as determined by the designer.

Regardless of the AI rank, the adjustment process is generally complex and arduous, requiring advanced software and many hours on extremely competent supercomputers, due to the large number of tightly interacting variables in a problem such as network operation management. Nevertheless, systems exist that can handle such challenges and provide accurate predictions, given sufficient input data to work with. After a sufficiently successful AI model has been developed, at 3009 an algorithm may be prepared from the results. For example, the algorithm may be the AI model itself, but with the intermediate function values preferably frozen. Predictions can then be obtained by inserting network operating choices as inputs and calculating the resulting predicted performance. Alternatively, the algorithm may be a simplified or compact version of the AI model by, for example, pruning the unproductive modules or input parameters. Alternatively, the algorithm output may be configured to recommend a particular operating choice directly, instead of displaying predicted network performance metrics for each choice, in which case the algorithm selects the best operating choice and informs the network of the selection. The selection may be based, for example, on which operating choice would likely provide the highest message throughput or the lowest failure rate or the shortest average delays, of the available operating choices, given the current operational parameters of the network. The algorithm may be prepared as a computer code, a formula, a table or matrix of values, or other format capable of rendering predictions or recommendations based on the input parameters. The resulting algorithm may then, at 3010, be distributed to the base stations for use in selecting or optimizing their modulation tables under various conditions.

The procedure of FIG. 30 may be implemented as a system or apparatus, a method, or instructions in non-transient computer-readable media for causing a computing environment, such as a user node, a base station, or other signally coupled component of a wireless network, to implement the procedure.

Figure 31:
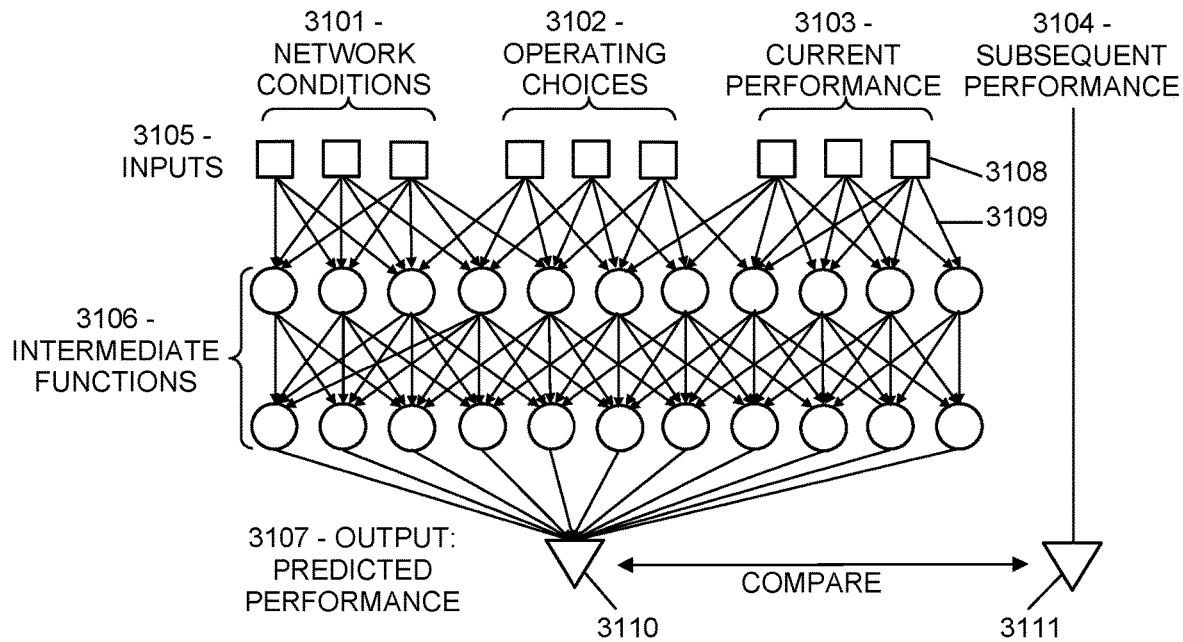
FIG. 31 is a schematic showing an exemplary embodiment of an artificial intelligence model, according to some embodiments.

FIG. 31 is a schematic of an exemplary embodiment of an AI model, arranged in this embodiment for predicting a network performance metric according to input parameters. The depicted case is a neural net, such as an acyclic directed graph of calculation modules interlinked in multiple discrete layers, but other AI configurations may be used instead. Variables in the AI model may be adjusted to cause the predicted performance metric to predict an observed performance metric, preferably with sufficient accuracy that network operators can use the results for selecting operating choices for improved performance. The input parameters 3105 may include a number (three shown) of network conditions 3101, such as the number of user nodes, the current traffic density, and an average message size, among many other possible network parameters potentially of interest. The input parameters 3105 may also include parameters of the current operating choices 3102, preferably including operating choices of interest to network operators. The input parameters 3105 may also include information on network performance observed 3103 by the network, while operating with the network conditions 3101 and operating choices 3102 as specified. Each input parameter 3105 is indicated by a square 3108.

The depicted AI model also includes a number of calculation modules 3106, arranged in this embodiment as two layers under the inputs 3105, although other embodiments may have more layers and more modules per layer. The AI model is arranged to produce an output (triangle 3107) which in this embodiment is a predicted network performance metric 3110. The schematic also shows a performance metric column 3104, including an observed network performance metric 3111, which has been observed in a real network operating with the network conditions and operating choices as listed in the inputs 3105. The performance metric 3111 may be, for example, the message throughput minus ten times the failure rate minus five times the average delay per message, among many other forms of a performance metric of interest to network operators.

Also shown are lines ("links") 3109 connecting the inputs 3105, the intermediate modules 3106, and the output 3107. Each module 3106 is a function or subroutine or other means for calculating, based on parameters obtained from the inputs 3105 or from another layer of the AI model, and for feeding results of the calculating to the next layer, and finally to the output 3107. For clarity, the figure shows links connecting only a few of the modules of each layer, but a real AI structure may have links from each module connecting all of the modules of the previous layer and all of the modules in the subsequent layer. Each of the modules 3106 includes adjustable variables. For example, each module 3106 may calculate a weighted sum of its input values and compare that weighted sum to a threshold. The module 3106 may then produce an output based on the weighted sum and the threshold. For example, the neuron 3106 may produce a "digital" output, such as "1" if the sum exceeds the threshold and "0" if the sum is less than the threshold. Alternatively, for a more nuanced result, the module 3106 may produce an analog output with amplitude related to the value of the sum, The adjustable variables may be the weights of the various inputs and the threshold value. In other neural nets, the module outputs may be more complex logical or mathematical combinations of the inputs, such as selecting the largest input value and passing that value to the output, or calculating the square root of each input value before adding, or generating an output based on the RMS (root-mean-square) distribution of the input values to that module 3106, among many other logical and mathematical formulations possible. The module output may be "squashed" into a range of 0-1 using a sigmoid or tanh or exponential function, for example, to avoid generating unwieldy large numerical values downstream. Nonlinearity is also necessary to provide predictive relationships other than a weighted linear average. It is immaterial whether the weights are ascribed to the links leading into a module or to the module itself, and likewise it is immaterial whether the squashing function is ascribed to the module or its output links. Usually, each module provides the same output to each of the succeeding layer modules, although in a particular model some links or outputs may be different from the others, for example to emphasize or suppress a particular relationship.

The variables may be adjusted to bring the predicted performance metric 3110 into agreement with the observed performance metric 3111 as indicated by the "compare" arrow. For example, a particular variable or set of variables in one or more of the intermediate modules 3106 may be adjusted in a first direction, and the predicted and observed 3110-3111 metrics can be compared to determine if the agreement is better or worse. If better, the adjustment of variables may be repeated or increased in the same direction, and if worse, the adjustment can be turned in the opposite direction. In some embodiments, the variables may be adjusted according to how much effect each variable has on the final output. In other embodiments, the variables may be adjusted to follow a gradient, or direction of steepest decent, of the disagreement between the predicted and observed metric 3110-3111. In still other embodiments, the size of the adjustment may be adapted to the amount of change observed in a previous step. The adjustment can be continued in this iterative fashion until the agreement is satisfactory, or other criterion. The links may also be weighted or otherwise include calculational processes besides that of the intermediate modules. The links in the example are "directed" downward toward the outputs, however other embodiments may include bidirectional links or links sending calculation results upward toward higher layers, or other grid topologies, to address issues such as user response to message failures, among other issues in networking experience.

The number of layers in the AI model may be related to the types of relationships between the input parameters. For example, a simple model with no intermediate layers, just inputs and an output, is usually capable of providing just a weighted average of the inputs, with perhaps a threshold cutoff or the like. With one intermediate layer, relationships between the inputs can be included in the analysis, such as "take the larger of A and B" values linked to a particular module. With two intermediate layers, more subtle effects can be introduced, such as "take A if C is greater than 5, and take B otherwise". Each successive layer generally enables more complex and nuanced effects. Usually the number of modules in an internal layer is in the range of 0.5 to 2 times the number of inputs, and usually the number of layers is in the range of 0.5 to 2 times the number of modules per layer, although AI models may have any number of layers and modules as needed for the particular application. Artisans may design other AI models with different architectures after learning about the systems and methods disclosed herein.

To provide predictions across a wide range of network scenarios, data from a large number of networks, at a large number of different times, may be applied as well. Each scenario may be used as an input to the model, and the model variables may be tuned individually to optimize the prediction of that particular scenario. Alternatively, the input parameters may be changed or rotated among a large number of different scenarios and the variables may be tuned to optimize the predictive accuracy of the model for all of the scenarios together. Alternatively, an averaged ("clustered") input may be derived from data obtained in multiple related scenarios, and the variables may be adjusted to improve or optimize agreement between each predicted performance metric and the corresponding observed performance metric. New modules may be created at any time to take advantage of any correlations revealed by the previous variations. After a large number of different scenarios have been satisfactorily predicted, the variable values derived from different scenarios may be combined, such as averaged, to broaden the applicability of the solutions, and the resulting composite set of values may then be tested with additional network data, preferably network data that the model has not previously seen. The intent may be to develop an AI model capable of predicting the effect of the training set on subsequent network performance, so that network operators can then use the model (or an algorithm derived from the model) to predict the effect of a particular operating choice on the subsequent network performance, and thereby to select network management choices predicted to result in higher network performance than otherwise obtained. The algorithm may thereby assist networks in managing a torrent of user demands while minimizing costs, according to the current operating conditions.

As mentioned, the AI model may be converted to an algorithm for convenient use by networks in selecting or adjusting operating choices and other network parameters. Often the AI model itself is so large and complex, it may be unwieldy for use by a base station or core network in a busy network. Therefore, an algorithm may be configured as a handy and readily usable version of the AI model with sufficient predictive power for general network decision-making. Alternatively, a number of special-purpose algorithms may be prepared from the general model, focused on specific decision-making such as determining how many random access channels to provide, or which user nodes warrant free services such as temporary QoS service or recipient database service, for example. Networks may purchase such special-purpose algorithms to assist in operational management based on rational experience, rather than human-in-the-loop intuition which may be less efficient and more expensive than computer-assisted decision-making.

The algorithm may be, for example, the AI model itself but with the variables set at the best combination so far obtained (that is, the set of variables providing the closest agreement between the predicted and observed performance metric across a sufficiently wide range of network conditions and a sufficiently wide range of operating choices). Alternatively, the algorithm may be a simplified version of the AI model in which certain inputs and intermediate functions are eliminated if they exhibit little or no correlation with the predicted performance metric. Alternatively, the algorithm may be cast as an analytic function, a computer code, a tabular array which may be multi-dimensional, or other means for providing an output such as a predicted performance metric according to the network conditions, operating choices, and performance observed. Networks (specifically base stations or core networks) can then use the algorithm to predict performance with each of a number of available operating choices, and determine which choice is predicted to provide the best performance according to the metric.

The procedure of FIG. 31 may be implemented as a system or apparatus, a method, or instructions in non-transient computer-readable media for causing a computing environment, such as a user node, a base station, or other signally coupled component of a wireless network, to implement the procedure.

Figure 32:
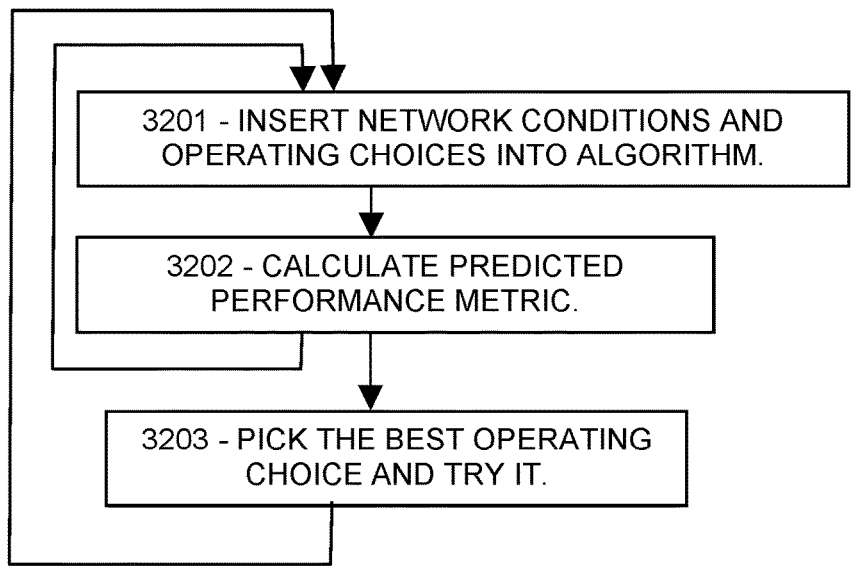
FIG. 32 is a flowchart showing an exemplary embodiment of a method for selecting operational parameters, according to some embodiments.

FIG. 32 is a flowchart showing an exemplary method for using an algorithm based on an AI model, such as that of FIG. 31. At 3201, parameters such as network conditions and observed fault rates are used as inputs to the algorithm. A first operating choice is assumed. At 3202 the algorithm is used to predict the performance metric for the input scenario and with the first operating choice. Those steps may be repeated for a second operating choice, and for each of the operating choices available to the network. After predicting performance metrics from all of the available operating choices, at 3203 the best operating choice (whichever operating choice would provide the highest predicted performance metric) may be selected and activated in the network. The method may then be repeated to select further operating choices as network conditions change.

The procedure of FIG. 32 may be implemented as a system or apparatus, a method, or instructions in non-transient computer-readable media for causing a computing environment, such as a user node, a base station, or other signally coupled component of a wireless network, to implement the procedure.

The systems and methods further include networks configured to provide a simplified method for low-performance user nodes to join the network, or to gain uplink message access, or otherwise interact with the network. In some embodiments, a base station may be configured to accept messages from user nodes that are not registered in the network. For example, the network may allocate a channel for emergency communications, such that an emergency call on the emergency channel may be accepted by the base station and acted upon by the network, as if the caller were registered in the network. The base station may provide a temporary identification for the emergency communications. An emergency caller may be able to access the network without going through the authentication steps that non-emergency users are required to do in 5G. If, however, the emergency call appears on another channel, other than the allocated emergency channel, the base station may then give the emergency caller exclusive use of that channel by excluding other users from that channel for the duration of the emergency communications. The base station may waive other requirements, such as authentication requirements or formatting conventions or timing adjustments or limitations on transmitted power, in order to accommodate the emergency call and subsequent related messages if any.

A network providing advantages to emergency callers may also monitor traffic on the emergency channel to detect cheating, such as non-emergency usage. For example, the recipient of most emergency calls is an emergency response station. A call on the emergency channel, but addressed to a different destination not associated with medical or law enforcement or emergency response or fire or the like, may be flagged as suspicious. Emergency calls are always recorded at the emergency response center, and may be recorded by the network as well for record-keeping. Repeated calls from the same user node to addresses not ostensibly emergency-related may be reviewed for appropriateness. Transmission on the emergency channel may be reviewed by computer analysis, and if the usage fails certain criteria, may be passed to a human inspector. In response to suspicious usage, the network may contact the user and ask why they are using the emergency channel. Violators may be suspended from the network, or may be required to pay a fee (preferably a hefty fee) for the transgression, or in extreme cases may be prosecuted under laws such as existing laws related to frivolous usage of 911 phone calls for example.

The network may provide free service to a transient user such as a vehicle passing through the range of a base station. The transient user may wish to transmit a short message or download an item of information without having to perform the complex registration procedure for 5G networks. Such accommodation may consume fewer resources than a full registration procedure, and may also generate goodwill for the network. The network may place conditions on free service, such as traffic being not too heavy and no emergency calls are being handled by the base station, the network not being a closed or private or classified network, for example. The free service may be provided on a low-QoS basis (other than emergency calls which may be given the highest QoS). The free service may be restricted to a particular unscheduled channel, such as a random access channel or other monitored unscheduled channel. For example, a transient node wishing to transmit a message without registering may deposit the message, along with identifying and related information in a header, on an unscheduled channel, such as the RACH or another channel allocated for this purpose, for example as illustrated in FIG. 7A or 16A. The free channel may be made low-bandwidth and low-numerology such as 15 kHz subchannel spacing, and low-modulation such as QPSK (quadrature phase shift keying) or other modulation that does not rely on precise power adjustment. (Since QPSK does not include amplitude modulation, a message can be received and demodulated without knowing the transmitted amplitude.) Alternatively, a modulation table such as 16QAM may be used, along with calibration signals such as DMRS added to the request message so the base station can demodulate it.

The network may provide one or more legacy channels for user nodes that prefer them, such as low-cost low-performance sensors and the like. For example, the base station may allocate a channel, or a set of subchannels, for messaging according to the robust CSMA-CA standards (carrier sense multiple access with collision avoidance). Low-cost, low-performance user nodes may be able to comply with straightforward legacy requirements, such as RTS-CTS handshaking (request to send, clear to send) which are far simpler than many 5G protocols. Many developers may be unable to comply with the complex 5G requirements but may readily employ the simpler legacy protocols. For nodes such as temperature sensors and many others that do not require the high performance of 5G technology, being able to access the network in a relatively simple way, such as a legacy channel, may be a favorable option.

In some implementations, a combination of multiple disclosed techniques, or of all of the disclosed techniques, may be employed.

The systems and methods may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, or sooner, are loaded into random access memory. Inputs to the application, e.g., from the plurality of users or from any one user, may be by any number of appropriate computer input devices. For example, users may employ vehicular controls, as well as a keyboard, mouse, touch-screen, joystick, trackpad, other pointing device, or any other such computer input device to input data relevant to the calculations. Data may also be input by way of one or more sensors on the robot, an inserted memory chip, hard drive, flash drives, flash memory, optical media, magnetic media, or any other type of file—storing medium. The outputs may be delivered to a user by way of signals transmitted to robot steering and throttle controls, a video graphics card or integrated graphics chipset coupled to a display that may be seen by a user. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., embedded systems and processors, personal computers, laptop computers, notebook computers, net book computers, handheld computers, personal digital assistants, mobile phones, smart phones, tablet computers, and also on devices specifically designed for these purpose. In one implementation, a user of a smart phone or WiFi-connected device downloads a copy of the application to their device from a server using a wireless Internet connection. An appropriate authentication procedure and secure transaction process may provide for payment to be made to the seller. The application may download over the mobile connection, or over the WiFi or other wireless network connection. The application may then be run by the user. Such a networked system may provide a suitable computing environment for an implementation in which a plurality of users provide separate inputs to the system and method.

It is to be understood that the foregoing description is not a definition of the invention but is a description of one or more preferred exemplary embodiments of the invention. The invention is not limited to the particular embodiments(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater, or different steps than that shown here. All such other embodiments, changes, and modifications are intended to come within the scope of the appended claims.

As used in this specification and claims, the terms "for example", "e.g.", "for instance", "such as", and "like" and the terms "comprising", "having", "including", and their other verb forms, when used in conjunction with a listing of one or more components or other items, are each to be construed as open-ended, meaning that the listing is not to be considered as excluding other additional components or items. Other terms are to be construed using their broadest reasonable meaning unless they are used in a context that requires a different interpretation.

The invention claimed is:

1. Non-transitory computer-readable media in a base station of a wireless network, the base station in signal communication with a plurality of user nodes and operably connected to a core network that is operably connected to a wider network, the media containing instructions that when executed by a computing environment cause a method to be performed, the method comprising:
   receiving a first message from a user node of the plurality, the first message indicating a destination address of a data message;
   after receiving the first message, then receiving the data message; and
   then transferring the data message, or a portion thereof, to the destination address;
   wherein the first message further indicates a size of the data message; and
   wherein the method further comprises:
   after receiving the first message, transferring, to the core network, the destination address and the size of the data message;
   after receiving a first portion of the data message, then transferring, to the core network, the first portion of the data message; and
   after receiving a second portion of the data message, then transferring, to the core network, the second portion of the data message.

2. A user node, in signal communication with a base station of a wireless network, configured to:
   transmit, to the base station, one or more first messages, the first messages comprising a wireless address, a size of a planned data message, and a request that the planned data message be transferred to the wireless address; and then
   transmit, to the base station, the planned data message, wherein the first messages or the data message, or both, are transmitted on an unscheduled channel, the unscheduled channel comprising a random access channel or another channel allocated by the base station for user-initiated messages;
   determine, before the planned data message is ready to be transmitted, when the planned data message is expected be ready to be transmitted;
   begin transmitting the one or more first messages before the planned data message is expected to ready to be transmitted, such that the transmission of the one or more first messages is expected to be finished after the data message is expected to be ready to be transmitted; and
   when the transmission of the one or more first messages is finished, then transmit the planned data message.

\* \* \* \* \*